United States Patent
Stanford et al.

(10) Patent No.: US 12,138,977 B2
(45) Date of Patent: Nov. 12, 2024

(54) ENERGY HARVESTING SWITCH

(71) Applicant: Fox Factory, Inc., Duluth, GA (US)

(72) Inventors: Robert Stanford, Alpharetta, GA (US); Nobuhiko Negishi, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 348 days.

(21) Appl. No.: 17/531,394

(22) Filed: Nov. 19, 2021

(65) Prior Publication Data

US 2022/0242190 A1 Aug. 4, 2022

Related U.S. Application Data

(60) Provisional application No. 63/116,028, filed on Nov. 19, 2020.

(51) Int. Cl.
| | |
|---|---|
| *B60G 17/015* | (2006.01) |
| *B60G 13/14* | (2006.01) |
| *B60K 35/10* | (2024.01) |
| *H04B 5/40* | (2024.01) |
| *H04B 5/72* | (2024.01) |
| *H04W 4/48* | (2018.01) |
| *H04W 4/80* | (2018.01) |
| *B60K 35/28* | (2024.01) |
| *B60K 35/85* | (2024.01) |

(Continued)

(52) U.S. Cl.
CPC ......... *B60G 17/0157* (2013.01); *B60G 13/14* (2013.01); *B60G 17/015* (2013.01); *B60G 17/0152* (2013.01); *B60K 35/10* (2024.01); *H04B 5/72* (2024.01); *H04W 4/80* (2018.02); *B60G 2300/60* (2013.01); *B60K 35/28* (2024.01); *B60K 35/85* (2024.01); *B60K 2360/167* (2024.01); *B60K 2360/5915* (2024.01); *H01Q 1/3216* (2013.01); *H04W 4/48* (2018.02); *H04W 12/03* (2021.01)

(58) Field of Classification Search
CPC .............. B60G 17/015; B60G 17/0152; B60G 17/0157; B60G 2300/60; B60K 37/06; B60K 2370/5915; H04B 5/0031; H04W 4/48; H04W 4/80
USPC ....................................................... 701/2, 37
See application file for complete search history.

(56) References Cited

U.S. PATENT DOCUMENTS

| | | | | |
|---|---|---|---|---|
| 4,929,808 A | * | 5/1990 | Roeser ............... | H01H 11/0056 200/462 |
| 5,856,710 A | * | 1/1999 | Baughman ............ | B60R 21/017 307/17 |

(Continued)

OTHER PUBLICATIONS

"Cherryswitches.com, AFIS series switches"; Aug. 4, 2015 (Year: 2015).*

(Continued)

*Primary Examiner* — Erick R Solis

(57) ABSTRACT

An energy harvesting switch is disclosed. The energy harvesting switch includes a magnet, a coil, and a mechanical switch. The manipulation of the mechanical switch causes the magnet to move with respect to the coil and generate an amount of energy. The energy harvesting switch also includes a transmitter configured to use the generated amount of energy to transmit a signal to at least one component coupled with a vehicle, the signal configured to cause a change to at least one characteristic of the at least one component.

17 Claims, 71 Drawing Sheets

(51) Int. Cl.
 *H01Q 1/32* (2006.01)
 *H04W 12/03* (2021.01)

(56) References Cited

U.S. PATENT DOCUMENTS

| | | | | |
|---|---|---|---|---|
| 6,154,635 A * | 11/2000 | Ohta | .................... | G06K 7/0008 |
| | | | | 340/870.31 |
| 6,700,310 B2 * | 3/2004 | Maue | .................... | B60R 25/24 |
| | | | | 310/319 |
| 6,933,655 B2 * | 8/2005 | Morrison | ................ | B60R 25/24 |
| | | | | 310/314 |
| 7,019,241 B2 * | 3/2006 | Grassl | .................. | H10N 30/306 |
| | | | | 200/402 |
| 8,177,182 B1 * | 5/2012 | Wood | .................... | G06F 3/0338 |
| | | | | 248/316.1 |
| 8,627,932 B2 | 1/2014 | Marking | | |
| 8,838,335 B2 | 9/2014 | Bass et al. | | |
| 8,857,580 B2 | 10/2014 | Marking | | |
| 8,892,055 B2 * | 11/2014 | Gasperi | ................ | H04B 5/0037 |
| | | | | 700/12 |
| 9,033,122 B2 | 5/2015 | Ericksen et al. | | |
| 9,120,362 B2 | 9/2015 | Marking | | |
| 9,159,221 B1 * | 10/2015 | Stantchev | ............. | G08C 17/02 |
| 9,239,090 B2 | 1/2016 | Marking et al. | | |
| 9,353,818 B2 | 5/2016 | Marking | | |
| 9,552,937 B2 * | 1/2017 | Erdmann | ............. | H02K 7/1892 |
| 9,623,716 B2 | 4/2017 | Cox | | |
| 9,682,604 B2 | 6/2017 | Cox et al. | | |
| 9,797,467 B2 | 10/2017 | Wootten et al. | | |
| 9,813,119 B1 * | 11/2017 | Johnson | ............. | H04B 5/0031 |
| 10,036,443 B2 | 7/2018 | Galasso et al. | | |
| 10,415,662 B2 | 9/2019 | Marking | | |
| 10,933,710 B2 | 3/2021 | Tong | | |
| 2005/0115761 A1 * | 6/2005 | Dinda | .................. | B60R 16/027 |
| | | | | 180/402 |
| 2011/0214956 A1 * | 9/2011 | Marking | ................. | F16F 9/34 |
| | | | | 188/313 |
| 2014/0370803 A1 * | 12/2014 | Haverinen | ........... | H04B 5/0081 |
| | | | | 455/41.1 |
| 2015/0054760 A1 * | 2/2015 | Amaru | .................. | G02B 27/01 |
| | | | | 345/173 |
| 2020/0080375 A1 * | 3/2020 | Girard | ....................... | E05F 1/02 |
| 2021/0070127 A1 * | 3/2021 | Keil | .................... | B60G 17/0185 |

OTHER PUBLICATIONS

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

* cited by examiner

205 INTRO

225 RIDE STATS

215
HOME - MANUAL MODE
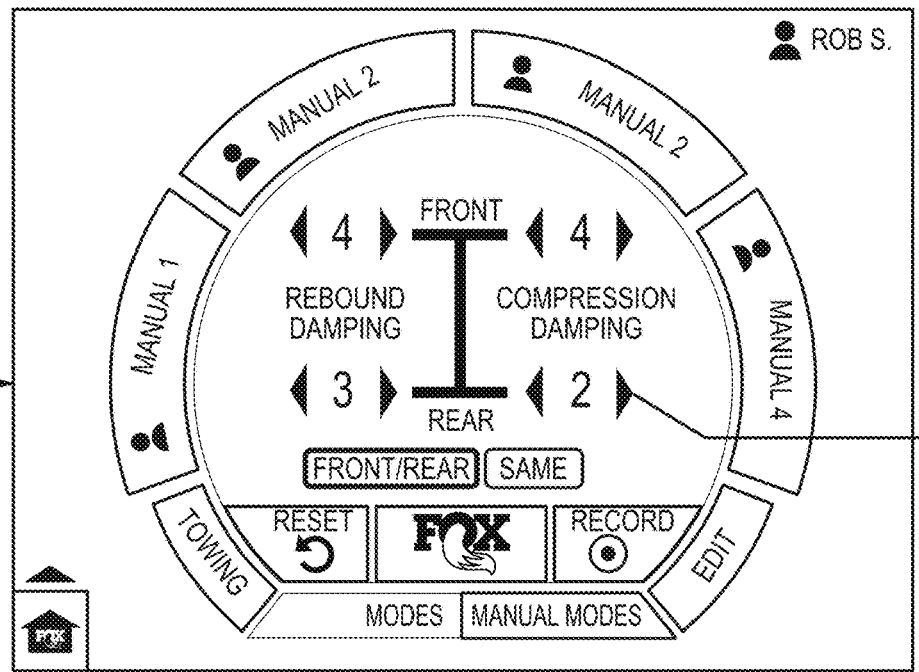
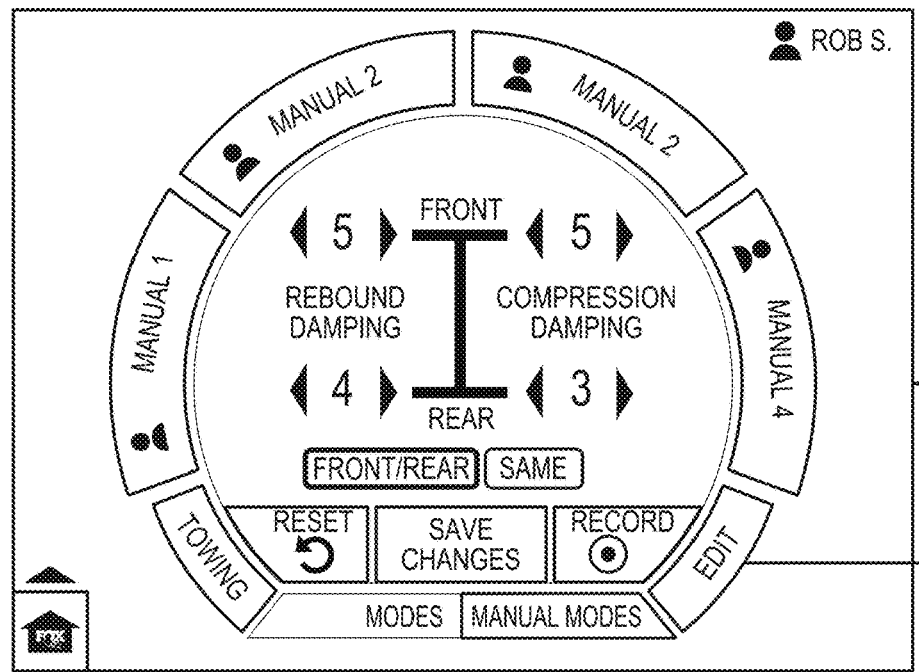
*FIG. 3A-3*

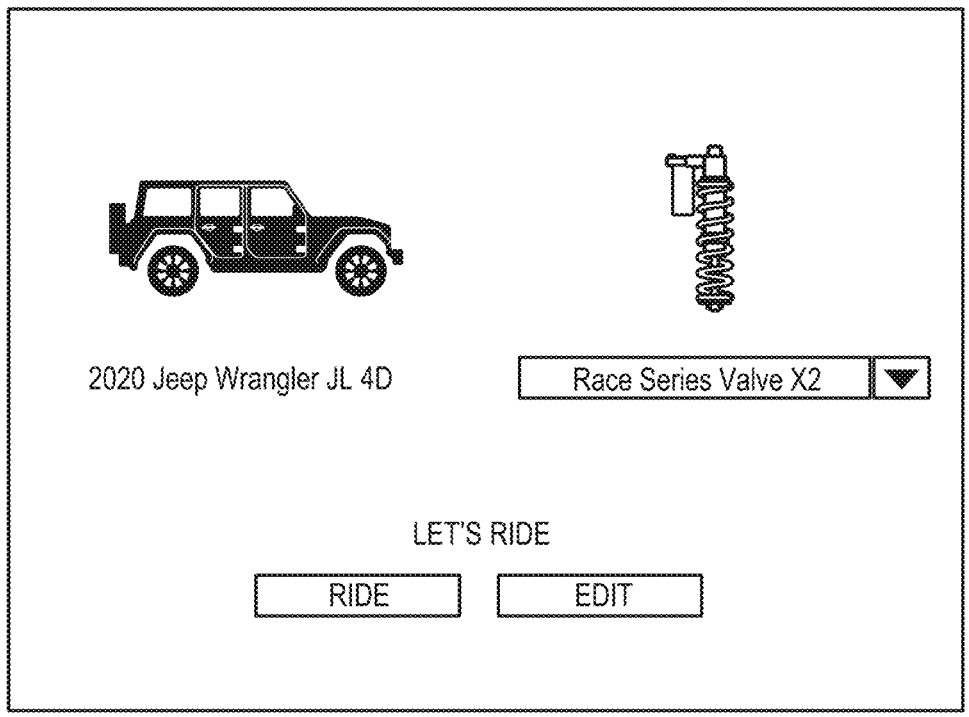
FIG. 3A-4

220

LIVE MODES

AVAILABLE MODES

| | MODE | DESCRIPTION | RIDE STYLE |
|---|---|---|---|
| | | FOX FACTORY ROCK ⓘ | BALANCED |
| | | MOAB ⓘ | PERFORMANCE |
| | | CASEY CURRIE ⓘ | ⬇ DOWNLOAD |
| | | WINDING WOODS ⓘ | PERFORMANCE |
| | | DRIFTING ⓘ | PERFORMANCE |
| | | VERTICAL CLIMB ⓘ | COMFORT |
| | | ⓘ | BALANCED |

Sidebar: MODES, RIDE STATS, GARAGE, TOOLS

221

VIEW MODE

| MODE ⇅ | DESCRIPTION ⇅ | FIRMNESS ⇅ |
|---|---|---|
| | FOX FACTORY ROCK ⓘ | ▭▭▭▬▬ |
| | MOAB ⓘ | ▭▭▭▭▬ |
| | CASEY CURRIE ⓘ | ⬇ DOWNLOAD |
| | WINDING WOODS ⓘ | ▭▭▭▭▬ |
| | DRIFTING ⓘ | ⬇ DOWNLOAD |
| | VERTICAL CLIMB ⓘ | ⬇ DOWNLOAD |

Sidebar: MODES, RIDE STATS, GARAGE, TOOLS

*FIG. 3B-1*

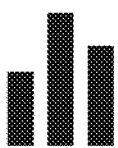

225

RIDE STATS

| | SELECT RIDE | | | |
|---|---|---|---|---|
| MODES | COURSE | DATE | MODE | MODE NAME |
| RIDE STATS | HABANERO FALLS | 02/22/20 | | FOX FACTORY ROCK |
| | POSION SPIDER MESA | 02/01/20 | | MOAB |
| GARAGE | KING OF HAMMERS | 01/17/20 | | KING OF HAMMERS |
| | CHOKECHERRY CANY. | 12/04/19 | | JASON SCHERER |
| TOOLS | ROAD ATLANTA | 11/27/19 | | FOX FACTORY ROAD |
| | RIVER ROCK ORV | 11/08/19 | | JASON SCHERER |
| | ROAD ATLANTA | 10/23/19 | | |

HABANERO FALLS
[BACK] FOX FACTORY ROCK | 02/22/20

SUSPENSION ▼

TOP OUTS
0

SHOCK VELOCITY (in/sec)
MIN. 9  MEAN 23  MAX. 57

BOTTOM OUTS
3

OIL TEMPERATURE (C)
MIN. 22  MEAN 27  MAX. 34

ROLL
MIN. -17  MEAN 3  MAX. 15

PITCH
MIN. -14  MEAN -4  MAX. 7

*FIG. 3B-2*

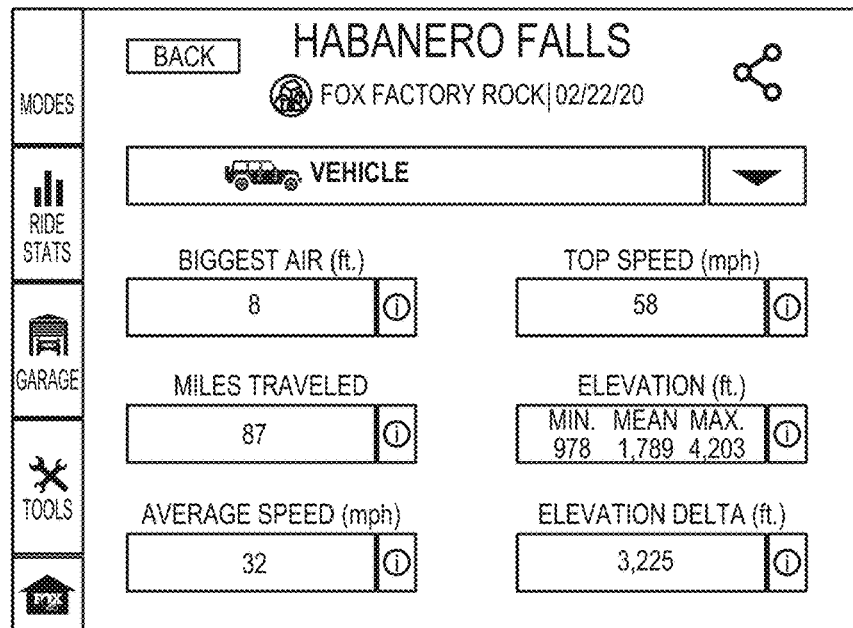
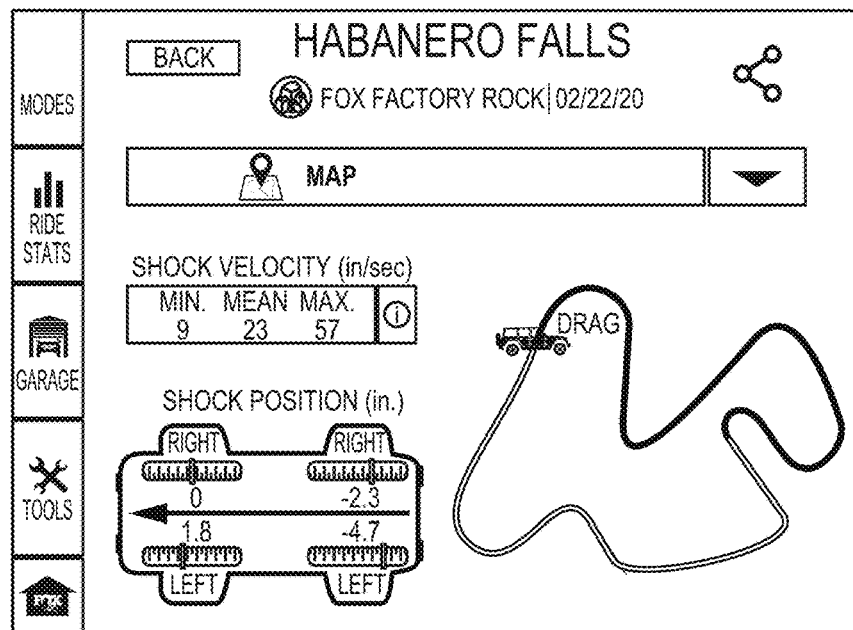
FIG. 3B-6

225 RIDE STATS

FOX FACTORY

SELECT RIDE

○ HABANERO FALLS

○ POISON SPIDER MESA

○ KING OF HAMMERS

○ CHOKECHERRY CANY...

○ ROAD ATLANTA

○ RIVER ROCK DRY

ROAD ATLANTA

230 GARAGE

FOX FACTORY

GARAGE

YOUR VEHICLES

- Car
- Motorcycle
- Side-by-Side
- Snow-Mobile

+ ADD NEW

235 TOOLS

FOX FACTORY

TOOLS

- TOTAL RIDE HOURS
- TUTORIAL VIDEOS
- TOUCHPOINT STATUS
- SOFTWARE UPDATES
- WIFI CONNECTION
- BLUETOOTH

*FIG. 5A*

ENERGY HARVESTING SWITCH

CROSS-REFERENCE TO RELATED APPLICATIONS (PROVISIONAL)

This application claims priority to and benefit of U.S. Provisional Patent Application No. 63/116,028 filed on Nov. 19, 2020, entitled "ENERGY HARVESTING SUSPENSION OVERRIDE SWITCH" by Stanford et al., and assigned to the assignee of the present application, the disclosure of which is hereby incorporated by reference in its entirety.

FIELD OF THE INVENTION

Embodiments of the present technology relate generally to an energy harvesting switch.

BACKGROUND

Current vehicle control switches often require an electrical connection from the switch via a cable and/or a slip-ring style connection, while aftermarket wireless switches require batteries that need to be replaced or recharged.

BRIEF DESCRIPTION OF THE DRAWINGS

Aspects of the present invention are illustrated by way of example, and not by way of limitation, in the accompanying drawings, wherein:

FIGS. 3B, and 3B-1 through 3B-8 are an index (FIG. 3B) and corresponding flow diagrams of an expansion to an exemplary set of IVI system screens and capabilities of FIGS. 2A-2D, in accordance with an embodiment.

FIGS. 3C, and 3C-1 through 3C-3 are an index (FIG. 3C) and corresponding flow diagram of an expansion to an exemplary set of IVI system screens and capabilities of FIGS. 2A-2D, in accordance with an embodiment.

FIGS. 4A, and 4A-1 through 4A-5 are an index (FIG. 4A) and corresponding flow diagram of a first portion of an exemplary set of IVI system screens and capabilities on a mobile device, in accordance with an embodiment.

FIGS. 4B, and 4B-1 through 4B-6 are an index (FIG. 4B) and corresponding flow diagram of a second portion of an exemplary set of IVI system screens and capabilities on a mobile device, in accordance with an embodiment.

FIGS. 4C, and 4C-1 through 4C-6 are an index (FIG. 4C) and corresponding flow diagram of a third portion of an exemplary set of IVI system screens and capabilities on a mobile device, in accordance with an embodiment.

FIG. 5A is a diagram of a number of screenshots of the mobile device, in accordance with an embodiment.

FIG. 6 is a system diagram including a remote digital suspension adjuster, in accordance with an embodiment.

FIG. 8 is a system block diagram of the vehicle suspension management system with a mobile device, in accordance with an embodiment.

Figure 1A:
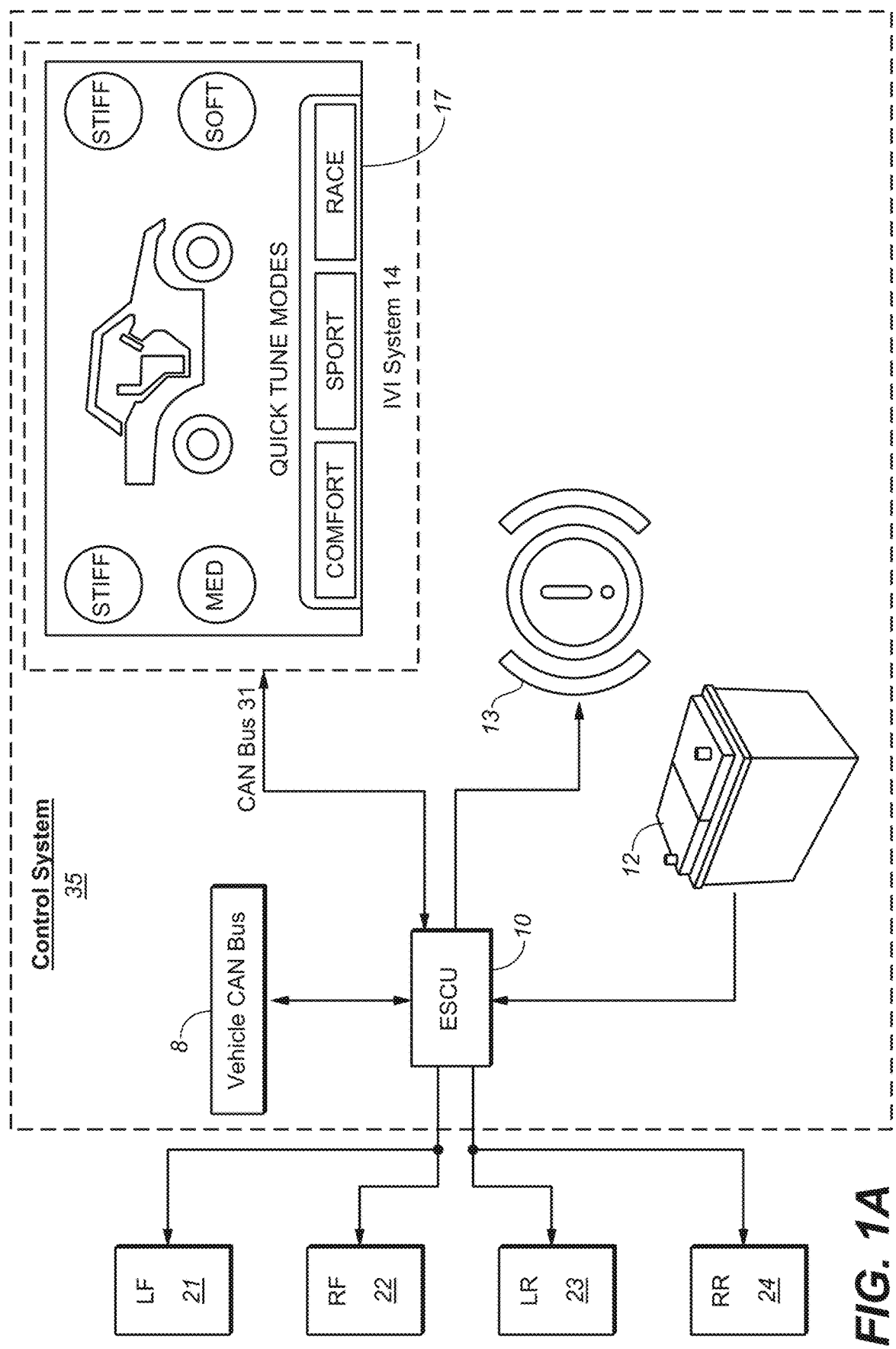
FIG. 1A is a block diagram of a modular electronic vehicle suspension control system in communication with an IVI system, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In general, a suspension system for a vehicle provides a motion modifiable connection between a portion of the vehicle that is in contact with a surface and some or all of the rest of the vehicle that is not in contact with the surface. For example, the portion of the vehicle that is in contact with the surface can include one or more wheel(s), skis, tracks, hulls, etc., while some or all of the rest of the vehicle that is not in contact with the surface include suspended portions such as anything on a frame, a seat, handlebars, engines, cranks, etc.

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

In an airplane in flight, it is the airframe that is in contact with the surface being traversed (e.g., the air) while a shock assembly and/or other suspension components will be coupled between the airframe and the suspended portion(s) of the vehicle (such as the seats and the like).

As vehicle utilization scenarios change, one or more shock assemblies of the suspension system can be adjusted for different characteristics based on the use type of the vehicle, terrain, purpose (e.g., rock crawl, normal use, race set-up, etc.), and the like. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its SAG setting as quickly as possible in preparation for the next encounter.

In contrast, a street bike racer (track racing vehicle, boat/PWC racer, etc.) would want a firmer suspension configuration with a very small range of motion to provide feel for the grip of the tire, maintain friction and/or aerodynamic geometries, and the like, in order to obtain the maximum performance from the vehicle.

In a normal use scenario, such as a trip to the local store, a ride around town or on a path, a drive to grandma's house, a boat ride out on a lake, etc., one choice for the suspension configuration would be based on providing the most comfort.

In one embodiment, there may be times where changes to a suspension component are desired during a given ride/drive. For example, a bike rider in a sprinting scenario would often want to firm up or possibly even lockout the suspension component to remove the opportunity for rider induced pedal bob. Similarly, a ride/drive from a paved road to an off-road environment (or vice-versa) would also be a time when a change to one or more suspension component settings is valuable. For purposes of the following discussion, lockout refers to the most restricted flow state attainable or desirable. Thus, in one embodiment, lockout refers to a stoppage of all fluid flow through a given fluid path. However, in another embodiment, lockout does not stop all the fluid flow through a given fluid path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the damper has been reduced to a minimum size for a given damper, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

In the following discussion, the term ride height refers to a distance between a portion of a vehicle and the surface across which the vehicle is traversing. Often, ride height is based on one or more of a number of different measurements such as, but not limited to, a distance between a part of the vehicle and the ground, a measurement between the top of an unsprung portion of a vehicle and a suspended portion of the vehicle there above, etc. For example, a portion of the wheel(s) (or ski, track, hull, etc.) will be in contact with the surface, while one or more shock assemblies and/or suspension components maintain the suspended portion of the vehicle a certain height there above.

In one embodiment using a wheeled vehicle example, a portion of the wheel will be in contact with the surface while a shock assembly and/or other suspension components will be coupled between a wheel retaining assembly and the suspended portion of the vehicle (often a portion of the vehicle frame). The ride height is established by the geometries of the shock assembly and/or other suspension components, the wheel retaining assembly, the wheel and tire profile, and the like.

Similarly, in a snow machine, a portion of the track (and similarly the skis) will be in contact with the surface while a shock assembly and/or other suspension components will be coupled between a track retaining assembly (and similarly the skis retaining assembly) and the suspended portion of the vehicle (often a portion of the vehicle frame). Here again, the ride height is established by the geometries of the shock assembly and/or other suspension components, the track and ski retaining assemblies, the track and/or ski profile, and the like.

In one embodiment, such as a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like). Here again, the ride height is established by the geometries of the shock assembly and/or other suspension components, with respect to the hull and the suspended portion(s) of the vehicle.

The term initial SAG settings or "SAG" refers to a pre-defined vehicle ride height and suspension geometry based on the initial compression of one or more shock assemblies of the suspension system for a given vehicle when it is within its normal load envelope configuration (e.g., with a rider/driver and any initial load weight). Once the SAG is established for a vehicle, it will be the designated ride height of the vehicle, until and unless the SAG is changed.

The SAG for a vehicle is usually established by the manufacturer. The vehicle SAG can then be modified and/or adjusted by an owner, a mechanic, or the like. For example, an owner can modify the SAG to designate a new normal ride height based on a vehicle use purpose, load requirements that are different than the factory load configuration, an adjustment modification and/or replacement of one or more of the suspension components, a change in tire size, a performance adjustment, aesthetics, and the like.

In one embodiment, the initial manufacturer will use SAG settings resulting in a pre-established vehicle ride height based on vehicle use, size, passenger capacity, load capacity, and the like. For example, a truck (side-by-side, car, or the like) may have a pre-established SAG based on an expected load (e.g., a number of passengers, an expected cargo requirement, etc.).

Regardless of the vehicle type, once the SAG is established, in a static situation the ride height of the expectedly loaded vehicle should be at or about the established SAG. When in motion, the ride height will change as the vehicle travels over the surface, and while the suspension system is used to reduce the transference of any input forces received from the surface to the rest of the vehicle it is also used to maintain the vehicle's SAG.

However, when additional weight is added to the vehicle, the suspension and one or more shock assemblies will be compressed, and the vehicle ride height will be less than the SAG.

For example, if a vehicle such as a snow machine, PWC, boat, motorcycle, or bicycle is loaded with an additional 100 lbs. of cargo in the rear, the extra 100-pound load will cause shock assembly compression (and the like) thereby causing the vehicle to ride lower in the rear (or to ride in a bow up orientation). In general, skewed rear-low ride height will move the vehicle out of SAG and change the vehicle geometry, e.g., cause a slant upward from rear to front. Often, an out of SAG condition is visually identifiable and in this particular example can result in lightness in steering, rear suspension bottom out, forward visual obstruction, and the like.

In one embodiment, for example in a side-by side that is loaded with 250 lbs. of additional weight, the additional weight will reduce the available operating length of one or more suspension components which can be detrimental to steering and performance characteristics, could cause an unwanted impact between wheel (or wheel suspension) and frame, increase the roughness of the ride, increase suspension stiffness, result in suspension bottom out, loss of control, tire blow out, and the like.

In one embodiment, for example in a truck that is loaded with 500 lbs. of additional weight, when the weight is added to the vehicle, if it is not centered, it will not only cause a change in the front or rear SAG (depending upon the load location fore or aft), but will also cause SAG changes that will differ between the left and right side of the vehicle. For example, if the load is in the rear and off-center to the left, the load-modified ride-height of the vehicle will be lopsided. That is, not only will the rear of the vehicle be lower than the front, but the left-side suspension will also be compressed more than the right-side suspension causing the rear left of the vehicle to have a lower ride-height than the other three corners.

In contrast to the examples above, when the weight on the vehicle (e.g., rider, passengers, cargo, etc.) is less than the expectedly loaded vehicle weight, the suspension and one or more shock assemblies will be less compressed, and the vehicle ride height will be higher than the SAG. This lighter loaded situation can also result in a number of deleterious issues including, but not limited to: improper seat height (e.g., a rider will be higher off the ground than expected), change in vehicle height clearance, suspension top-out, suspension issues caused by the vehicle operating outside of the operating envelope for the suspension, and the like.

Additional information regarding SAG and SAG setup can be found in U.S. Pat. No. 8,838,335 the content of which is incorporated by reference herein, in its entirety.

In the following discussion, the term "active", as used when referring to a valve or shock assembly, means adjustable, manipulatable, etc., during typical operation of the valve. For example, an active valve can have its operation changed to thereby alter a corresponding shock assembly characteristic from a "soft" setting to a "firm" setting by, for example, adjusting a switch in a passenger compartment of a vehicle. Additionally, it will be understood that in some embodiments, an active valve may also be configured to automatically adjust its operation, and corresponding shock assembly characteristics, based upon, for example, operational information pertaining to the vehicle and/or the suspension with which the valve is used. Similarly, it will be understood that in some embodiments, an active valve may be configured to automatically adjust its operation, and corresponding shock assembly characteristics, based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or shock assembly means manually adjustable, physically manipulatable, etc., without requiring disassembly of the valve, damping component, or shock assembly which includes the valve or damping component. In some instances, the manual adjustment or physical manipulation of the valve, damping component, or shock assembly, which includes the valve or damping component, occurs when the valve is in use. For example, a manual valve may be adjusted to change its operation to alter a corresponding shock assembly characteristic from a "soft" setting to a "firm" setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension").

In a conventional "fully active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

In the following discussion, and for purposes of clarity, a car is utilized as the example vehicle showing the energy harvesting switch operating thereon. However, in another embodiment, the energy harvesting switch is an energy harvesting suspension changing switch. In one embodiment, the energy harvesting switch is used on any one of a variety of vehicles such as, but not limited to, a bicycle, an electric bike (e-bike), a motorcycle, a watercraft, a snow machine, a 3-4 wheeled vehicle, a multi-wheeled vehicle, a side-by-side, a car, a truck, or the like.

In one embodiment, the energy harvesting switch is used to transmit a wireless signal that is intended to be received by a suspension component of a vehicle. In one embodiment, the suspension component is controlled by an electronic vehicle damping control system. In one embodiment, the energy harvesting switch is similar in operation to the touch point disclosed herein.

In one embodiment, the energy harvesting switch signal causes the electronic vehicle damping control system to make a near-instantaneous suspension change to one or more components of the vehicle suspension. In one embodiment, the electronic vehicle damping control system is integral with a suspension component such as shock absorber. In another embodiment, the electronic vehicle damping control system is communicatively coupled with one, a number, or all of the active suspension components of the vehicle via one or more of the components of the electronic damping control system or the in-vehicle infotainment (IVI) system described herein.

Overview

IVI systems are a growing and continuously evolving area of vehicle management, performance, information, and customer desire. IVI systems continue to be one of the bleeding edges of vehicle invention and innovation. The IVI market is growing rapidly and expected to surpass USD 30 billion by 2023.

Initially, a vehicle had a number of buttons, knobs and switches on a number of separate systems that controlled different aspects of the vehicle environment. The separate systems included items such as radios, environmental controls (e.g., heating and cooling), manual or analog gauges (to provide engine information such as oil pressure, engine temperature, RPMs, Speed, mileage, etc.). The radio was tuned with knobs along the AM and FM dial and navigation was performed by Rand McNally™ the Thomas brothers Guide™, a gas station map, and even via seat-of-the-pants driving.

One of the predecessors of the IVI system was the introduction of a small digital display on a head unit of a radio that also included a processor and a bit of memory. This upgrade came with the introduction of digital radio tuning, preprogrammed equalizer settings, and the like. As the digital radio established its dominance over the analog radio, the radio components became more advanced and the display grew in formfactor and capabilities. The radio became a quasi-computer with a processor, a memory, a display and user input devices. As such, the radio and its display became the place to present radio information and audio "sound stage" adjustments to the vehicle driver (or copilot-depending upon the rules of the vehicle). The radio stations also began to broadcast data meant for the radio along with the AM and FM broadcasts. This data could include a station name, genre, and even artist and song name. With the introduction of the CD player, the radio could be programmed, or just read a program, that was stored on the CD. Initially, this could be artist info, lyrics, album cover art, and the like. During this period, the radio became a vehicle entertainment system.

With the introduction of satellite navigation (e.g., GPS and the like), a GPS antenna, receiver and display allowed a person to obtain their location and track their location. Initially, the GPS receiver system was cumbersome and required a large battery (car battery size). The vehicle entertainment system makers realized that their head units in the vehicle were already powered by a car battery, had the computing power to run the GPS program, had the input capability to receive information from a user, and had a display capable of presenting the dynamic navigation maps. All that was needed was the GPS antenna. As vehicle entertainment systems began to include GPS capabilities the required programming stewarded in another growth in display screen size, data storage requirements, and processing capabilities. In many cases, the needed programs that initially allowed the radio system to provide the navigation capability used a navigation CD and/or information downloaded from the CD to the head unit memory.

Once the vehicle entertainment system started to provide these interactive capabilities such as control of the radio (tuning, sound stage, equalizer, etc.) and the presentation of interactive programs such as navigation, weather information, and the like. The "radio" became the initial IVI system.

Similarly, as the computer capabilities (both hardware and software) continue to grow and computer component size and cost continue to shrink, vehicle manufactures have (and continue to) developed a number of different computer-based systems to replace the older analog systems. These systems included environmental controls, digitized gauges, digital and computer monitored engine systems (e.g., digital fuel injection, removal of the analog choke, and monitored engine performance, settings, and adjustment, etc.), and the like. Moreover, due to an unending continuation of research, invention, exploration, and innovation, numerous computer-based systems continue to be developed to replace vehicle analog systems and added to vehicles as new (previously non-existent) components. At the same time, existing computerized systems are constantly being enhanced and upgraded.

As the different stand-alone systems became digitized, IVI system builders in conjunction with vehicle manufacturers started to integrate these systems into the IVI. For example, the different components were interconnected with standardized communication protocols such as a controller area network (CAN), a low-voltage differential signaling (LVDS), and the like. In general, these communication protocols allow the different devices to communicate directly via applications without the need for a host computer. Moreover, additional display screens could be used by the IVI system. For example, the instrument cluster became an IVI screen, a heads-up display (HUD) was part of the IVI system, etc.

By integrating environmental controls into the IVI, vehicle manufacturers are able to clean up dash space to allow IVI systems to include large displays. Moreover, the consolidation of systems in the IVI reduces redundancy, saving both weight and cost. In one embodiment, applications and features are presented in different application menus on the IVI display. Menus such as, for example, entertainment, environmental, navigation, connectivity, and the like. Each of the menus will include sub apps and features. For example, the entertainment menu could include sub-categories such as sound stage, equalizer, etc. The environmental menu could include sub-categories such as heating, cooling, defrost, heated/cooled seats/steering wheels/mirrors, different settings for different vehicle quadrants, etc. The navigation menu could include sub-categories such as maps, locations, food locations, traffic, etc. The connectivity menu could include sub-categories such as, WiFi, in-car internet, Bluetooth™ and USB connectivity, user's mobile device paring with the IVI, and the like.

Thus, IVI systems, like computer systems, enable upgradeability to users, OEs, dealers, service centers, and the like, where the upgrade can be performed with an IVI application much like a computer application is loaded onto a computer, or much like applications that run on smart devices such as mobile phones, tablets and the like.

Presently, IVI systems are beginning to include advanced driver-assistance systems (ADAS) which rely on input from multiple data sources to provide driver assistance and increase driver awareness. For example, ADAS can use imaging capabilities such as back-up, front, and/or side cameras, and distance and/or pre-impact sensors such as LiDAR, radar, image processing, and the like, to increase driver awareness. ADAS is also being developed to enhance driving safety by presenting alert information to the driver. The alerts can indicate events such as traffic warnings, lane departure warnings, blind spot indicator lights, and the like. These alerts can be presented to the driver visually via one or more displays or lights, audibly, via haptic feedback, and the like. This information is presented to the user with a goal of increased safety and driver awareness.

In future IVI systems, there will continue to be a lot of invention, experimentation, research, and development into active ADAS in the IVI system that will provide automated driverless assistance such as adaptive cruise, collision/pedestrian avoidance, driverless valet, and even autonomous vehicles.

Embodiments described herein provide a new and different system and set of vehicle performance capabilities to the IVI system. That is, the following discussion provides a novel way of integrating active vehicle suspension into the IVI system. One embodiment provides a method and system for incorporating the active suspension features and capabilities into the IVI system for automatic and driver accessible modifications to the suspension. One embodiment provides a method and system that uses a mobile device to interact with the IVI system and the active suspension to perform the automatic and driver accessible modifications to the suspension via the mobile device. One embodiment provides a method and system that uses a mobile device (key fob, or other smart device) to identify a specific driver to the IVI system and, in so doing, cause the IVI system to adjust the active suspension to the specific driver's customized preset suspension settings.

One embodiment provides a method and system that allows a mobile device (or the IVI system) to upload and download active suspension tunes to provide a customized configuration for the suspension. For example, a suspension tune could be shared (e.g., provided or received) via the Internet or another communications protocol. The sharing site could be a social media site, a website, a manufacturers site, a suspension component site, or the like. In one embodiment, the shared active suspension tunes could be based on a location, a terrain type, a similar vehicle with a similar suspension configuration, another vehicle that has already traversed the area, a specific driver's set-up, and the like.

Variable spring with deaden active coils-springdex style for example. A mechanism for selectively binding coils of a coil spring to change the effective rate of the spring for purposes of maintaining ride frequency with increased payload. Remotely and/or electronically engaging/disengaging the mechanism for different load conditions.

Referring now to FIG. 1A, a block diagram of a modular electronic vehicle suspension control system is shown in accordance with an embodiment. Modular electronic vehicle suspension control system includes a plurality of shock assemblies 21-24, an electronic vehicle suspension control system 35 and suspension control application 17 on IVI system 14. Although a modular electronic vehicle suspension control system is shown in FIG. 1A, it should be appreciated that in one embodiment, the vehicle suspension control system is not modular.

Figure 1B:
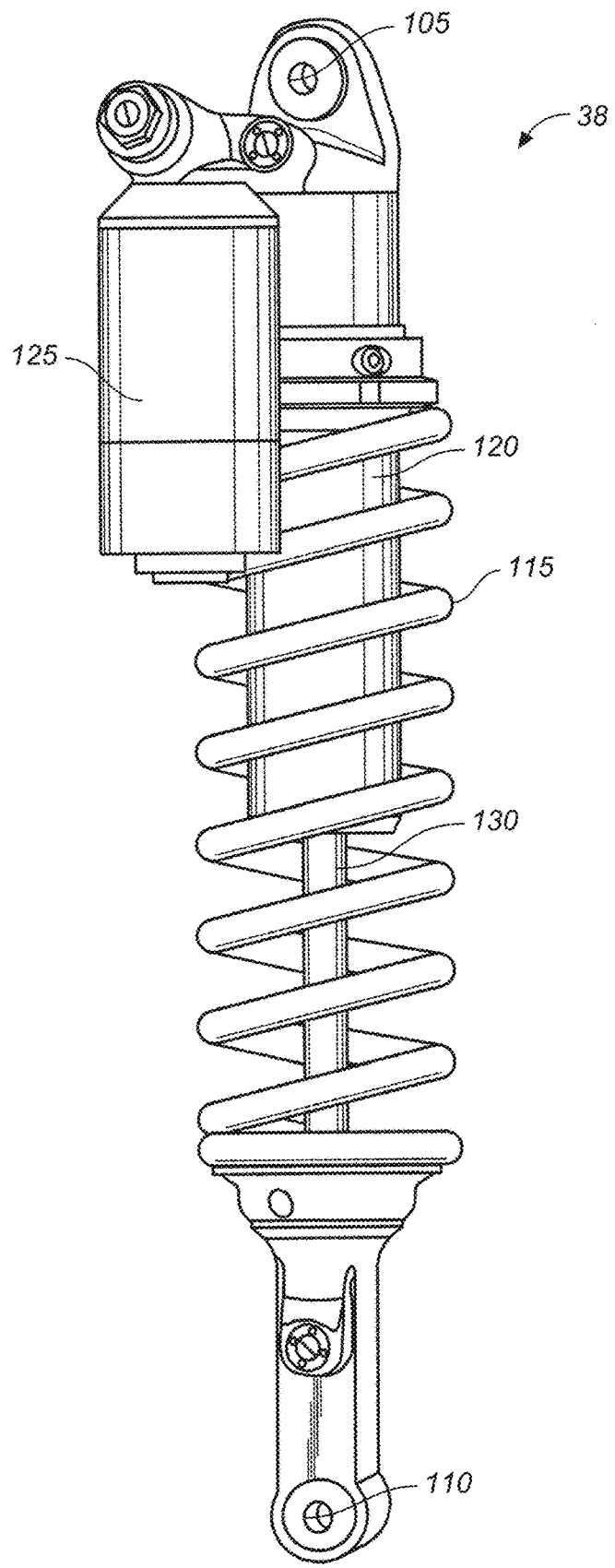
FIG. 1B is a perspective view of a shock assembly, in accordance with an embodiment.

Referring now to FIG. 1B, a perspective view of a shock assembly 38 portion of a vehicle suspension (as described in FIG. 1A) is shown in accordance with one embodiment. In one embodiment, shock assembly 38 (which is similar to one or more of shock assemblies 21-24 of FIG. 1A) includes eyelets 105 and 110, housing 120, helical spring 115, piston shaft 130, and piggyback (or external reservoir 125). In one embodiment, external reservoir 125 is described in U.S. Pat. No. 7,374,028 the content of which is incorporated by reference herein, in its entirety.

In one embodiment, the housing 120 includes a piston and chamber and the external reservoir 125 includes a floating piston and pressurized gas to compensate for a reduction in volume in the main damper chamber of the shock assembly 38 as the piston shaft 130 moves into the housing 120. Fluid communication between the main chamber of the shock assembly and the external reservoir 125 may be via a flow channel including an adjustable needle valve. In its basic form, the shock assembly works in conjunction with the helical spring and controls the speed of movement of the piston shaft by metering incompressible fluid from one side of the piston to the other, and additionally from the main chamber to the reservoir, during a compression stroke (and in reverse during the rebound or extension stroke).

Although a coil sprung shock assembly is shown in FIG. 1B, this is provided as one embodiment and for purposes of clarity. In one embodiment, the shock assembly 38 could be a different type such as, but not limited to, an air sprung fluid shock assembly, a stand-alone fluid shock assembly, and the like.

Referring again to FIGS. 1A and 1B, in one embodiment, there is at least one shock assembly (such as shock assembly 38), of the plurality of shock assemblies, located at each of a vehicle suspension location (e.g., at each wheel, ski, skid, belt, swing arm, or the like). For example, in a four wheeled vehicle there would be shock assembly 21 at the left front, shock assembly 22 at the right front, shock assembly 23 at the left rear, and shock assembly 24 at the right rear.

In one embodiment, the plurality of shock assemblies, e.g., shock assemblies 21-24, are selected from the shock assembly types such as, an in-line shock assembly, a piggyback shock assembly, a compression adjust only shock assembly, a rebound adjust only shock assembly, an independent compression and rebound adjust shock assembly, a dependent compression and rebound adjust single valve shock assembly, and the like. Additional information for vehicle suspension systems and their components as well as adjustment/modification/replacement aspects including manually, semi-actively, and/or actively controlled aspects and wired or wireless control thereof is provided in U.S. Pat. Nos. 8,838,335; 9,353,818; 9,682,604; 9,797,467; 10,036,443; 10,415,662; the content of which are incorporated by reference herein, in their entirety.

Although electronic vehicle suspension control system 35 is shown as interacting with four shock assemblies 21-24 such as would be likely found in a four wheeled vehicle suspension configuration, it should be appreciated that the technology is well suited for application in other vehicles with different suspension configurations. The different configurations can include two-wheel suspension configuration like that of a motorcycle; a one, two or three "wheel" suspension configuration like that of a snowmobile, trike, or boat, a plurality of shock assemblies at each of the shock assemblies 21-24 suspension locations such as found in off-road vehicles, UTV, powersports, heavy trucking, RV, agriculture, maritime, and the like.

In one embodiment, electronic vehicle suspension control system 35 includes electronic suspension control unit (ESCU) 10, vehicle CAN bus 8, CAN Bus 31 to IVI system 14, warning indicator 13, and battery 12. It should be appreciated that in an embodiment, one or more components shown within electronic vehicle suspension control system 35 would be located outside of electronic vehicle suspension control system 35, and similarly additional components would be located within electronic vehicle suspension control system 35. In general, vehicle CAN bus 8 could be any vehicle communication bus and CAN bus 31 could be Ethernet, LIN, or other digital communication bus.

In one embodiment, the suspension control application 17 on IVI system 14 utilizes a communication protocol that basically anonymizes the vehicle CAN data. For example, in one embodiment of a standard OS for IVI system 14, the anonymized communication protocol is android automotive (which is different than Android Auto).

In one embodiment, the anonymized communication protocol utilizes a structure such as Vehicle Hardware Abstraction Layer (VHAL) to define certain properties OEMs can implement. In general, VHAL is a layer between the suspension control application 17 (running on IVI system 14) and the individual ECUs of the vehicle that communicate over CAN. In other words certain vehicle properties are accessible in the VHAL anonymized communication protocol without needing to know the exact CAN message. In one embodiment, the VHAL anonymized communication protocol allows suspension control application 17 to include an API that defines certain vehicle properties it would like to subscribe to such as, for example, PERF_STEERING_ANGLE (e.g., a property name).

Thus, in one embodiment, suspension control application 17 does not need to see the raw CAN data. As a result, the OEM can send suspension control application 17 the anonymized property instead of the RAW CAN message. In so doing, one embodiment creates a universal way of interfacing that is OE agnostic and does not require suspension control application 17 to know the individual CAN IDs/messages, which will keep the vehicle secure and stable. In one embodiment, in addition to (or in place of) the "standard" set of Android anonymized properties, suspension control application 17 can include and use its own set of custom anonymized properties as part of its API (e.g., roll, pitch, yaw . . . etc.). In one embodiment, the custom anonymized properties developed for suspension control application 17 can be provided to the OEs for implementation in order to facilitate additional/enhanced/modified interface capabilities between the individual ECUs of the vehicle and suspension control application 17.

In one embodiment, inputs to the suspension control application 17 on IVI system 14 may not necessarily be received as an input from a sensor. For example, another type of input received by the suspension control application on the IVI system 14 may be a combined input generated based on a calculation from multiple sensory inputs. For example, an OE uses occupant sensors to determine a combined input to the IVI system 14; e.g., 3 sensors active might indicate one driver and two rear passengers, three front occupants on a bench seat, or the like. In one embodiment, the OE could choose to code all of the different combinations of occupant configurations to unique identifiers that are then delivered under the custom anonymized properties, Android automotive protocol, or the like.

In one embodiment, ESCU 10 includes a processor. In operation, both compression and rebound oil flows through independent sophisticated multistage blended circuits in ESCU 10 to maximize suspension control. In one embodiment, ESCU 10 will control each of the plurality of shock assemblies located at each vehicle wheel suspension location, determine a type of shock assembly at each vehicle wheel suspension location, automatically tune a vehicle suspension based on the determined type of shock assemblies at each vehicle wheel suspension location, automatically monitor the plurality of shock assemblies and determine when a change has been made to one or more of the plurality of shock assemblies, and automatically re-tune the vehicle suspension based on the change to one or more of the plurality of shock assemblies.

In one embodiment, if there is no suspension control application 17 on IVI system 14 communicating with the modular electronic vehicle suspension control system 35, the suspension configuration will be identified on the display of IVI system 14 by a warning indicator 13.

As described herein, IVI system 14 will include a GUI and suspension control application 17 on IVI system 14 will present a suspension configuration and operational information about the suspension configuration, e.g., vehicle suspension settings and the like, in a user interactive format, on the IVI system 14 GUI located in the vehicle.

In one embodiment, suspension control application 17 on IVI system 14 will present vehicle suspension setting information in a user interactive format on a display, where the IVI system 14 will have a touch input capability to receive an input from a user. In one embodiment, as described herein, suspension control application 17 on IVI system 14 is also programmable to present suspension configuration information, rebound configuration information and/or suspension setting information in a user interactive format on a display.

In one embodiment, vehicle suspension setting information can additionally include ride height and air pressure adjustments for the dampers/shock assemblies which are displayed to a driver or passenger in a GUI such as an infotainment system, where the infotainment system or other device will provide an ability for the user to monitor/modify/or the like, one or more of the suspension settings. Further discussion and examples of a control system are described in U.S. Pat. No. 10,933,710, the content of which is incorporated by reference herein, in its entirety.

In one embodiment, the vehicle suspension setting information can include a plurality of different vehicle suspension mode configurations, settings and the like as shown in FIG. 1A and in further detail in FIGS. 2A-3C-3. In one embodiment, suspension control application 17 on IVI system 14 will also provide identification of which configuration or mode is currently active on the vehicle suspension. In one embodiment, the plurality of different vehicle suspension mode configurations is user selectable.

If one or more of shock assemblies 21-24 are automatically adjustable, in one embodiment, suspension control application 17 on IVI system 14 will automatically adjust one or more of the pluralities of shock assemblies of the tuned vehicle suspension based on external conditions such as, weather, terrain, ground type (e.g., asphalt, concrete, dirt, gravel, sand, water, rock, snow, etc.), and the like.

In one embodiment, suspension control application 17 on IVI system 14 will automatically adjust one or more of the pluralities of shock assemblies (shock assemblies 21-24) of the tuned vehicle suspension based on one or more sensor inputs received from sensors such as an inertial gyroscope, an accelerometer, a magnetometer, a steering wheel turning sensor, a single or multi spectrum camera, a lidar and/or radar, and the like.

In one embodiment, the electronic vehicle suspension control system 35 characteristics displayed by suspension control application 17 on IVI system 14 can be set at the factory, manually adjustable by a user, or automatically adjustable by a computing device using environmental inputs and the like. In one embodiment, the adjustable characteristics for the shock assemblies 21-24 are adjusted based on a user input. For example, via user interaction with IVI system 14 and the menus, configurations, and options such as shown in the IVI system suspension control application 17 presented in FIGS. 2A-3C-3.

Figure 1C:
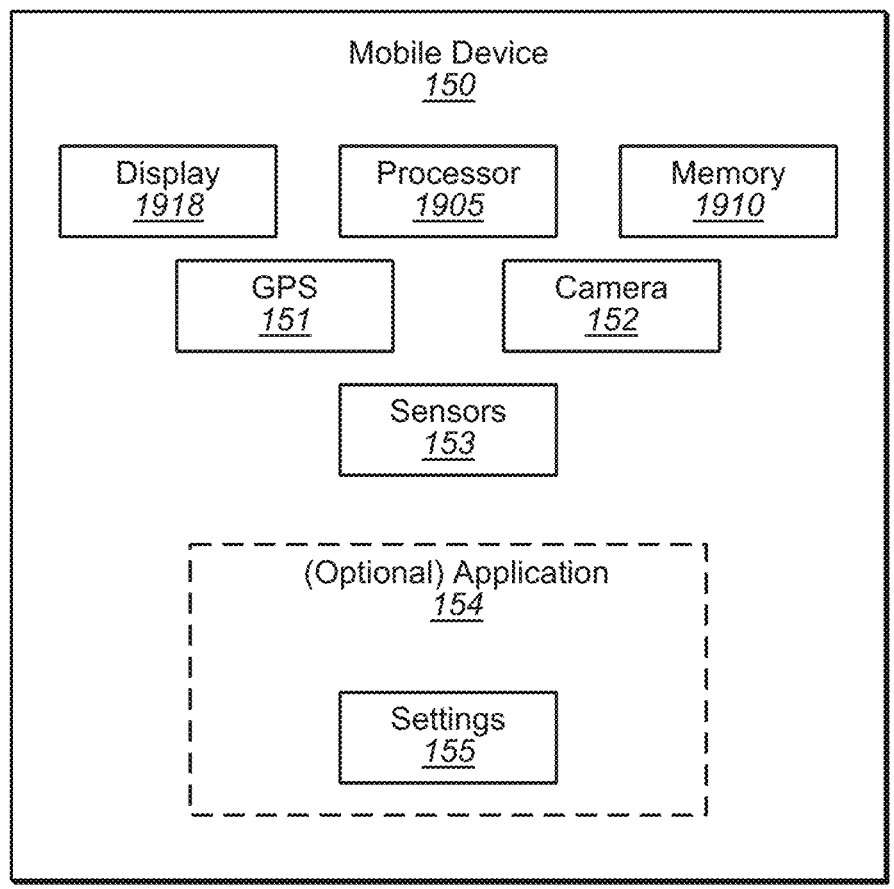
FIG. 1C is a block diagram of a mobile device, in accordance with an embodiment.
Figure 2A:
FIGS. 2A-2D are flow diagrams of an exemplary set of IVI system screens and capabilities, in accordance with an embodiment.
Figure 2A:
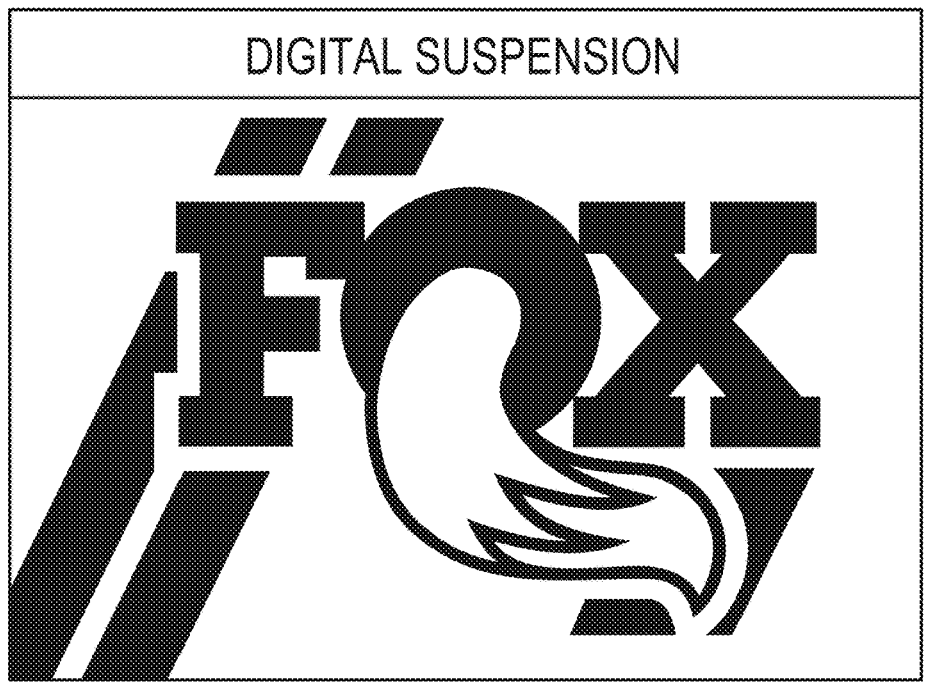
Figure 2A:
Figure 2B:
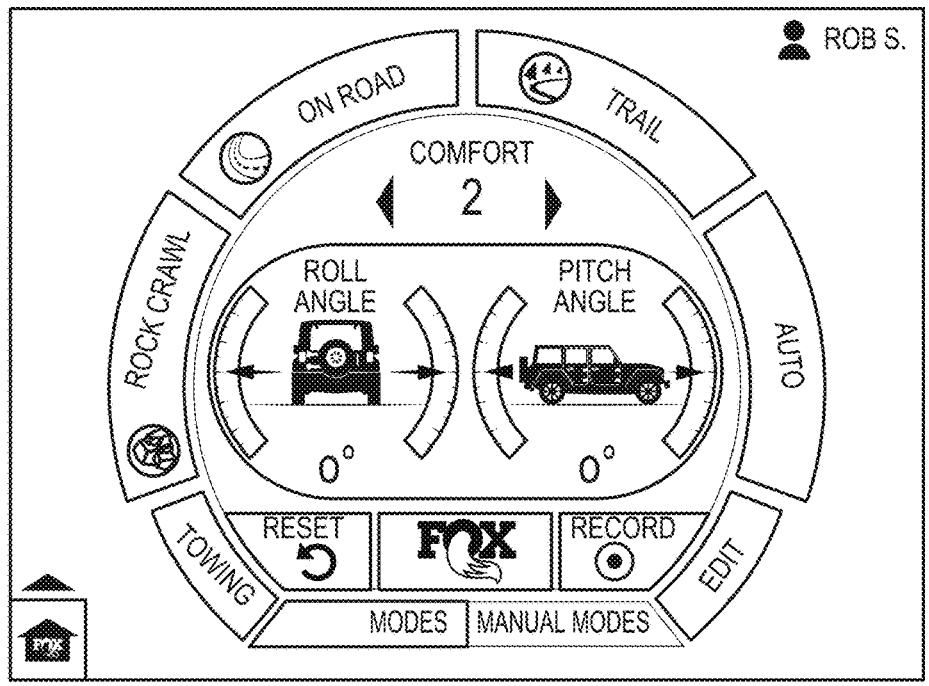
Figure 2C:
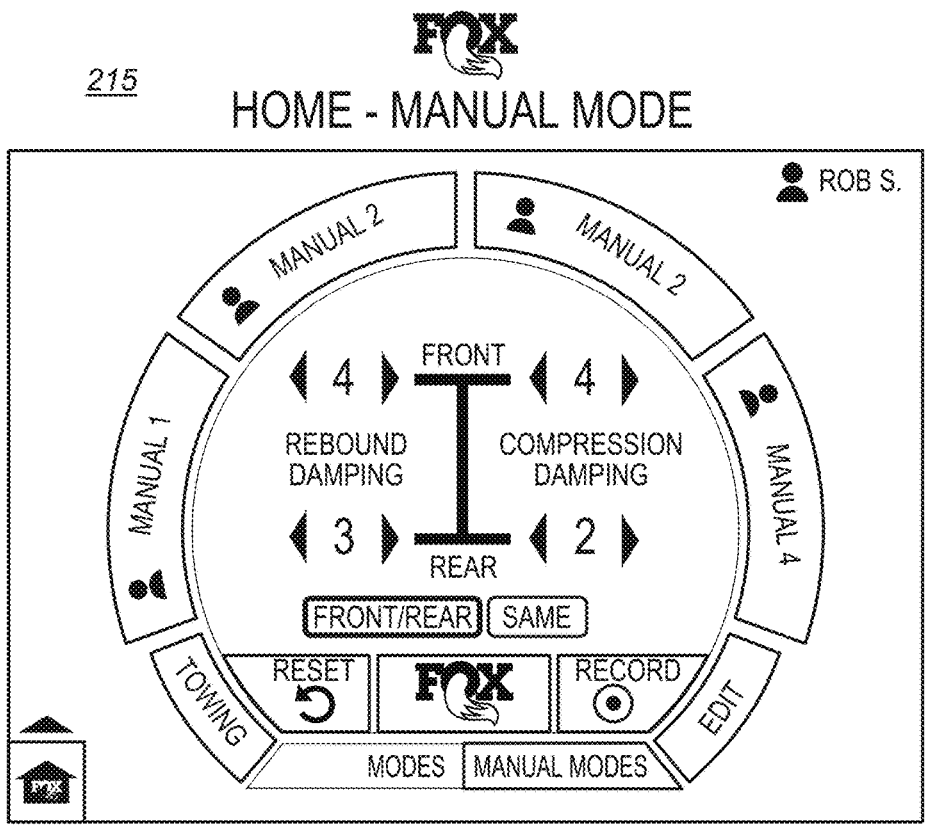
Figure 2C:
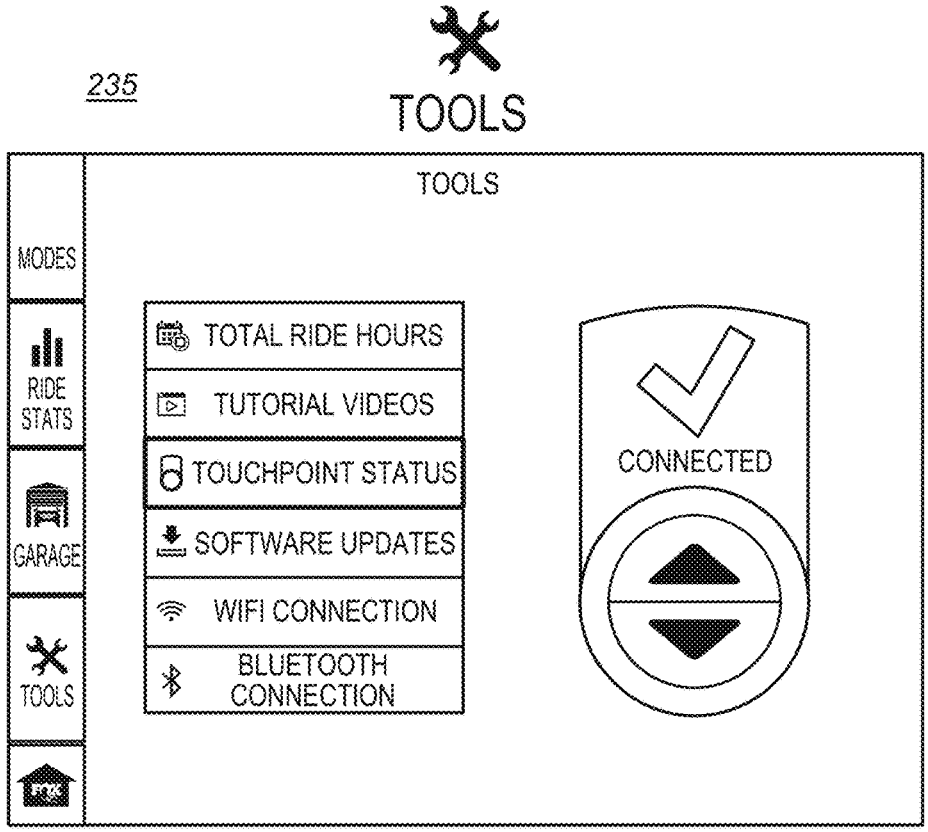
Figure 2D:

Referring now to FIG. 1C, a block diagram of a mobile device 150 is shown. Although a number of components are shown as part of mobile device 150, it should be appreciated that other, different, more, or fewer components may be found on mobile device 150.

In general, mobile device 150 is an example of a smart device. Mobile device 150 could be a mobile phone, a smart phone, a tablet, a smart watch, a piece of smart jewelry, smart glasses, or other user portable devices having wireless connectivity. In one embodiment, mobile device 150 is capable of broadcasting and receiving via at least one network, such as, but not limited to, WiFi, Cellular, Bluetooth, near field communication (NFC), and the like. In one embodiment, mobile device 150 includes a display 1918, a processor 1905, a memory 1910, a GPS 151, a camera 152, and the like. In one embodiment, location information can be provided by GPS 151. In one embodiment, the location information could be determined (or enhanced) by the broadcast range of an identified beacon, a WiFi hotspot, overlapped area covered by a plurality of mobile telephone signal providers, or the like. In one embodiment, instead of using GPS information, the location of mobile device 150 may be determined within a given radius, such as the broadcast range of an identified beacon, a WiFi hotspot, overlapped area covered by a plurality of mobile telephone signal providers, or the like. In one embodiment, geofences are used to define a given area and an alert or other indication is made when the mobile device 150 enters into or departs from a geofence.

Mobile device 150 includes sensors 153 which can include one or more of audio, visual, motion, acceleration, altitude, GPS, and the like. In one embodiment, mobile device 150 includes an optional application 154 which operates thereon. In one embodiment, optional application 154 includes settings 155. Although settings 155 are shown as part of optional application 154, it should be appreciated that settings 155 could be located in a different application operating on mobile device 150, at a remote storage system separate from mobile device 150, or the like. Moreover, the mobile device 150 could include settings 155 that are web based and are not specifically associated with any application operating on mobile device 150. Thus, in one embodiment, there may be one, some or all of settings 155 without the optional application 154.

Referring again to FIG. 1A, in one embodiment, the application 154 for suspension control (as shown herein) is located on the user's mobile device 150 and the user's mobile device 150 will be in communication with the suspension control application 17 on IVI system 14 to set and adjust the vehicle suspension configuration.

In one embodiment, the suspension control application is a mobile device application 154 (as shown herein) is located on the user's mobile device 150 and the user's mobile device 150 will be in communication with electronic vehicle suspension control system 35 to set and adjust the vehicle suspension configuration.

In one embodiment, the adjustable characteristics for the shock assemblies 21-24 are adjusted based on external sensed conditions, e.g., sensors detecting shock, vibration, or the like. For example, in a smooth operating environment, e.g., on a highway or smooth road, vehicle suspension configuration adjustments may be provided automatically by suspension control application 17 on IVI system 14 or manually by a user inputting the adjustment into the suspension control application 17 on IVI system 14. For example, in a sporty scenario, the adjustment may be to increase firmness in the suspension in order to provide increased feedback, feel and precision of handling. In contrast, in a relaxed scenario, the adjustment may be to decrease firmness in the suspension in order to provide a more comfortable ride.

Similarly, when rougher terrain is encountered, vehicle suspension configuration adjustments may be provided automatically by suspension control application 17 on IVI system 14 or manually by a user inputting the adjustment into the suspension control application 17 on IVI system 14. For example, in an automatic adjustment scenario the suspension control application 17 on IVI system 14 would receive information from one or more sensors (coupled to the suspension near shock assemblies 21-24, via the Vehicle CAN bus 8, or the like) about the rough terrain and automatically reconfigure the vehicle suspension to a softer setting. That is, provide adjustment commands to the appropriate suspension control characteristics for the vehicle. In so doing, the adjustment will provide a softer ride that would reduce operator/passenger felt vibrations, shock, bumps, and the like, thereby reducing operator fatigue.

As described herein, the manual option includes a user selectable switch, icon on a touch display, or the like at the suspension control application 17 on IVI system 14, that allows a user to make a selection based on given characteristics, e.g., highway mode—for smooth terrain,—off-road mode—for rough terrain, a mixed mode for intermediate terrain, etc. In one embodiment, the manual option is provided at the application 154 operating on the user's mobile device 150. In one embodiment, the manual option may be one or more switches, buttons, screen inputs, and the like, that allow the use to select and adjust one or more pre-defined suspension settings.

In an automated mode, suspension control application 17 on IVI system 14 automatically adjusts one or more characteristics for one or more shock assemblies 21-24 based on based on one or more inputs received at the processor of ESCU 10. For example, in one embodiment, the steering inputs, vehicle roll, speed, and the like are detected and/or monitored via one or more sensors on or about the vehicle. Similarly, external conditions such as weather, terrain, ground type, and the like are also detected and/or monitored via the one or more sensors on or about the vehicle. This information is provided to suspension control application 17 on IVI system 14 which will use the sensor data to automatically change one or more suspension configurations.

In one embodiment, the sensors include, but are not limited to, accelerometers, sway sensors, suspension changes, visual identification technology (e.g., single or multi spectrum camera's), driver input monitors, steering wheel turning sensors, and the like. For example, one embodiment uses an inertial measurement unit (IMU) to sense rough terrain. One embodiment has an attitude and heading reference system (AHRS) that provides 3D orientation integrating data coming from inertial gyroscopes, accelerometers, magnetometers and the like. For example, in one embodiment, the AHRS is a GPS aided Microelectromechanical systems (MEMS) based IMU and static pressure sensor. Additional vehicle sensors and the use thereof including one or more suspension components, sensors, and the like, such as disclosed in U.S. Pat. No. 10,036,443 the content of which is incorporated by reference herein, in its entirety.

Moreover, suspension control application 17 on IVI system 14 is able to adjust the shock assemblies automatically and on the fly to make suspension adjustments. For example, suspension control application 17 on IVI system 14 will configure the shock assemblies into a highway mode during travel down a roadway, e.g., that is configuring the remotely adjustable shock assemblies to operate in a firmer mode, and then as the vehicle transitions to rougher terrain, the remotely adjustable shock assemblies will be reconfigured to a softer setting to increasing absorption of shock and thereby provide a smoother ride.

In one embodiment, the automated or user selectable settings are further adjustable based on actual conditions or as "learned" user settings. For example, if an operator initially uses suspension control application 17 on IVI system 14 to set the electronic vehicle suspension control system 35 to a rough terrain setting and then the vehicle transitions to a roadway, fire road, highway, or the like. When the sensor feedback causes suspension control application 17 on IVI system 14 to determine that the vehicle is no longer in rough terrain, suspension control application 17 on IVI system 14 would automatically change the suspension settings to provide a more appropriate suspension setting. However, if the operator prefers a harder feel, the operator can override any automatic "on-the-fly" adjustments by suspension control application 17 on IVI system 14 so that user set suspension configuration is maintained until the user manually inputs the change.

IVI Technologies

Downloading Suspension Tunes: Embodiments will utilize the connectivity and app environment of the suspension control application 17 on IVI system 14 to push suspension tunes (algorithms) to the user by flashing an external controller or the IVI system 14, if the IVI system 14 is used as the host controller, for an electronic suspension. The IVI system 14 shall act as a gateway device for customizing the suspension control in one embodiment. In the case where the IVI system 14 is the suspension controller, the IVI system 14 would be running the algorithms natively for the control of the suspension system.

Location Based Tuning: Using navigation data (such as satellite navigation data, local area network data, wide area network data, Cellular data, WiFi data, and other radio or airway delivered data that can be used for navigation purposes) and map data available to the vehicle IVI system 14, in conjunction with an on-vehicle controller and algorithm, one embodiment provides a user experience whereby the user can select trails based upon their driving preference and/or configure and download suspension settings relative a the vehicles location and map data. Furthermore, in one embodiment, the user can create "waypoints" whereby the vehicles suspension setting is aligned to the specific location of the vehicle on a trail.

Suspension Authentication: Utilizing the suspension control application 17 on IVI system 14 as a point of authentication when using the suspension control application 17 on IVI system 14 as the gateway device for the control of the electronic suspension. A secure "handshake" by an encrypted message would be sent between the suspension control application 17 on IVI system 14 and the on shock electronics module to ensure that the shock is compatible with the suspension control application 17 on IVI system 14 in order to control and download tunes (algorithms) to the vehicle, otherwise, an incompatible shock and/or suspension control application 17 on IVI system 14 may not allow the shock or the user interaction to occur, or could require an additional app, or other type of add-on in order for interaction to occur between the incompatible shock and/or suspension control application 17 on IVI system 14.

IVI system 14 as a Gateway for amalgamating peripheral devices for suspension control, user interaction, and diagnostics of suspension systems: in one embodiment, IVI system 14 will act as a gateway device for receiving and processing vehicle mounted GPS, camera(s), sensor(s), and other data. The suspension control application 17 on IVI system 14 will gather the shock and terrain data as a feed forward component for real-time suspension control and algorithm development, diagnostics, user interaction with electronic suspension control(s), and the like. In one embodiment, one or more vehicle display(s) will be controlled by the IVI system 14 and used to provide information to the user.

In general, the one or more vehicle display(s) could include a heads-up display (HUD), a radio display, a digital speed/RPM/engine monitor display, and any other displays installed on the vehicle. In one embodiment, the provided information can include upcoming obstacles, events, and the like. In one embodiment, the suspension control application 17 on IVI system 14 will also use the one or more vehicle display(s) to communicate the vehicles suspension settings, support or lack-of-support for the users preferred riding style (e.g., comfort, sport, off-road, etc.), and the like. In one embodiment, the feed forward algorithms, utilizing peripheral devices integrated into the suspension control application 17 on IVI system 14, are used to facilitate a safer riding experience.

IVI system 14 as a data acquisition device for real-time algorithmic optimization: In one embodiment, suspension control application 17 on IVI system 14 will acquire data through various sensors, whereby the base algorithm would be calibrated for optimal suspension performance, for a user's preferred suspension settings and performance, based on a profile that is developed for the specific location, terrain, trail, road, trip, or the like.

Follow the user-suspension setting preferences: In one embodiment, IVI system 14 would recognize the user's mobile device 150; key fobs, and the like. For example, the user's device may be paired to the IVI system 14. In one embodiment, the suspension control application 17 on IVI system 14 would recognize the user and use an accompanying (or stored) user personal profile to pre-set the user suspension preferences.

In one embodiment, as shown in FIGS. 2A-2D, suspension control application 17 on IVI system 14 could include a number of different apps, pages, screens, options, sections, or the like. For example, in one embodiment, suspension control application 17 on IVI system 14 includes sections such as, but not limited to, an intro 205, a home-live mode 210, a home-manual mode 215, a live mode 220, a ride stats 225, a garage 230, and a tools 235. Although a number of sections are shown, it should be appreciated that in one embodiment, the sections could be broken down differently, include information in different sections, include some, all, or more of the subsections/menus/options, and the like. The use of examples herein is provided for purposes clearly discussing an embodiment, but is not meant to restrict the sections, subsections, menus, and/or options from being differently organized, shown, or configured in accordance with other different embodiments.

In one embodiment, as shown in FIGS. 3A-1 through 3A-8, intro 205 includes submenu items such as, a scan submenu which lets a user scan suspension components with a mobile device 150 for verification. The scan could be the scan of a barcode, an NFC interaction, an RFID tag, a photo of the component, etc. In one embodiment, the scan will provide identification of the manufacturer, model, serial number, etc. In one embodiment, the verification would be used by the suspension control application 17 on IVI system 14 as a security measure to confirm that the user (as identified by the mobile device 150, or other identifier) was authorized to drive the vehicle having the scanned suspension component.

In another embodiment, the scan would allow the suspension component to be identified (manufacturer, year, etc.). That identification information could then be used by the suspension control application 17 on IVI system 14 to look for and identify the components or controllers of the components, look for drivers, settings or updates provided from the manufacturer, and the like. In one embodiment, the suspension control application 17 on IVI system 14 could find settings or updates that are then provided by the suspension control application 17 on IVI system 14 to the identified controller or the actual scanned suspension component.

In another embodiment, the user could manually add the suspension components or select the components from a drop-down menu, or the like.

In one embodiment, suspension control application 17 on IVI system 14 will manage a number of vehicle profiles. For example, the user may have three different vehicles (a truck, a side-by-side, and a camping van). There may be different tunes downloaded to an application 154 on the user's mobile device 150 for each of the three (or any number) of different vehicles. When the user goes to the vehicle, the user can select which vehicle she will be riding (e.g., the side-by-side), and the available tunes for the side-by-side will be presented by the mobile device application 154 to the suspension control application 17 on IVI system 14.

The next submenu is the let's ride option that displays a vehicle and suspension components for the user to confirm or modify; and an initializing shock setting screen for when the user has confirmed the vehicle and suspension and selected to "let's ride" or otherwise affirm the suspension settings for suspension control application 17 on IVI system 14.

In one embodiment, as shown in FIGS. 3A-1 through 3A-8, home-live mode 210 includes submenu items such as the first 3 submenus that include a display that shows, a number of different initial modes (e.g., crawl, road, trail, auto, sand, mud, race, towing, etc.), the present orientation of the vehicle (e.g., pitch, roll, yaw), different levels for aspects such as comfort, firmness, a mode option (live or manual), and the like.

In general, live would allow the suspension control application 17 on IVI system 14 to make automatic adjustments to the settings based on sensor data. In one embodiment, manual would stop the suspension control application 17 on IVI system 14 from making automatic adjustments and allow only manual or user input adjustments. In another embodiment, manual may be a hybrid setting that would not stop the suspension control application 17 on IVI system 14 from making automatic adjustments, but would allow manual or user input adjustments to be prioritized over the automatic adjustment settings. In one embodiment, the prioritization could be until otherwise manually directed by the user, until a completely different terrain was encountered, for a predefined time period, for a certain distance, or the like.

The third submenu shows a driver change selection or a list of drivers with suspension settings stored in the IVI system 14 for the vehicle. The fourth submenu shows an edit screen where the user can change one or more of the four initial modes. At the fifth submenu, a list of available factory generated replacement modes (or tunes) is shown. The sixth submenu provides additional details about one of the factory generated replacement modes.

Suspension Modes/Tunes

In general, the factory provided modes (or user uploaded modes) could be initially received (based on vehicle configuration, model, make, modifications, components, etc.) and then modified based on user specific information. For example, a driver's (or rider, user, etc.) physical information which could include one or a combination of features such as height, weight, gender, age, body mass, body type, fitness level, heart rate, and the like. Driver's skill information, e.g., beginner, intermediate, advanced, professional, etc., or rider motivation (e.g., fun ride, race, workout, etc.), and the like.

In one embodiment, some or all of the specific driver information could be obtained by user input, by communication between the user's mobile device 150 and a networked device such as a scale, smart watch or other smart jewelry that monitors one or more user's biometrics (e.g., heart rate, body mass, temperature, etc.), one or more sensors on the vehicle, the IVI system 14, or the like.

In one embodiment, the factory or user defined modes are suspension tunes. In one embodiment, the IVI system suspension control application 17 (or the user can use a computer or a mobile device 150) to obtain tunes that correlate with one or more of the user's status/capability inputs. For example, there may be 5,000 suspension tunes stored in a factory database. In one embodiment, instead of the user manually selecting from the 5,000 tunes, the IVI system suspension control application 17 will use the user information, vehicle information, suspension components, and the like to automatically narrow the number of tunes down to only those that meet the user and vehicle criteria. For example, novice tunes, expert tunes, vehicle make and model tunes, shock assembly types, and the like.

In addition to the automatic and predefined tunes, in one embodiment, peer generated customer tunes (or modes) that will be provided, such as in a custom mode, to other IVI system suspension control application 17 users for download and utilization.

For example, trail x is driven by Bobby Pro and he records his suspension settings (or tune) from his trail x drive. Bobby then uploads the tune for the IVI system suspension control application 17 (e.g., labeled Bobby does trail x). Another user could then download Bobby Pro's settings (e.g., the tune Bobby does trail x) and use that specific tune to also drive trail x (or to drive other trails).

Similarly, Franky Speed could ride his side-by-side with specific components thereon, record his suspension settings and performance, and upload them for the IVI system suspension control application 17. Another user having a side-by-side with the same (or similar) specific components thereon (or same model, brand, year, etc.) would be able to find the custom tune for her similar side-by-side and download the custom Franky Speed tune to her mobile device 150 or to her IVI system suspension control application 17. Thus, there could be downloadable custom tunes for general locations, different altitudes, specific rides, specific people, specific vehicle models, vehicles with similar suspension components, and the like.

For example, the custom suspension modes or tunes can come from FOX or an OEM component or vehicle manufacturer. Or the suspension modes could target a specific type of user or a specific geographic location. In one embodiment, before dissemination, any custom tunes would be sent for approval, and then the approved custom tunes would be available for download.

Although, in one embodiment, the custom tunes are managed by a mobile device application 154 or the servers supporting mobile device application 154 (e.g., the management location from which tunes are uploaded to and downloaded from), in one embodiment, one or more custom tunes could be shared peer-to-peer via WiFi, Bluetooth, NFC, etc. In one embodiment, they could be shared through a middleman such as a webstore, a social network, a riding club, or any combination thereof.

The seventh submenu shows an optional drop-down menu for selecting a user list of replacement modes instead of the factory generated replacement modes. The eight submenu provides a list of available user generated replacement modes. For example, in one embodiment, the custom tunes are downloaded into a "bullpen" and can then be dragged into the active stack of 4 (or any defined number) modes. In one embodiment, when a replacement mode is selected from the bullpen, the replaced mode would then drop down into the bullpen, available for later use (e.g., "Bobby does trail x" replaces trail mode).

In one embodiment, sharing different modes (or tunes) would be controlled by a web services server that contains assets such as, but not limited to, firmware, consumer (approved) tunes, user data, sharing data, approval data, or the like. In one embodiment, tunes or modes could be approved after having been screened by a manufacturer, a quality controller, or the like. For example, the tune could be reviewed to ensure it does not include settings that are outside of manufacture tolerances. In one embodiment, the modes, tunes, and sharing could be purchased by a user, provided as a reward, used as a standard for a virtual race (or drive), and the like. Social media sharing, attendance to events, rides completed, etc.

In one embodiment, as shown in FIGS. 3A-1 through 3A-8, home-manual mode 215 includes three submenu items that look similar to the submenu items from home-live mode 210. However, in the manual mode the submenus allow the user to manually set each suspension compression and rebound damping. For example, the submenu is for a 4-wheeled vehicle and provides 4 locations for the user to adjust. The adjustments to rebound and compression could be independent, set by axle, side, all four the same, or the like.

In one embodiment, the manual submenu allows the user to store a number of different manual presets (e.g., four in one embodiment). As such, the user would be able to select any of the different programed modes and the suspension would be adjusted to match the preset configuration.

In one embodiment, as shown in FIGS. 3B-1 through 3B-8, live mode 220 includes a number of submenu items. The first three submenus include menus similar to submenus 5-8 of home-live mode 210, e.g., a view mode that includes a user settings option or factory preset settings option provided in a drop-down menu. The fourth submenu shows the user selecting a user mode to edit, and then the fifth submenu provides a mapping type layout for allowing the user to adjust or modify different suspension characteristics (such as ride comfort, traction, body control, bottom out resistance, and the like). The sixth submenu is an example of creating a new user mode that in one embodiment, starts at a baseline mode and allows the user to name and save the new mode. The seventh submenu illustrates the newly built mode added to (or replacing one of) the existing user modes.

In one embodiment, as shown at 221 of FIGS. 3B-1 through 3B-8, a number of different available modes may be shown on the display.

In one embodiment, as shown in FIGS. 3B-1 through 3B-8, ride stats 225 includes a number of submenu items starting with selecting a ride. For example, the IVI system 14 would have stored the suspension configuration for a given ride, event, drive, trail, day, time period, or the like. The stored information could include any or all of an initial suspension configuration, any automatic or manual suspension changes (to include a terrain type, time, and/or location of the change), and a final suspension configuration.

In one embodiment, the ride stats use the collected performance data to compare the mode settings (or tune) used on the drive with the actual performance of the active valve and other suspension components. This comparison could be used to determine if the selected mode was the most appropriate for the drive, if one or more aspects of the mode should be adjusted for performance gains, if the active valve system and any or all of the suspension components were operating correctly, if any faults were detected, or the like.

For example, the evaluation of the collected performance data it could identify downhill setting did not allow for the full motion of one or more active components. The determination would further indicate that the downhill setting was too stiff and that a softer setting would have allowed for additional performance to be obtained from the one or more active components. In another embodiment, the determination would be that one or more of the active valves in the active valve system was not operating correctly and needed an update, replacement, or the like. In yet another embodiment, the determination would be that one or more of the components on the vehicle was not operating correctly and needed repair, replacement, or the like.

In one embodiment, if the determination was that the mode was not correct for the situation, the result of the comparison would be an adjustment to the downhill portion of the mode.

At the second submenu, details of a selected event are shown. The details could include suspension information such as, but not limited to, top outs, bottom outs, range of roll, pitch, yaw, shock velocity, oil temperature, etc. At the third submenu, there are options for a deeper dive into other areas of information including, the suspension, ride zone, vehicle, map, video, and the like.

The fourth submenu provides details about the ride zone, details such as performance of the shock (or suspension) for each wheel, shock range (use, bottom out, top out, percentage of range used, and the like). This information could be used to determine if the shocks were operating within the appropriate range, operating average within the prime range of the operational envelope, and the like. The fifth submenu provides vehicle information such as, but not limited to, biggest air, top speed, distance traveled, elevation (highest, lowest, total change), average speed, and the like. The sixth submenu provides map information. In general, the map information lays out some or all of the drive on the display. By moving the vehicle along the route on the display, the user can find exact information for that specific location. The exact information could be any or all of the information from any of the previous submenus. For example, the sixth sub menu would provide a small (user selectable) amount of information, but if the user wanted more detail, the user could set the vehicle in a certain location on the driven route and then return to the other submenus to get all of the information at that exact point.

For example, if the user put the vehicle at the whoops section, and then went back to the fifth submenu the user would be presented with the location specific information such as air, speed, location, elevation, terrain type, and the like. In one embodiment, the seventh submenu is the video category that would allow the user to watch video taken during the drive. The video could be linked to other portions of the ride data. For example, the user could go to the submenu indicating the highest air, select the highest air and then choose to watch a video of the highest air. Such capability to link video to event could be used for any or all of the statistics (e.g., top speed, highest elevation, terrain selection, bottom outs, etc.)

In one embodiment, the ride information can be used to evaluate predefined modes, analyze the suspension performance, identify problems, possible problems, areas that worked well, settings that worked well, and the like.

Figure 3A:
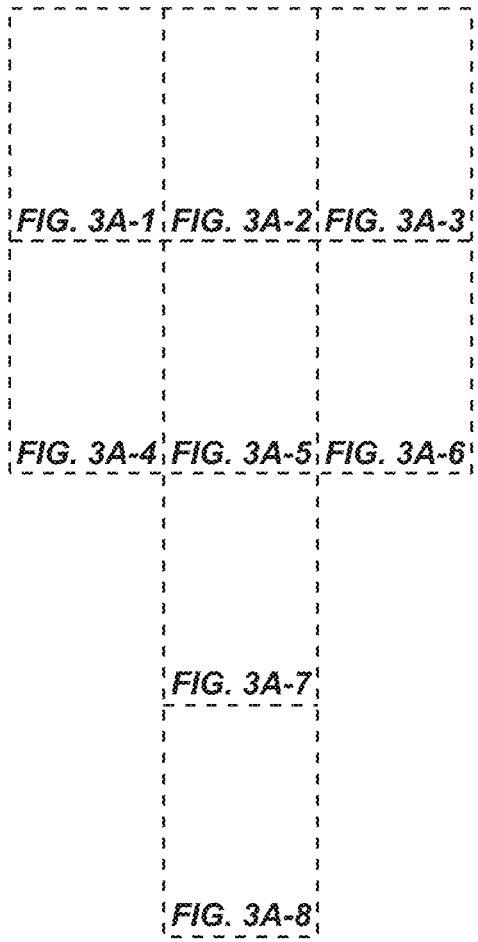
FIGS. 3A, and 3A-1 through 3A-8 are an index (FIG. 3A) and corresponding flow diagrams of an expansion to an exemplary set of IVI system screens and capabilities of FIGS. 2A-2D, in accordance with an embodiment.
Figures 1, 3A:
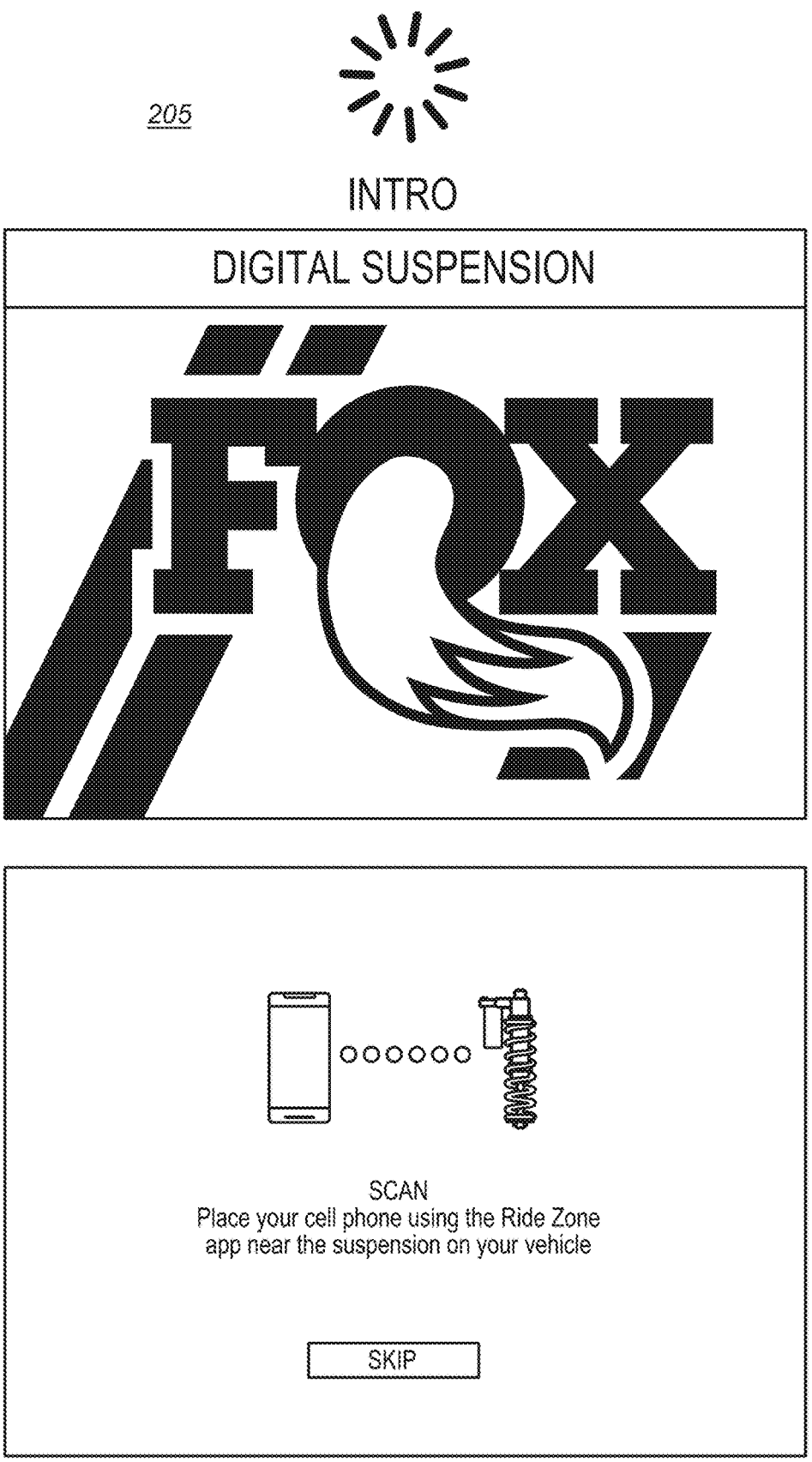
Figures 2, 3A:
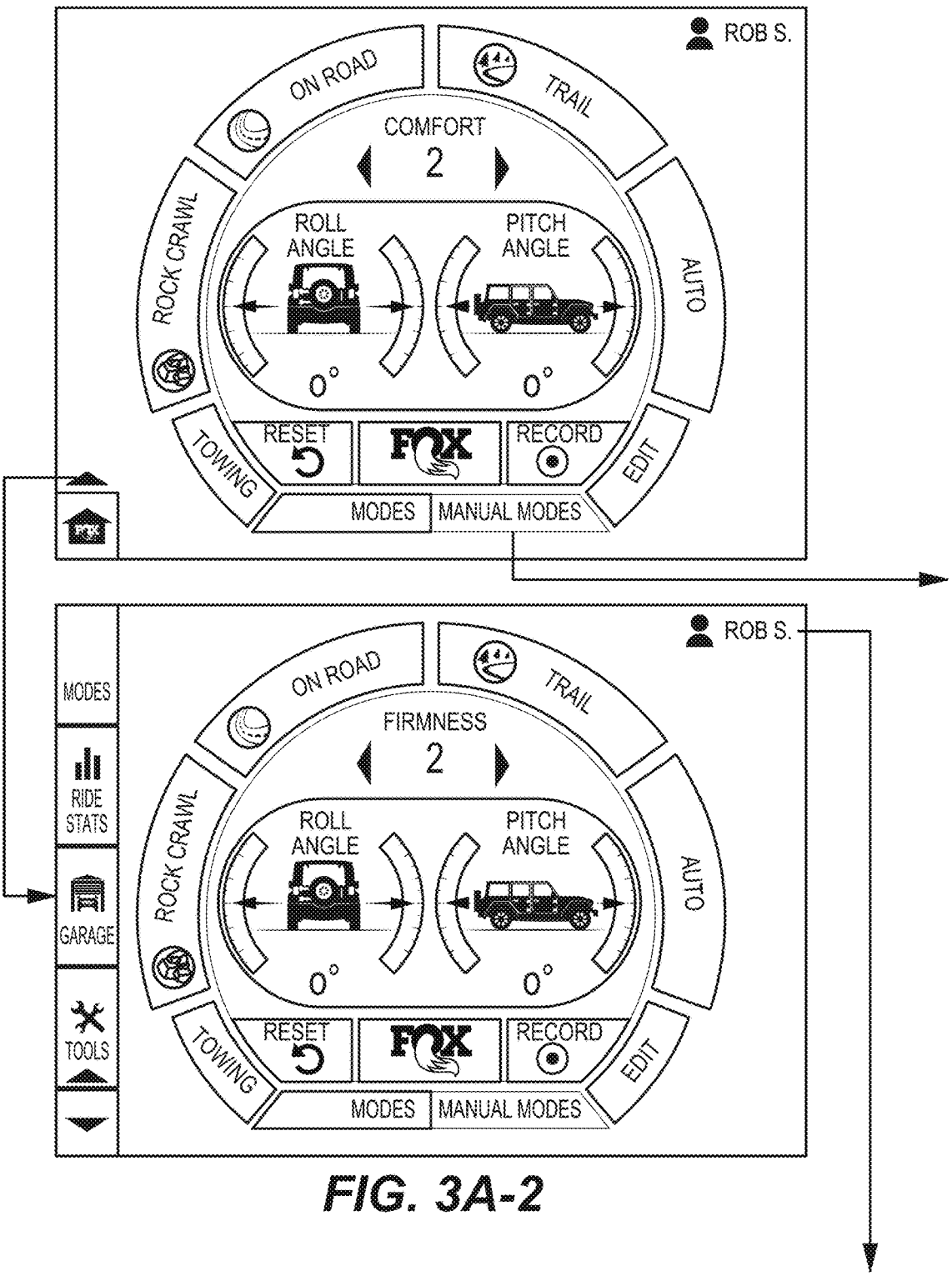
Figures 3, 3A, 4, 5:
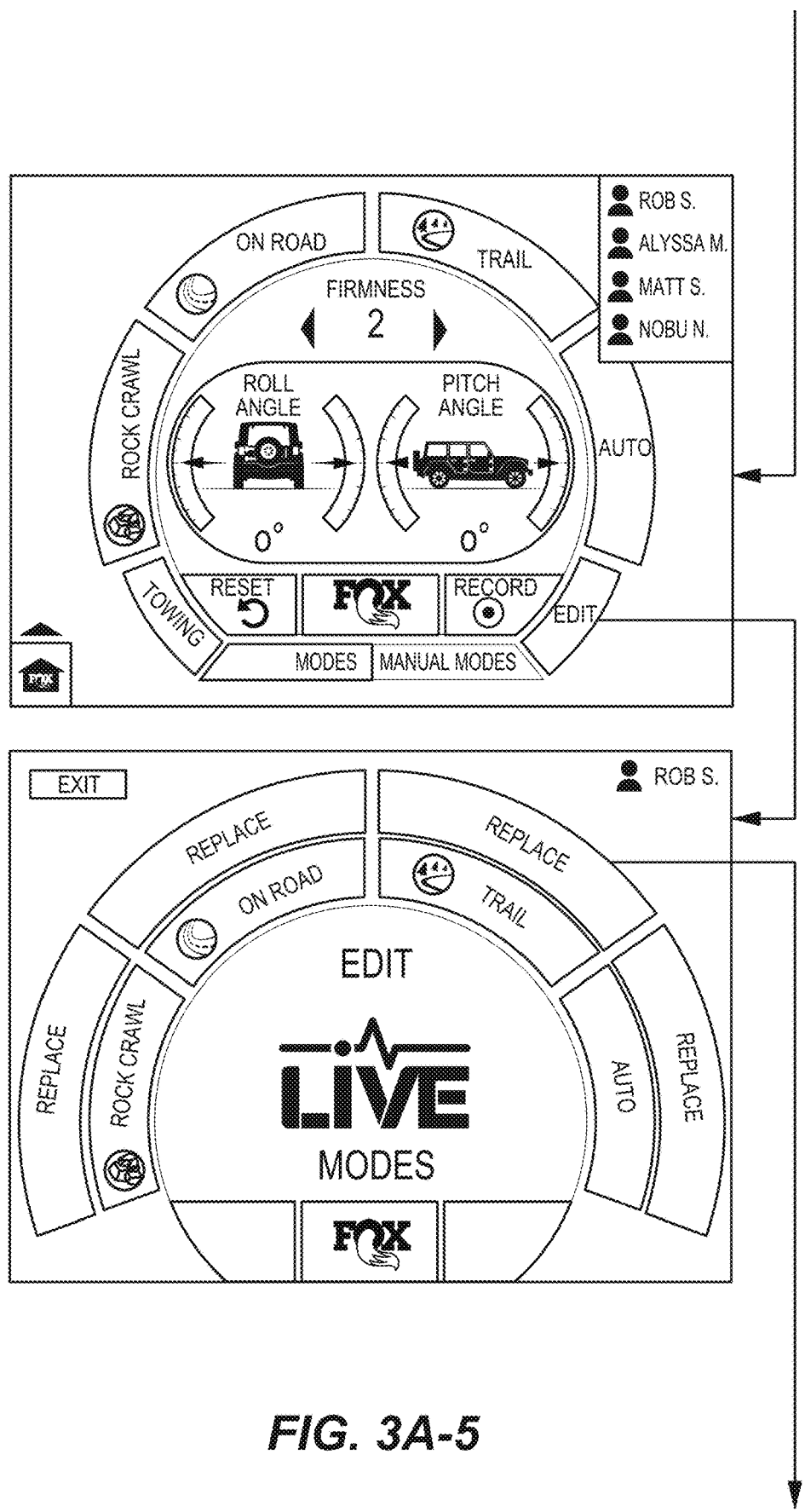
Figures 3, 3A, 4, 5, 6:
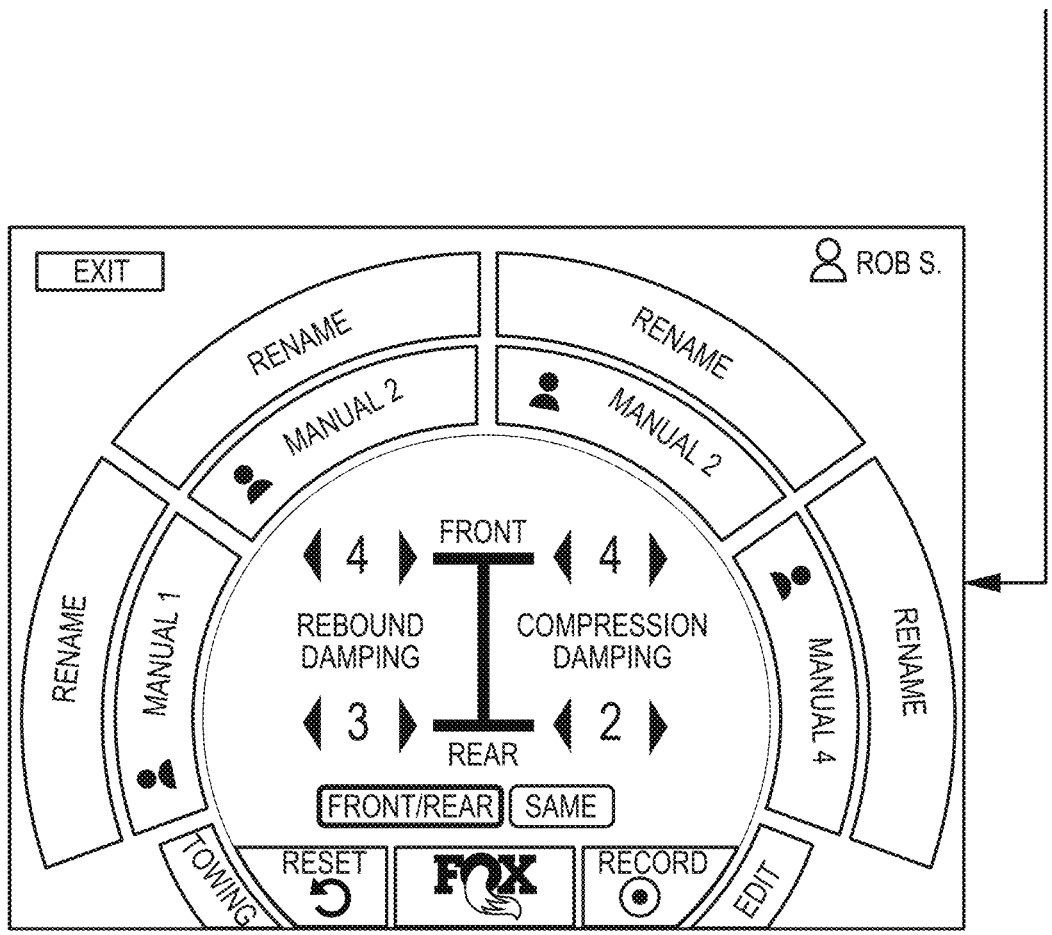
Figures 3, 3A, 4, 5, 6, 7:
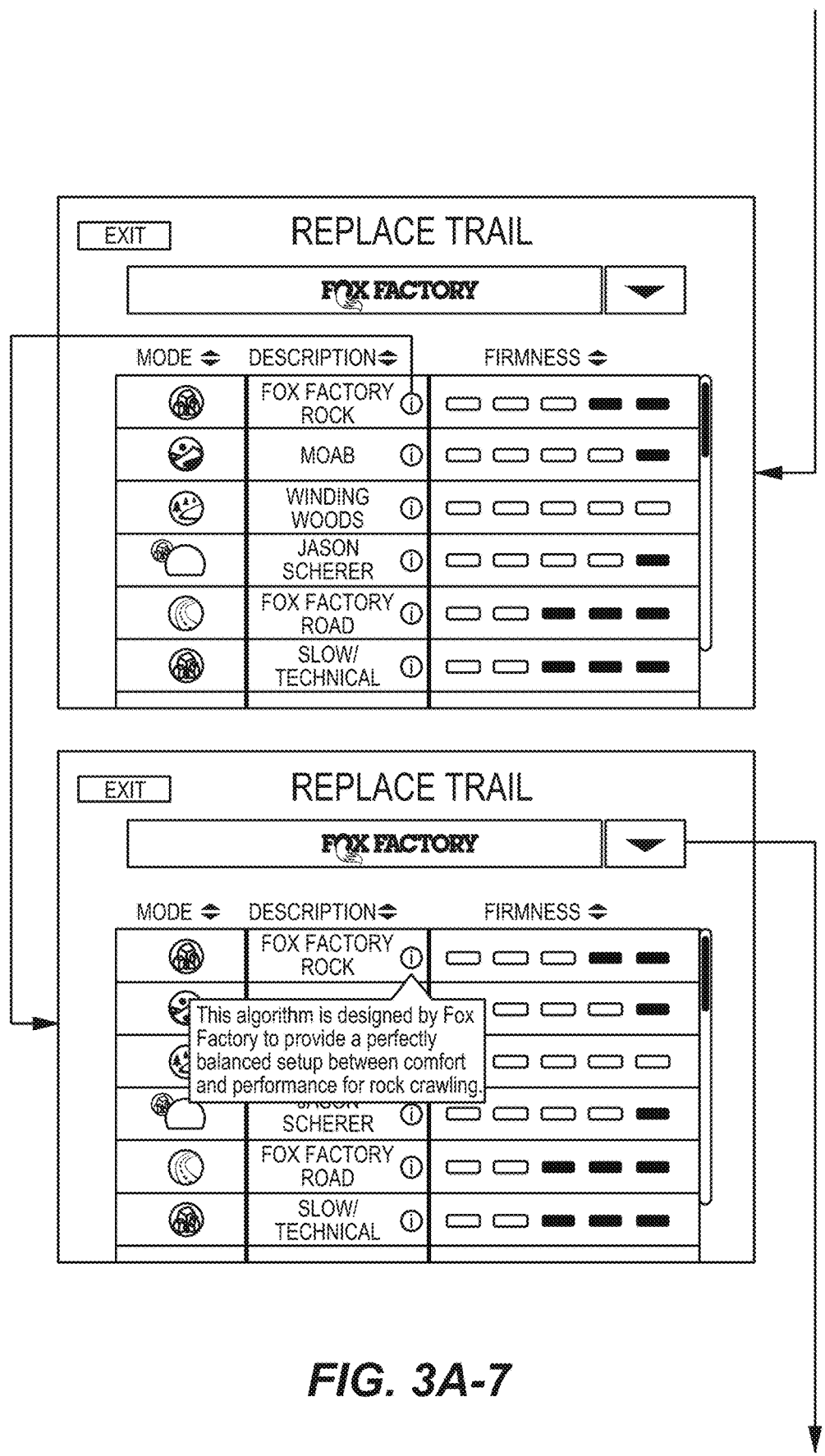
Figures 3, 3A, 4, 5, 6, 7, 8:
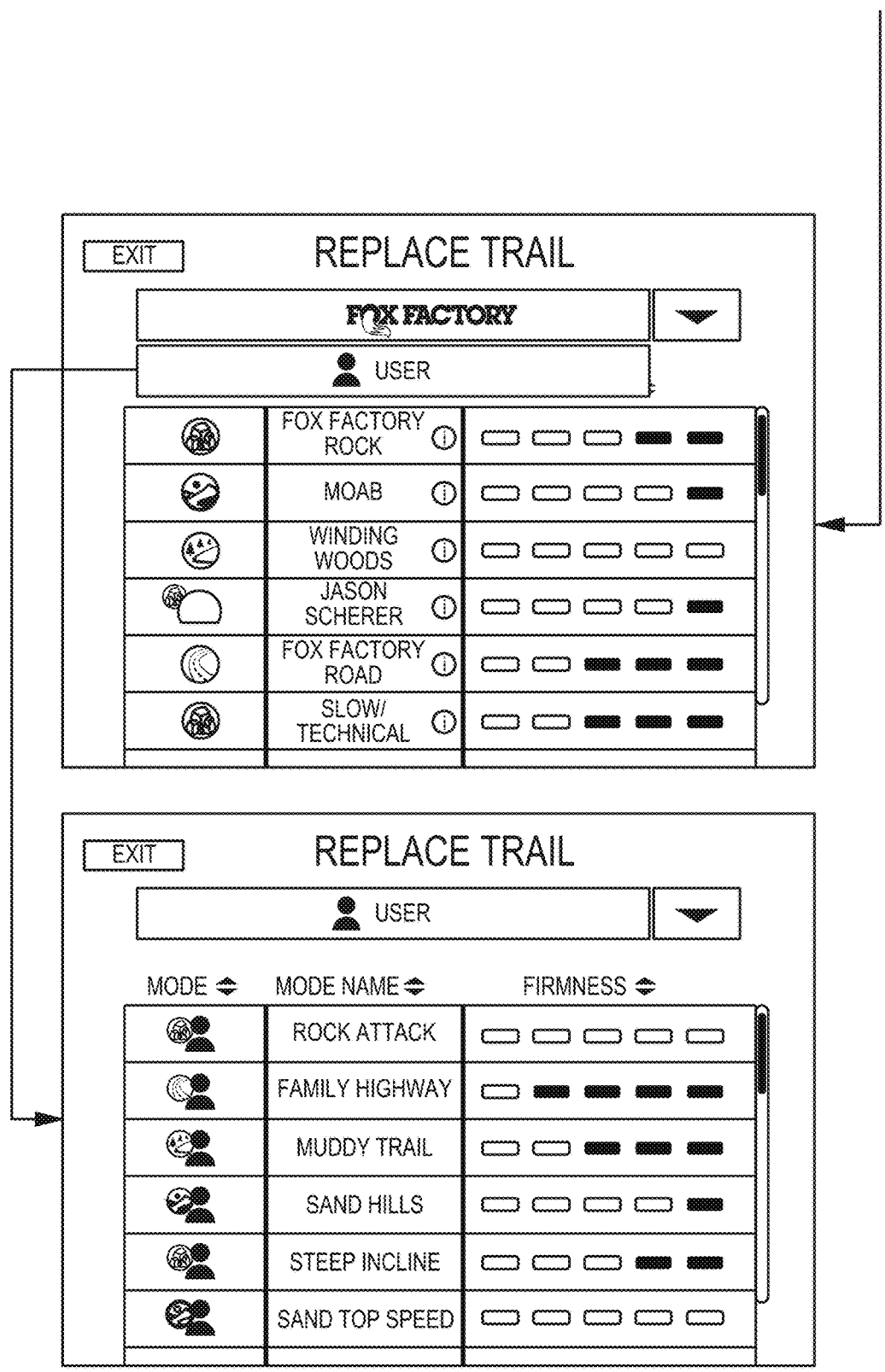
Figures 3, 3B:
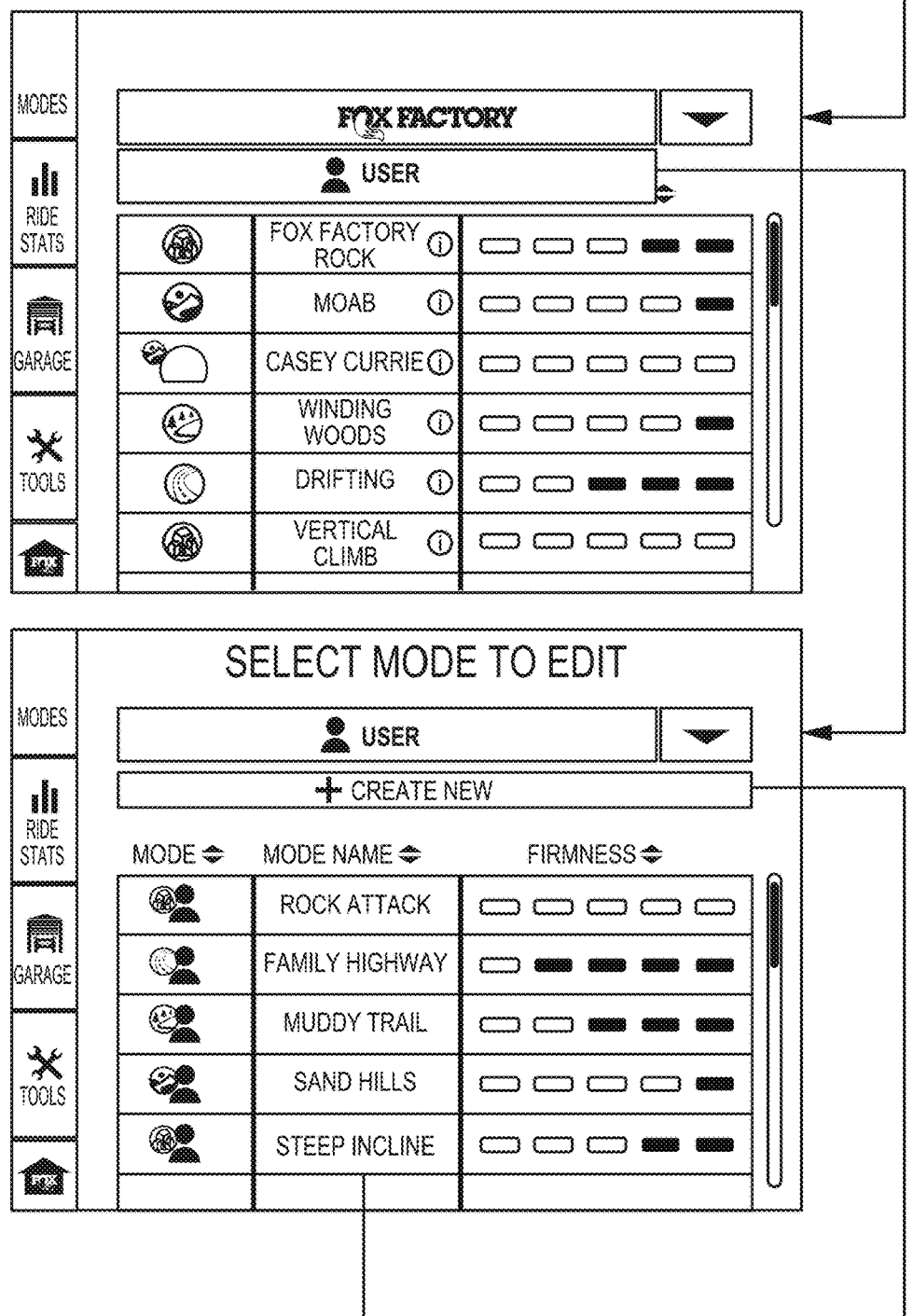
Figures 3, 3B, 4:
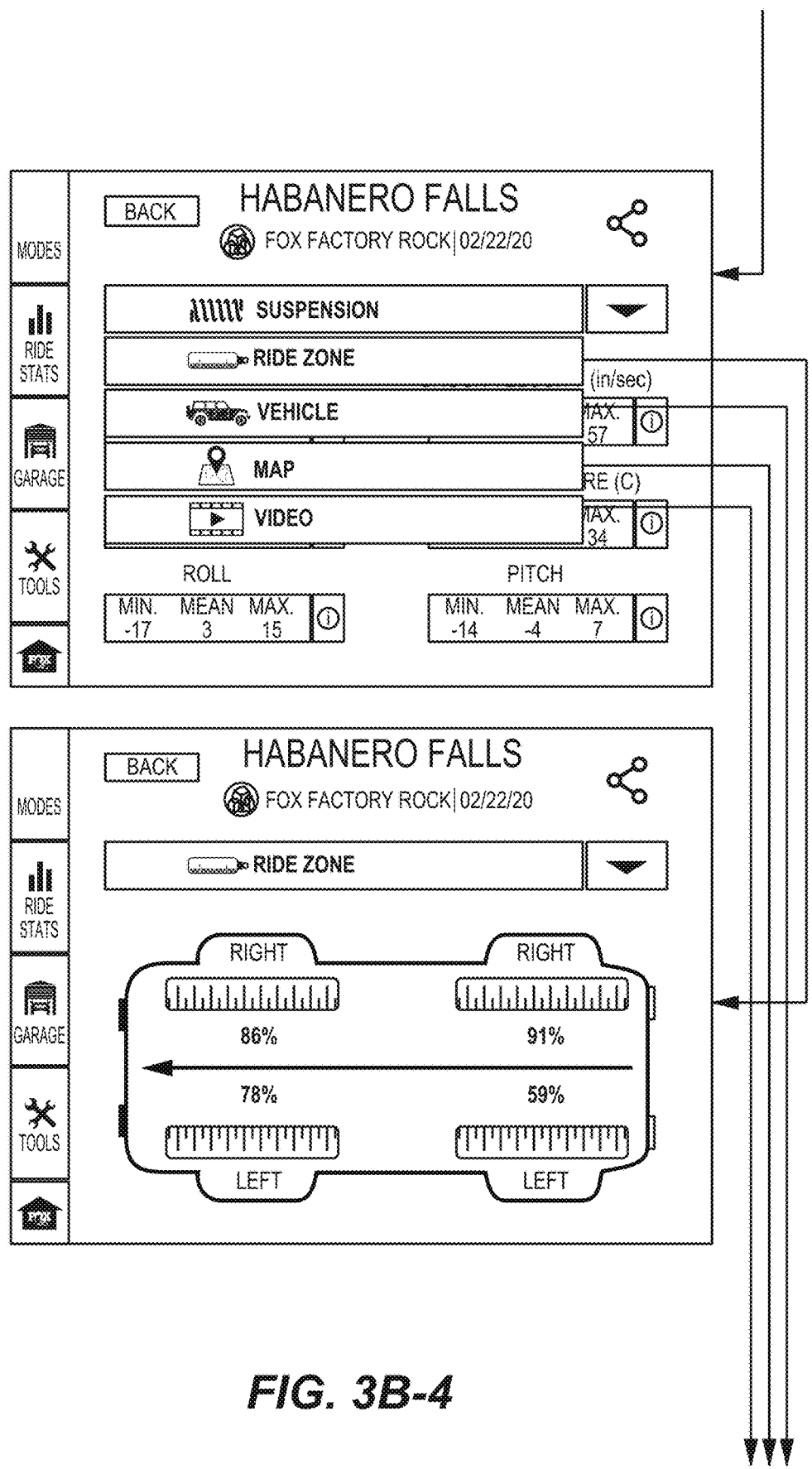
Figures 3, 3B, 4, 5:
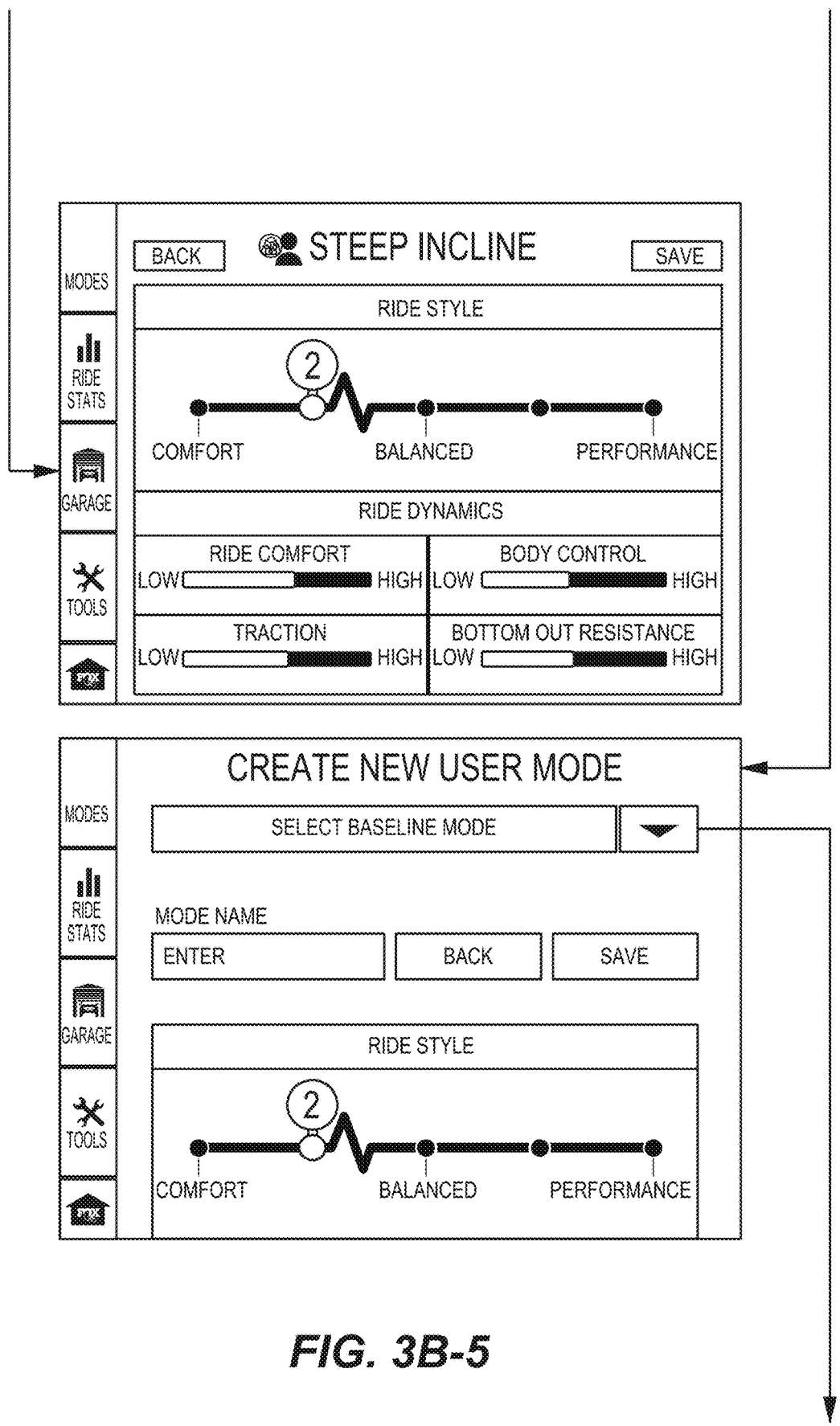
Figures 3, 3B, 4, 5, 6, 7:
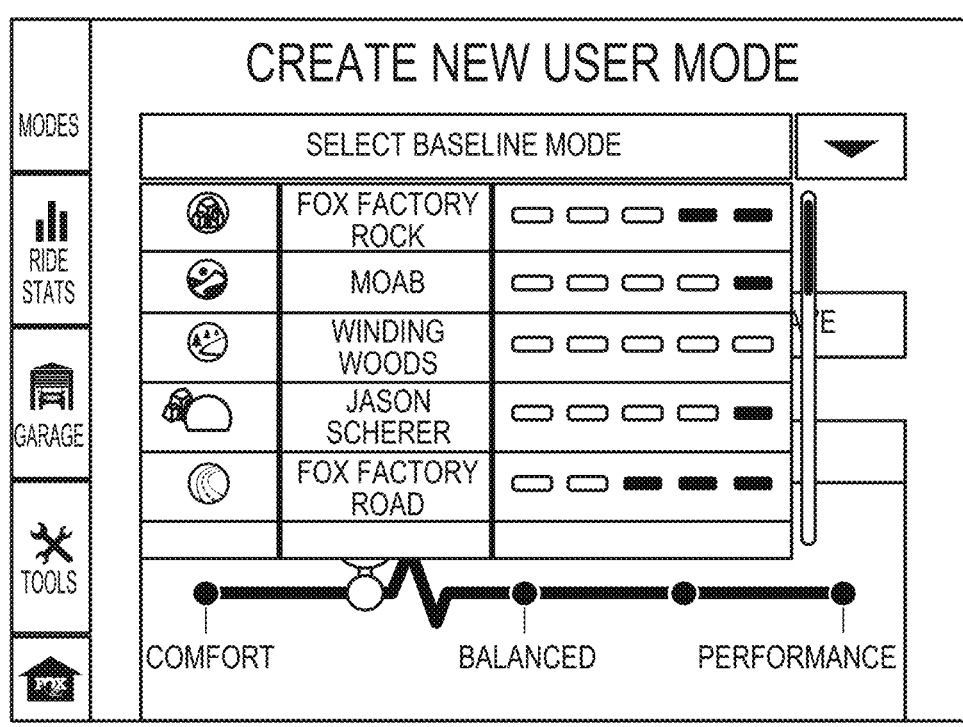
Figures 3, 3B, 4, 5, 6, 7, 8:
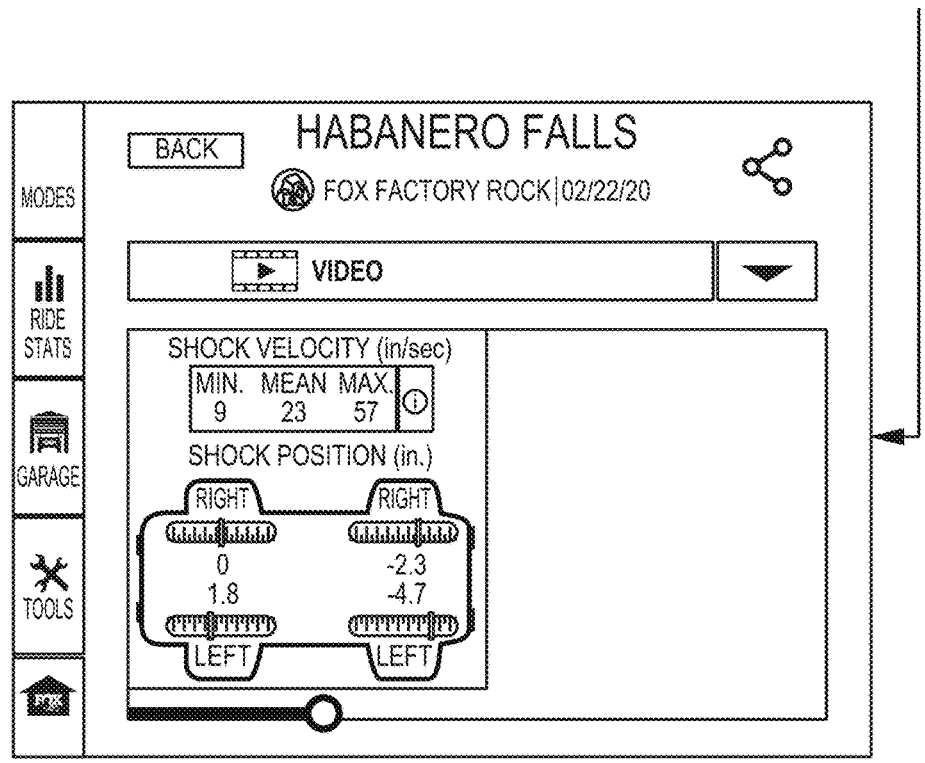
Figure 3C:
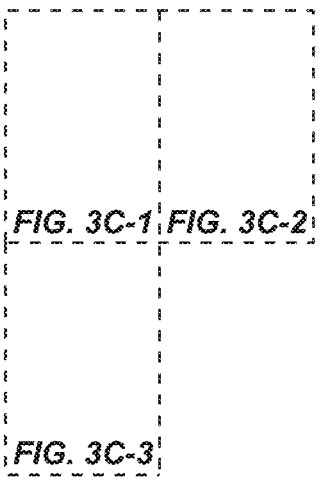
Figures 1, 3C:
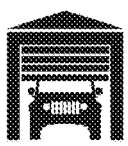
Figure 3C:
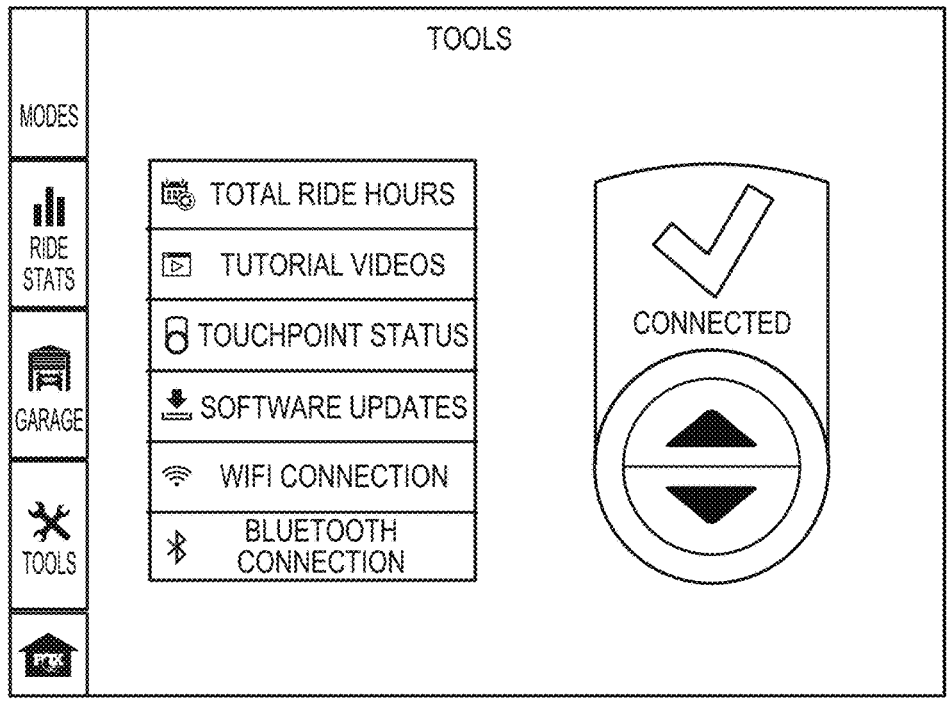
Figure 2:
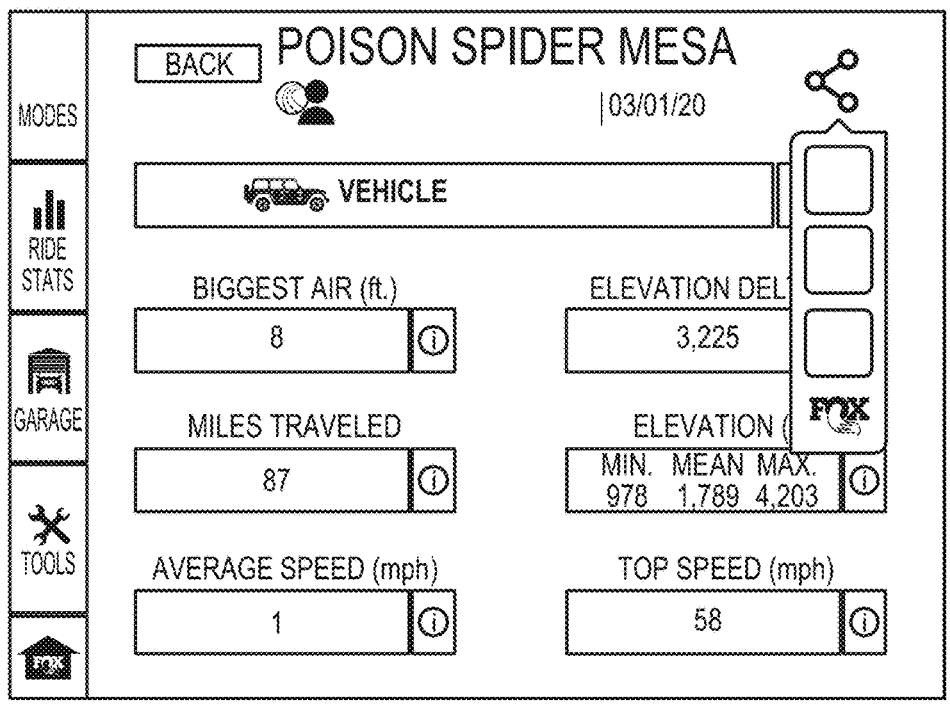
Figure 3C:
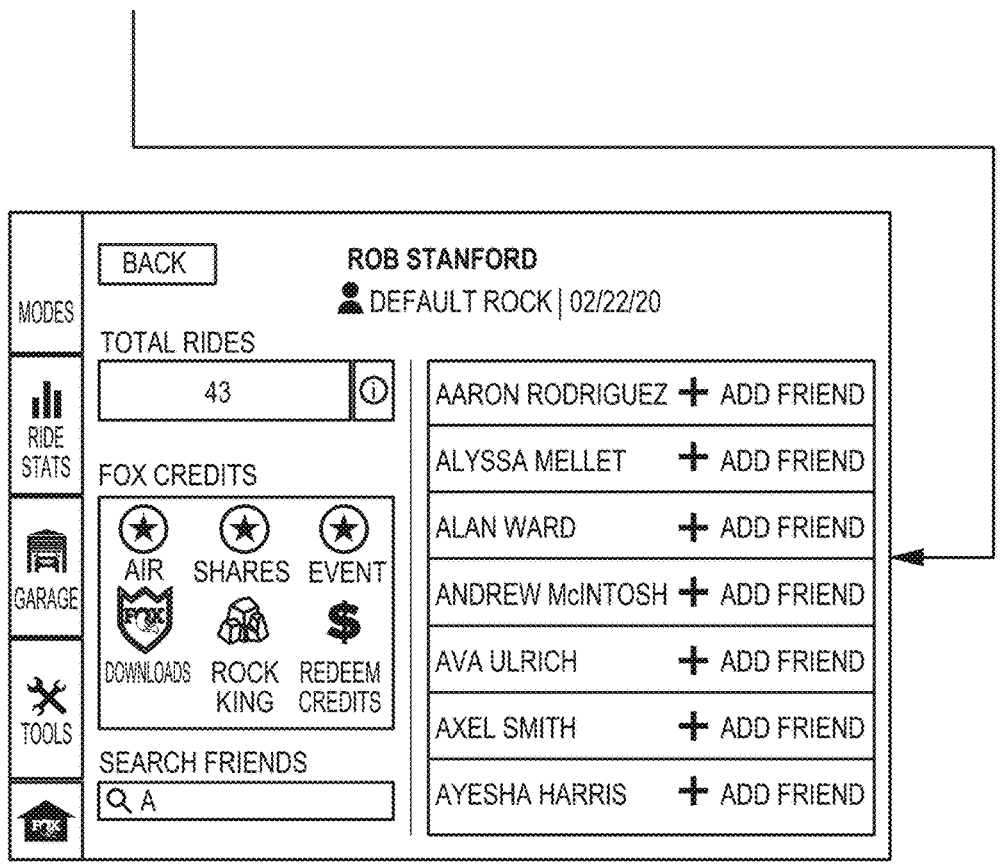
Figure 3:
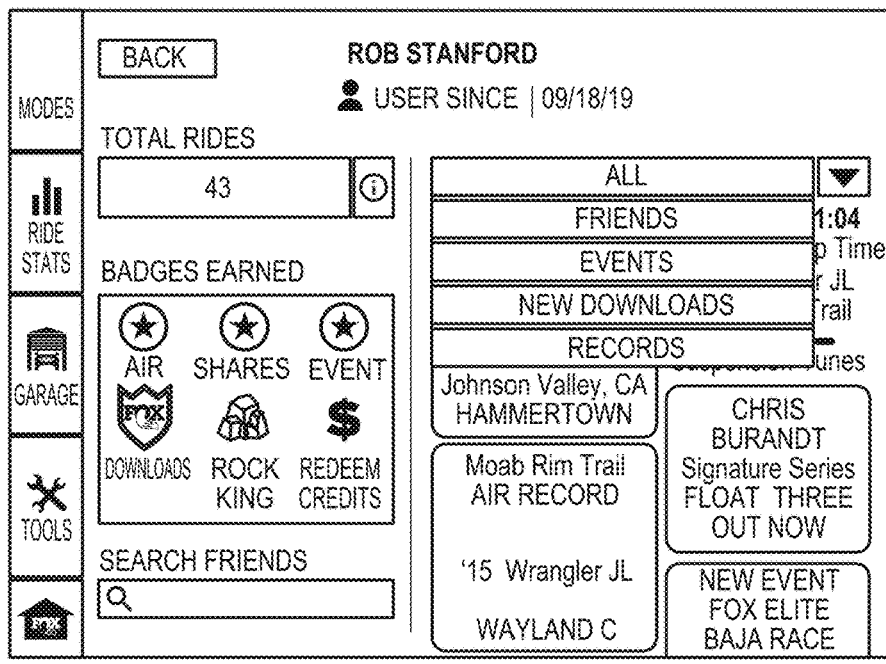
Figures 1, 4A:
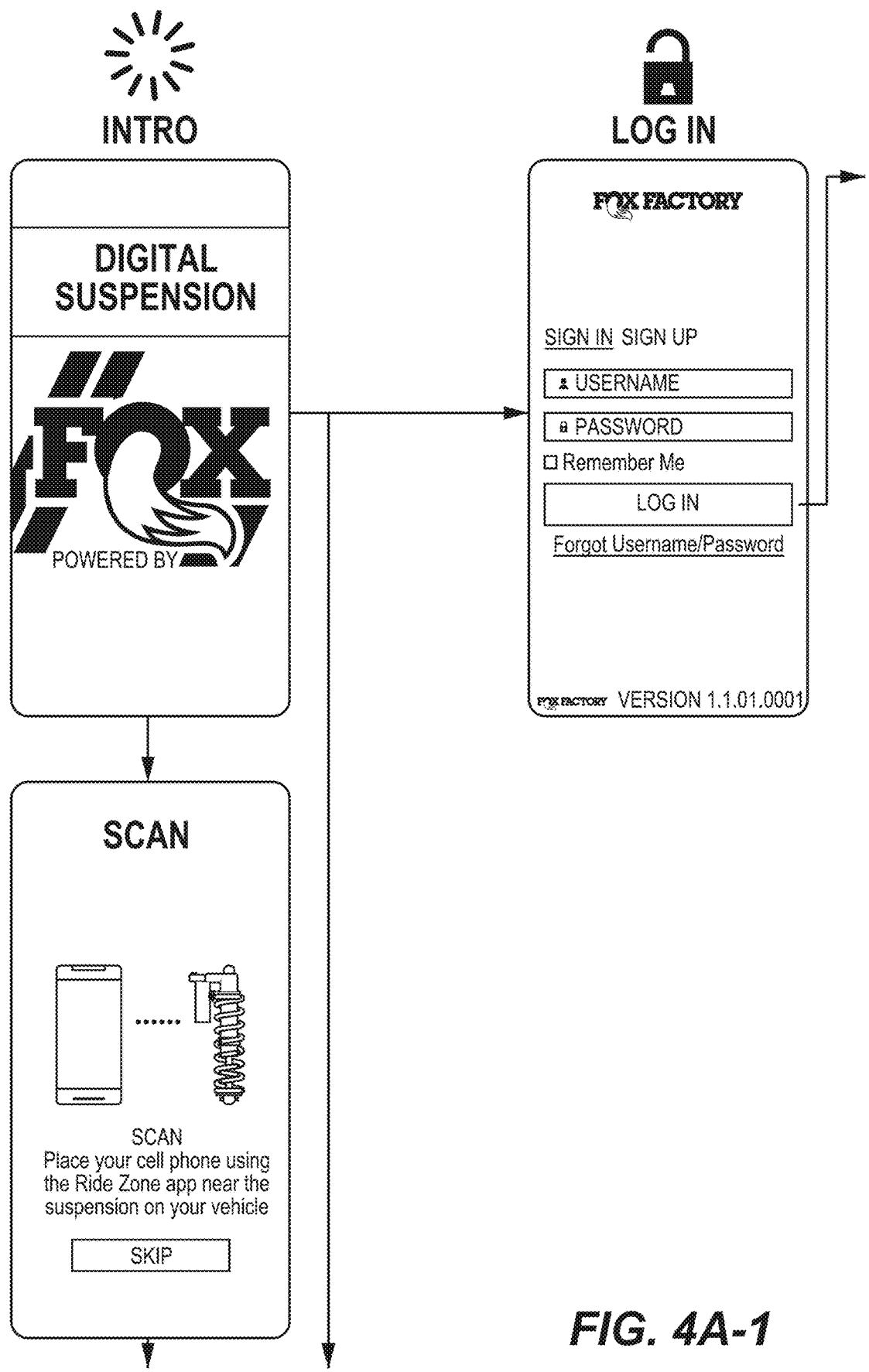
Figures 2, 4A:
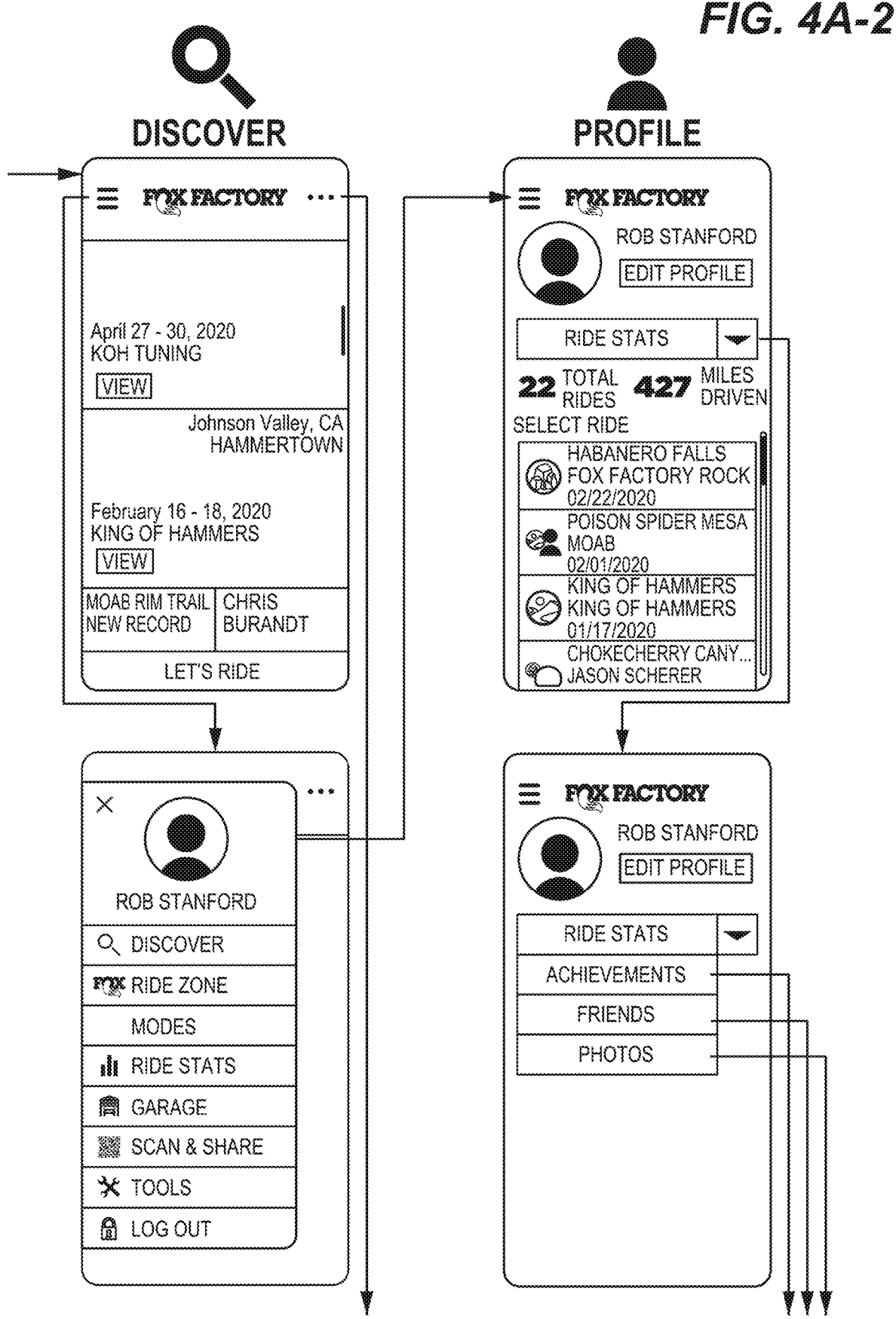
Figures 3, 4A:
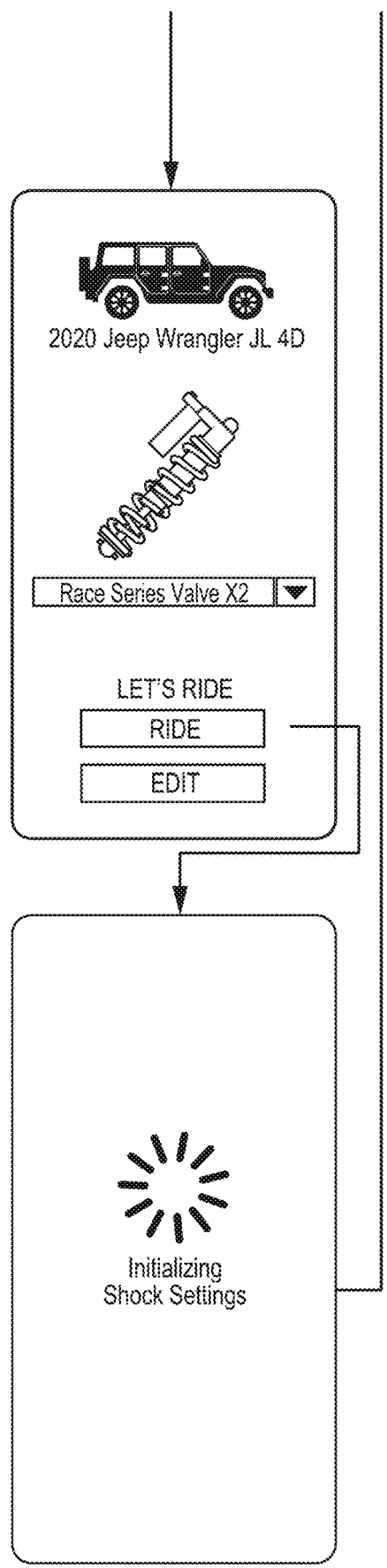
Figures 4, 4A:
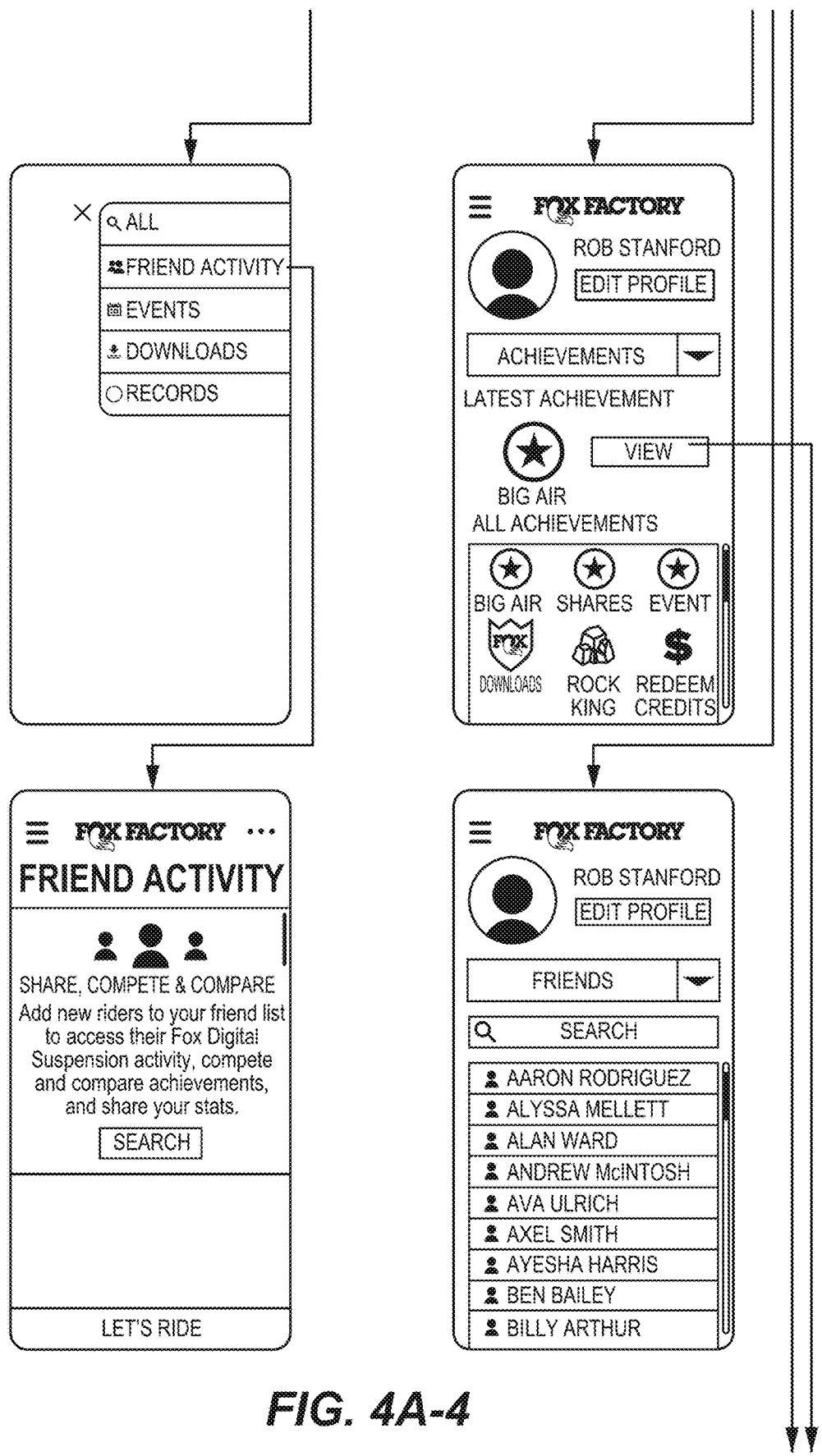
Figures 4, 4A, 5:
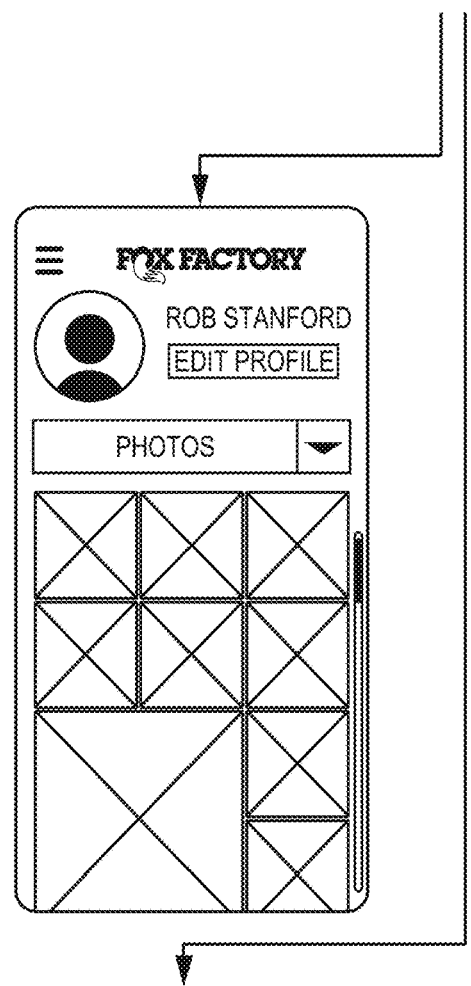
Figure 4A:
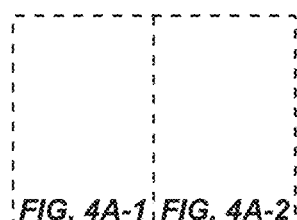
Figures 1, 4B:
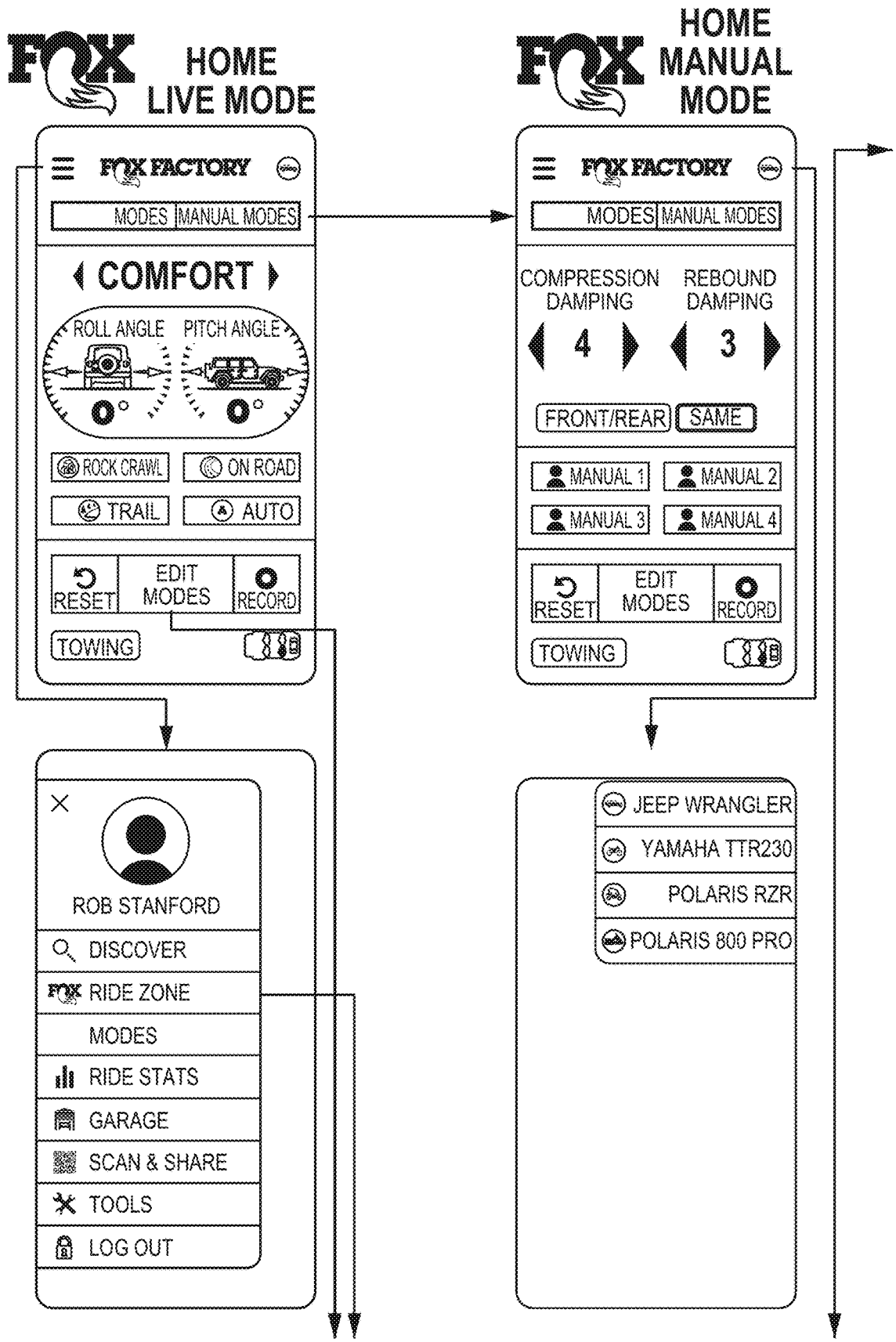
Figures 2, 4B:
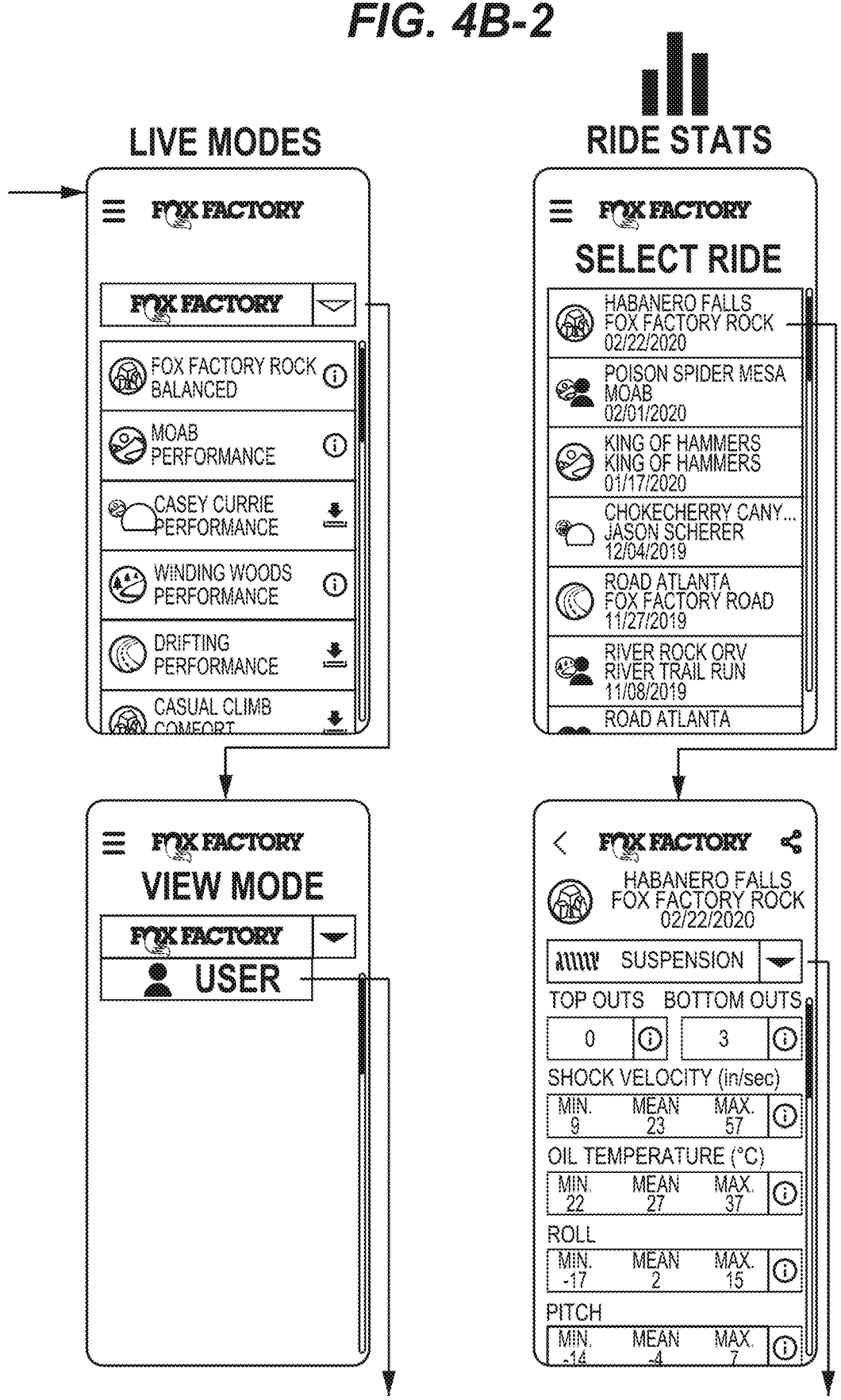
Figures 3, 4B:
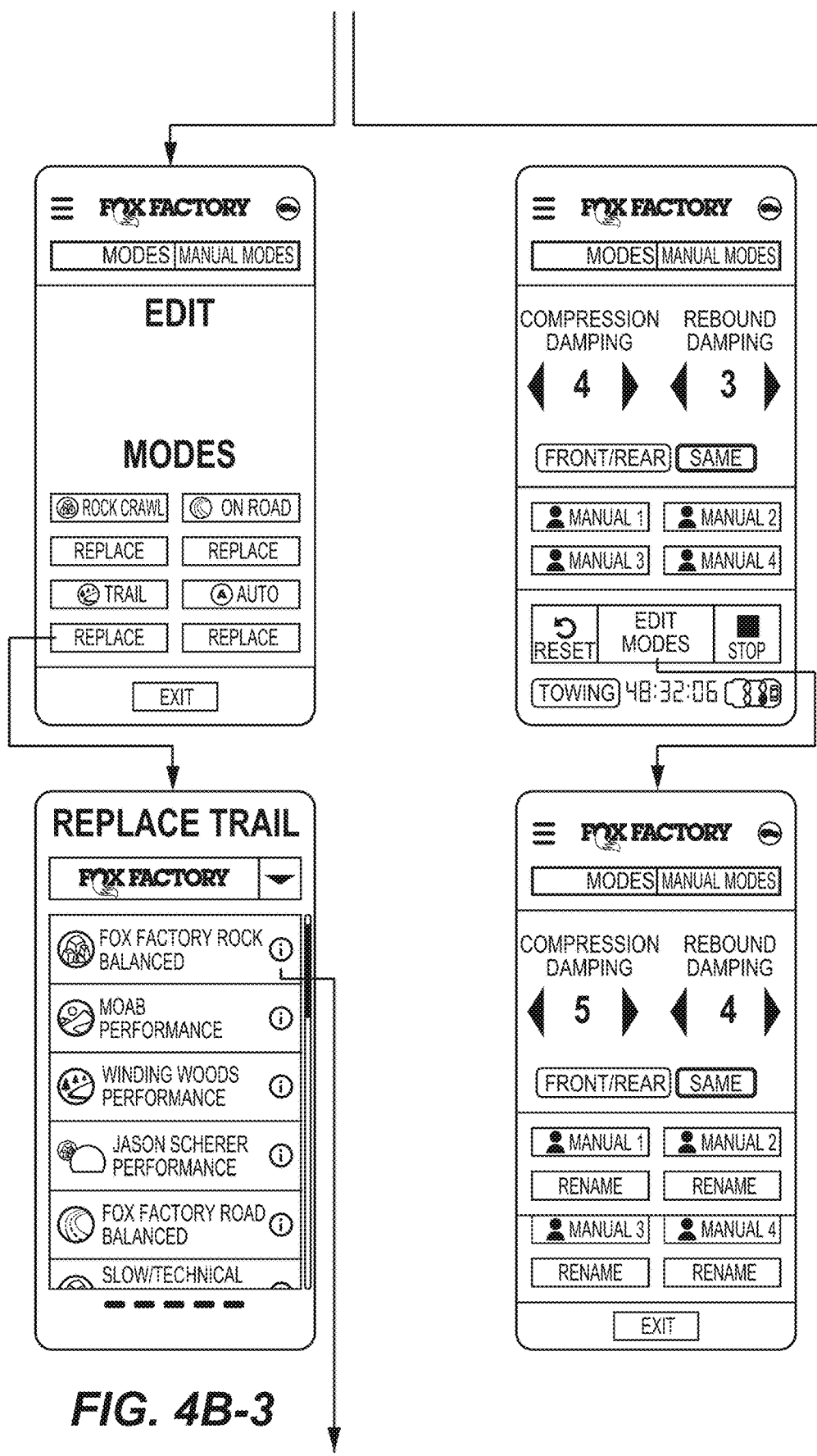
Figures 4, 4B:
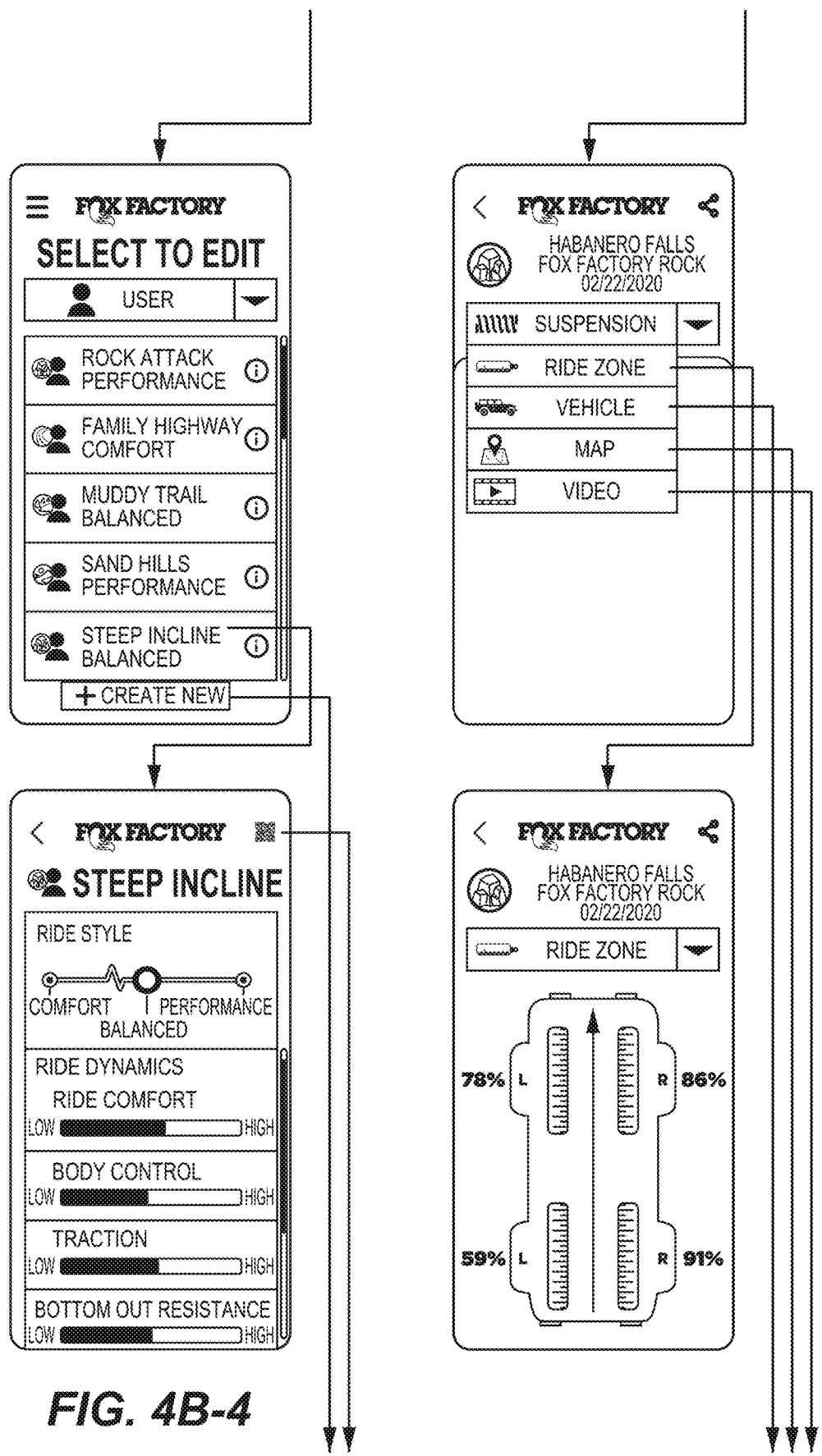
Figures 4, 4B, 5:
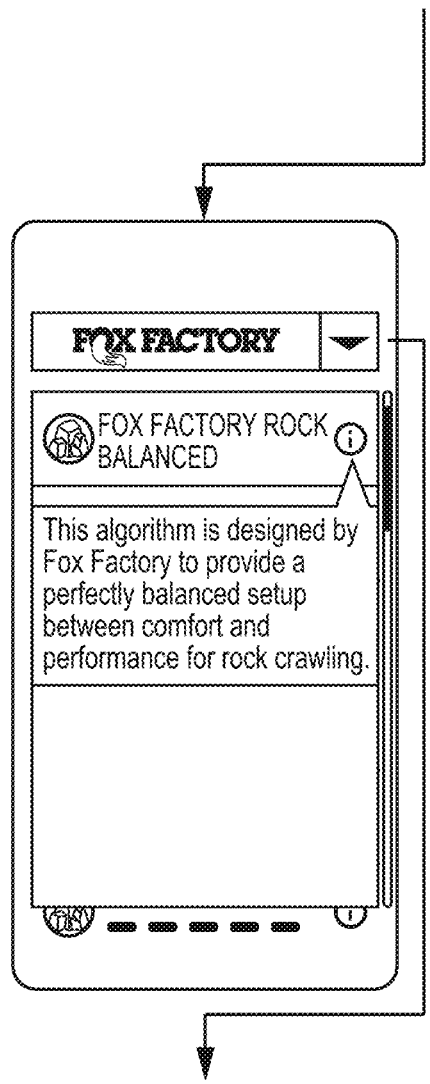
Figures 4, 4B, 5, 6:
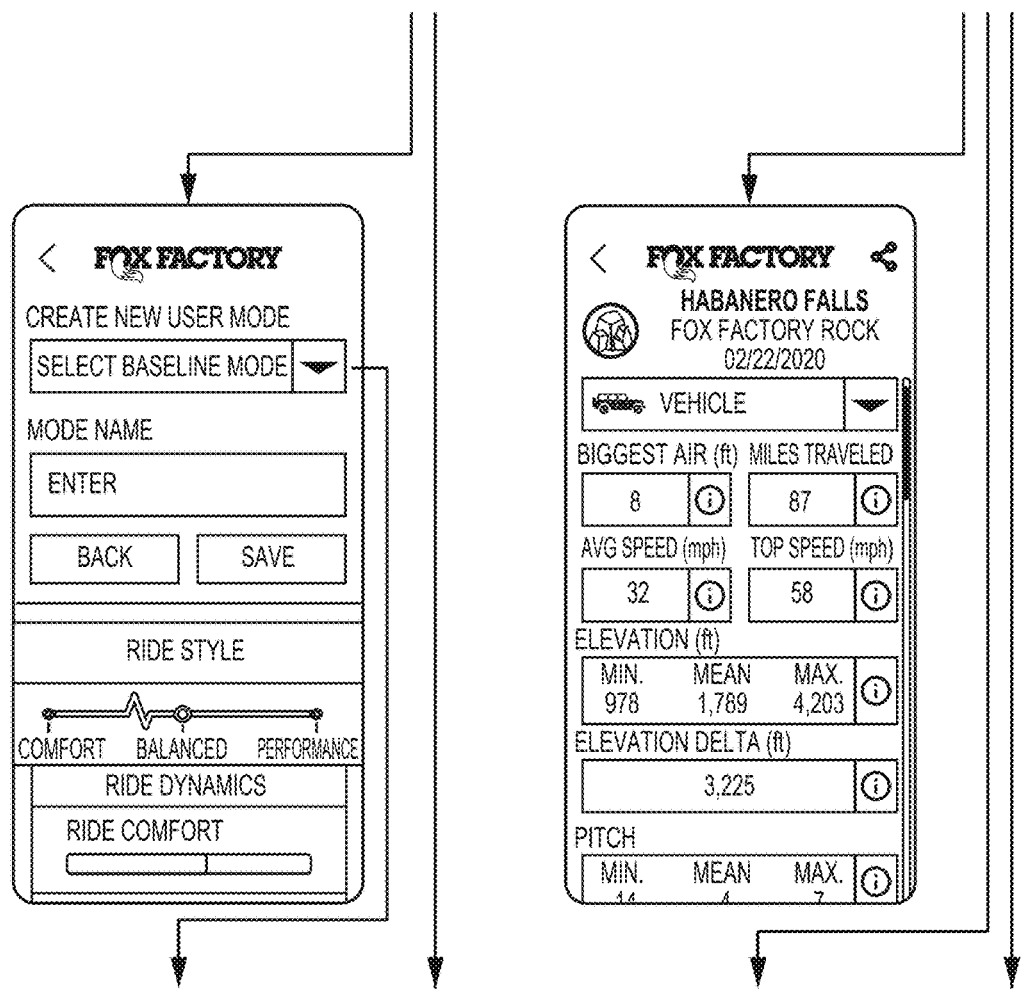
Figures 1, 4C:
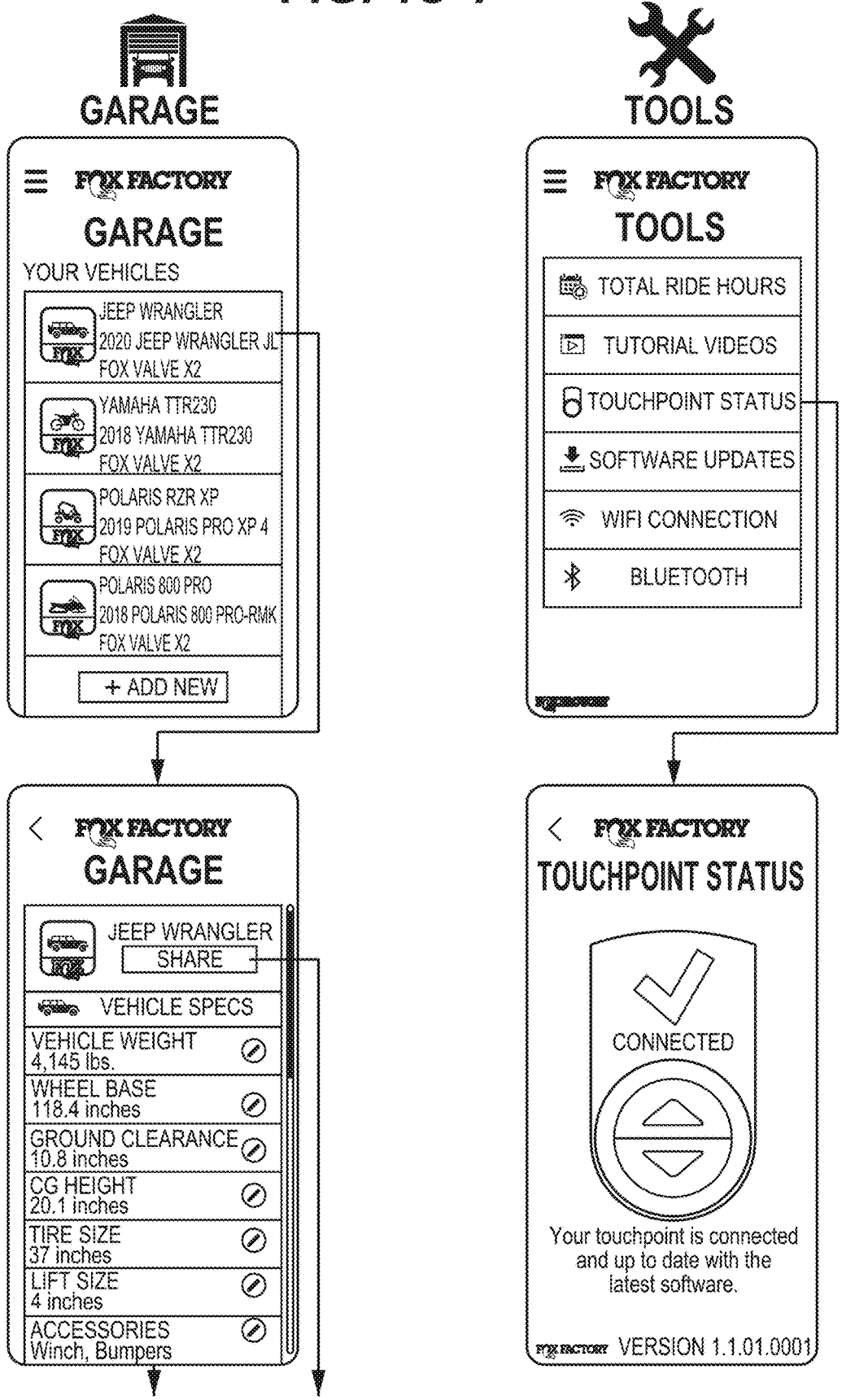
Figures 2, 4C:
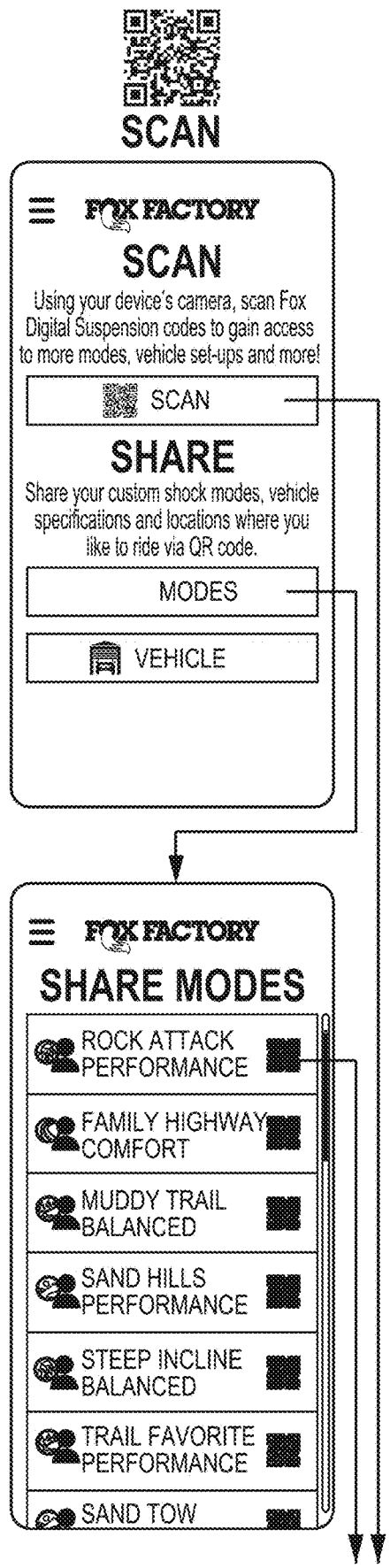
Figures 3, 4C:
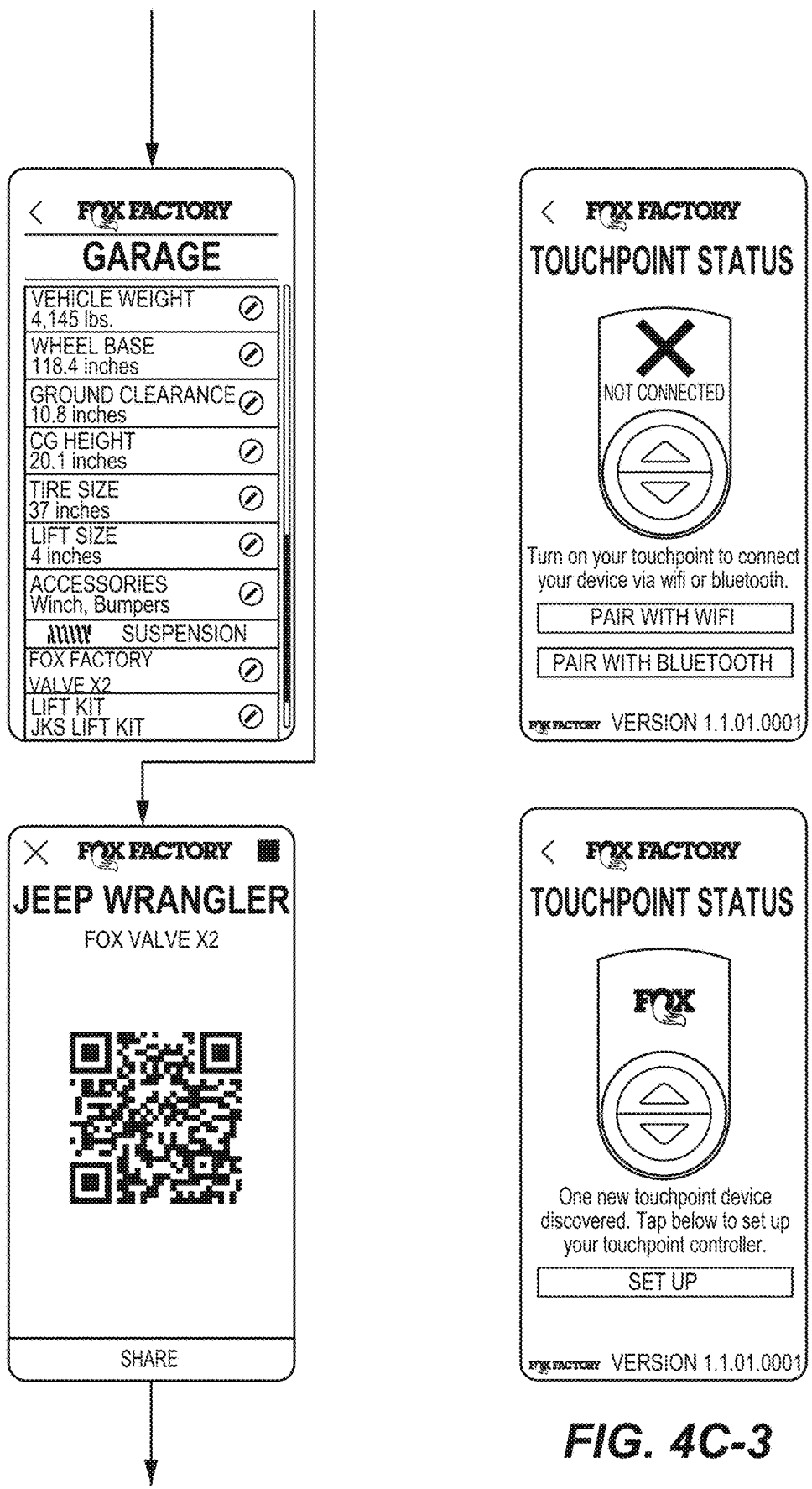
Figures 4, 4C:
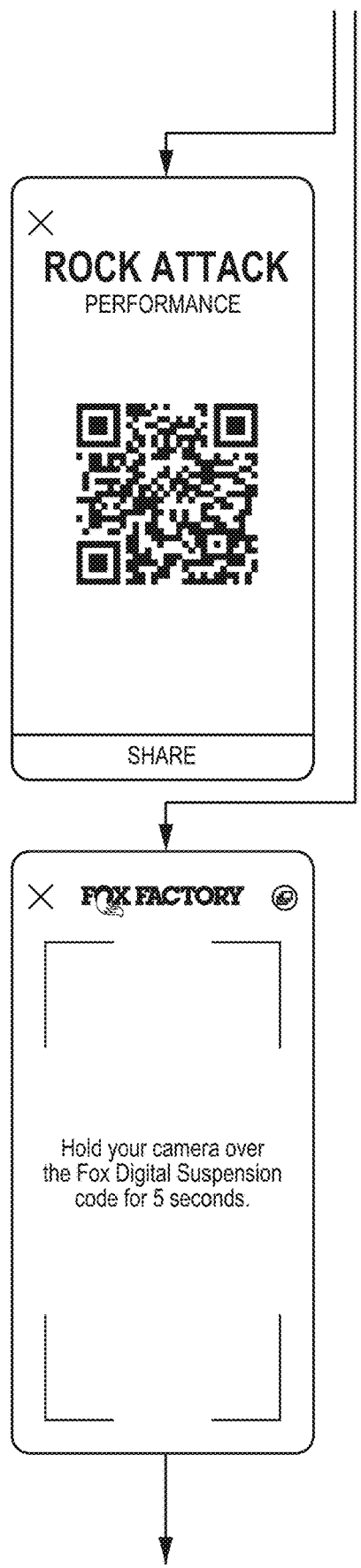
Figures 4, 4C, 5:
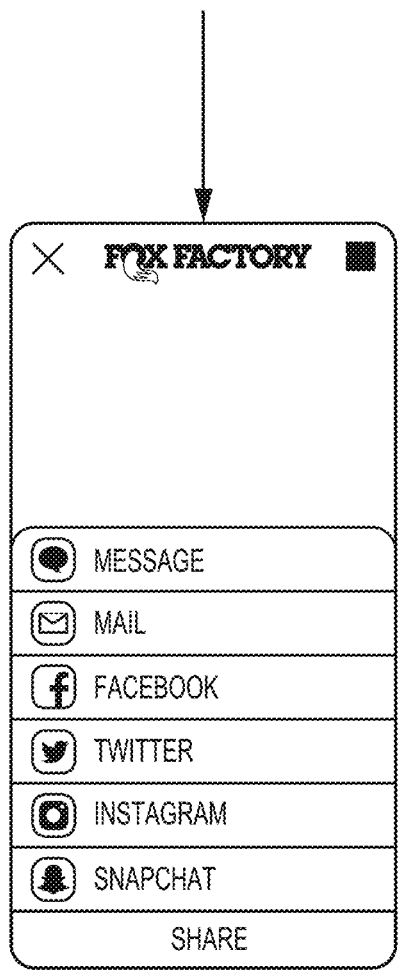
Figures 4, 4C, 5, 6:
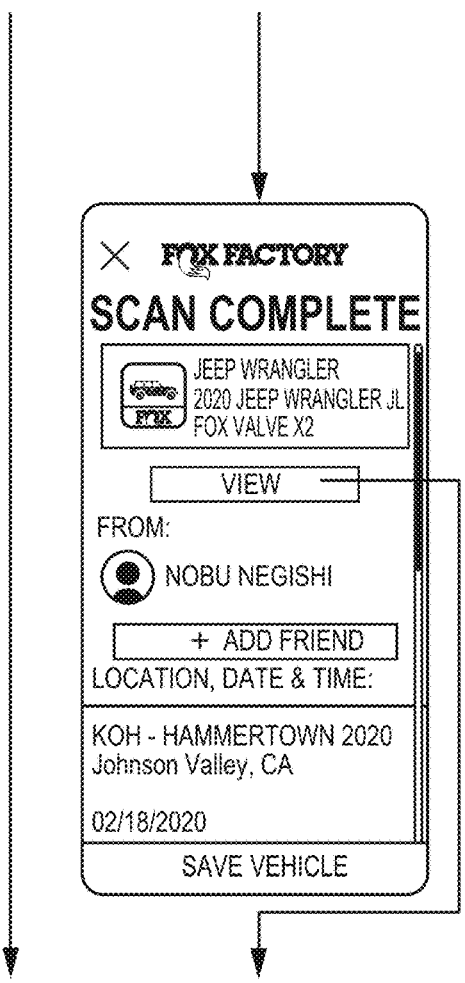
Figure 4C:

In one embodiment, as shown in FIGS. 3C-1 through 3C-3, a screenshot of the ability for a user to post the ride stats is shown. The post could be to a social media site, an email (text, SMS, etc.) message to a friend or group, or the like.

In one embodiment, as shown in FIGS. 3C-1 through 3C-3, garage 230 includes a number of submenu items starting with an overview of a given vehicle. For example, the user could select the vehicle (if they have more than one) and then look at vehicle stats and clearances, tire information, suspension information, lift information, accessories, and the like. In one embodiment, the vehicle information, including accessories, modifications, upgrades, and the like, could be used to calculate a number of vehicle dynamic properties including center of gravity (CG), which in turn, among others, could influence the main control algorithm(s).

In one embodiment, the second submenu is a compilation of information about the drives made by the user for the specified vehicles. The compilation of information can include total trips, suspension (vehicle, tire, or accessory, etc.) manufacturer credits or rewards, ranking in a gamification scenario, and the like.

The third submenu is a listing of friends, competitors, groups, etc. that the user wants to compete with, compare to, or otherwise send and receive information to and from. The fourth submenu is a place to store compilations of information for friends, events, records, awards, downloads, tunes, and the like.

In one embodiment, as shown in FIGS. 3C-1 through 3C-3, tools 235 includes submenu items such as, total ride hours, tutorial videos, remote digital suspension adjuster status, software updates, connectivity, and the like. These menus are where a user would go to ensure the IVI system suspension control application 17 is up-to-date, is connected, and where a user is able to obtain technical or actual instruction, information, and the like.

In one embodiment, the IVI system 14 may be integrated with the vehicle structure, suspension components, suspension component controller(s) and data processing system as described in U.S. Pat. Nos. 7,484,603; 8,838,335; 8,955, 653; 9,303,712; 10,060,499; 10,443,671; and 10,737,546; each of which is herein incorporated, in its entirety, by reference. The IVI system 14 and active valve 1650 (e.g. electric solenoid or linear motor type—note that a rotary motor may also be used with a rotary actuated valve) may be integrated herein utilizing principles outlined in SP-861-Vehicle Dynamics and Electronic Controlled Suspensions SAE Technical Paper Series no. 910661 by Shiozaki et. al. for the International Congress and Exposition, Detroit, Mich., Feb. 25-Mar. 1, 1991 which paper is incorporated herein, in its entirety, by reference. Further, the IVI system 14 could incorporate vehicle systems consisting of one or more sensor(s), imagers, active valves, active shock assemblies, suspension system controllers and the like. Further, the principles of patents and other documents incorporated herein by reference, may be integrated one or more embodiments hereof, individually or in combination, as disclosed herein.

In one embodiment, the suspension control application 17 on IVI system 14 will receive data from the one or more sensor(s), review the data, and make suspension adjustments in a matter of milliseconds. In so doing, the suspension control application 17 on IVI system 14 can continually process the sensor data and constantly provide adjustments to active suspension components thereby adjusting the overall vehicle suspension for maximum efficiency and control.

For example, in one embodiment, the vehicle sensors will read a bump input at the wheel, the pitch angle of the vehicle, telemetry attributes such as angle, orientation, velocity, acceleration, RPM, operating temperature, and the like. This sensor data will be used by the suspension control application 17 on IVI system 14 to generate suspension adjustments for one or more vehicle shock assemblies via one or more of the active valves (e.g., active valve 1650). For example, the active valve 1650 in a shock assembly will receive a signal from the suspension control application 17 on IVI system 14 to adjust one or more flow paths to modify the damping characteristics of the shock assembly.

In one embodiment, the suspension control application 17 on IVI system 14 can also communicate wired or wirelessly with other smart devices such as another IVI system 14, a mobile device 150, a computing system, and/or any other smart component(s) within a transmission range of IVI system 14. For example, in one embodiment, IVI system 14 can communicate with other computing devices wired or wirelessly via systems such as near field communication (NFC), WAN, LAN, Bluetooth, WiFi, ANT, GARMIN® low power usage protocol, cellular, USB port, line-in, thunderbolt, radio frequency, or any suitable power or signal transmitting mechanism. In one embodiment, IVI system 14 can also communicate with other smart devices using an intermediary such as a user's mobile device 150, a vehicle's wireless communication capabilities, or the like.

In one embodiment, IVI system 14 connectivity allows the IVI system 14 to communicate with other IVI systems. In one embodiment, the communication could be with a remote digital suspension adjuster, an IVI system on a second vehicle, or any number of IVI systems on any number of vehicles. In one embodiment, the ability to communicate over a network allows components, devices, IVI systems, and the like to provide information therebetween.

Mobile App Section

Referring now to FIGS. 4A-1 through 4A-5, are a flow diagram of a first portion of an exemplary set of IVI system screens and capabilities on a mobile device, in accordance with an embodiment. With reference now to FIGS. 4B-1 through 4B-6, are a flow diagram of a second portion of an exemplary set of IVI system screens and capabilities on a mobile device, in accordance with an embodiment. With reference now to FIGS. 4C-1 through 4C-6, are a flow diagram of a third portion of an exemplary set of IVI system screens and capabilities on a mobile device, in accordance with an embodiment.

FIGS. 4A-1 through 4C-6 illustrate an embodiment of an example of UI options (similar to those of FIGS. 3A-1 through 3C-3 using the IVI system 14) that are displayed via a mobile device 150 based application 154 having different menus and submenus instead of (or in addition to being displayed on IVI system 14) in accordance with an embodiment.

FIG. 5A is a diagram of a number of screenshots of the mobile device 150 showing ride stats 225, garage 230, and tools 235 in accordance with an embodiment. In one embodiment, garage 230 can include some or all of a user's vehicles such as cars, motorcycles, side-by-sides, snow mobiles, boats, etc. In one embodiment, the information can be transferred between the user's mobile device 150 and the IVI system 14 of a vehicle.

Figure 5B:
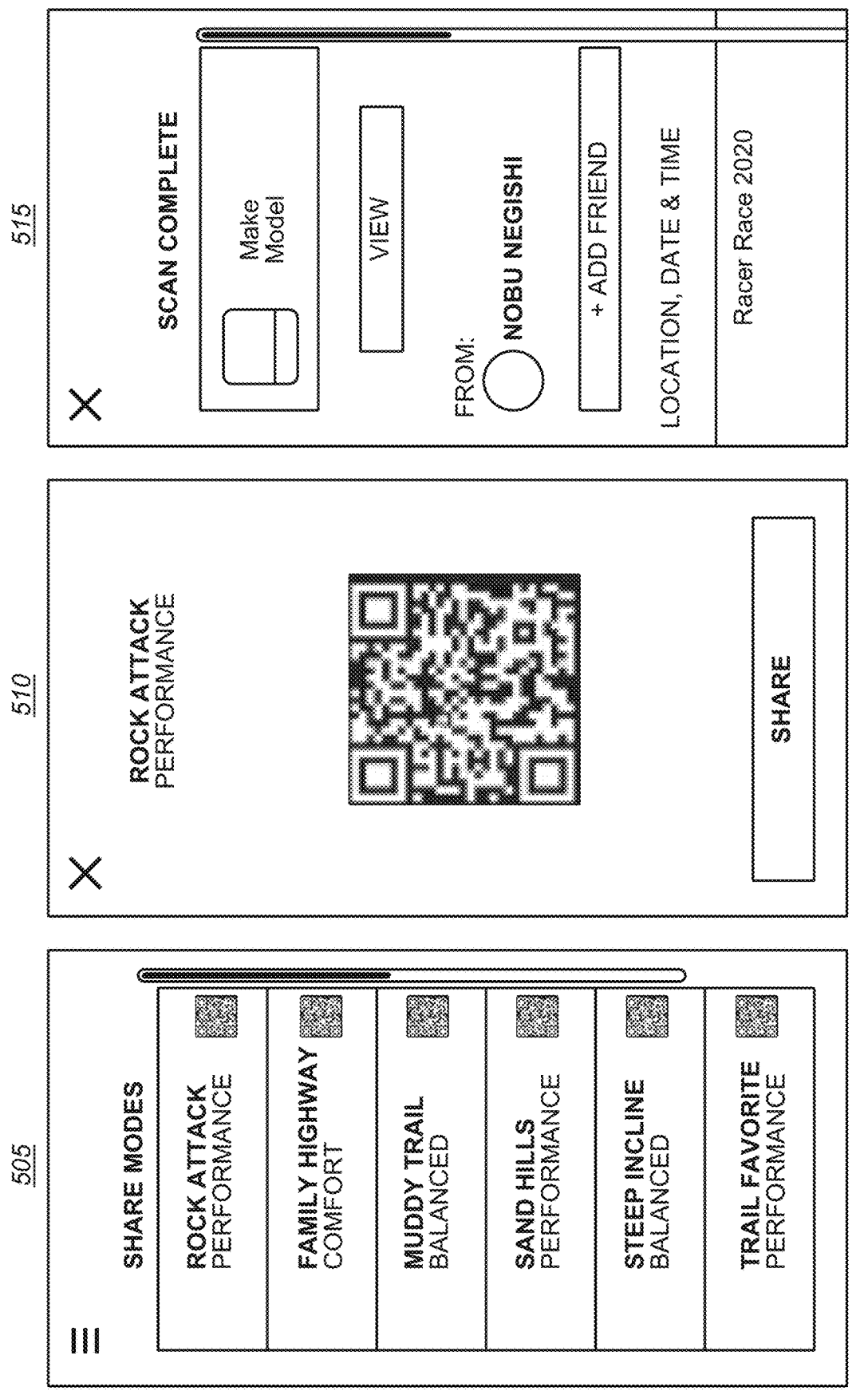
FIG. 5B is a diagram of a number of an additional number of screenshots of the mobile device, in accordance with an embodiment.

FIG. 5B is a diagram of a number of alternative screenshots of the mobile device, in accordance with an embodiment. In one embodiment FIG. 5B includes a number of share modes. The first share mode provides a share mode selection 505 for who to share the information with, performance share 510 that is the information being shared, and a share received 515. In one embodiment, share mode selection 505 allows a user to share information between friends, between similar vehicles, and the like.

Once the selection is made, e.g., by clicking on one of the groups presented on the share mode selection 505, performance share 510 will bring up a QR code (or other computer readable image) that will include data such as suspension settings, and the like. In one embodiment, performance share 510 will allow another mobile device 150 to scan the QR code (or receive the information via NFC or the like). Once the shared information is obtained the shared data is displayed such as shown in share received 515.

Figure 5C:
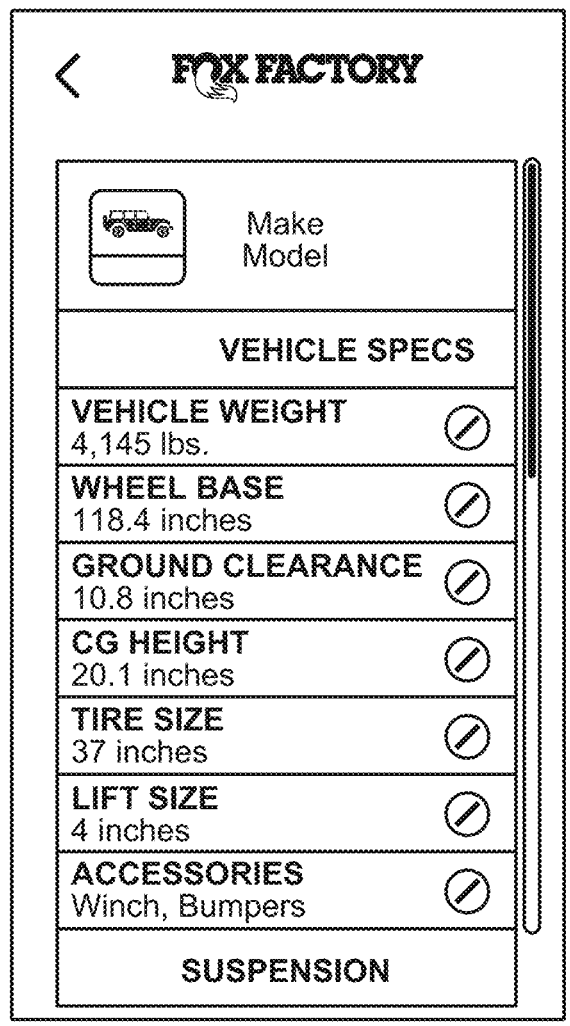
FIG. 5C is a screenshot of the mobile device, in accordance with an embodiment.
Figure 6:
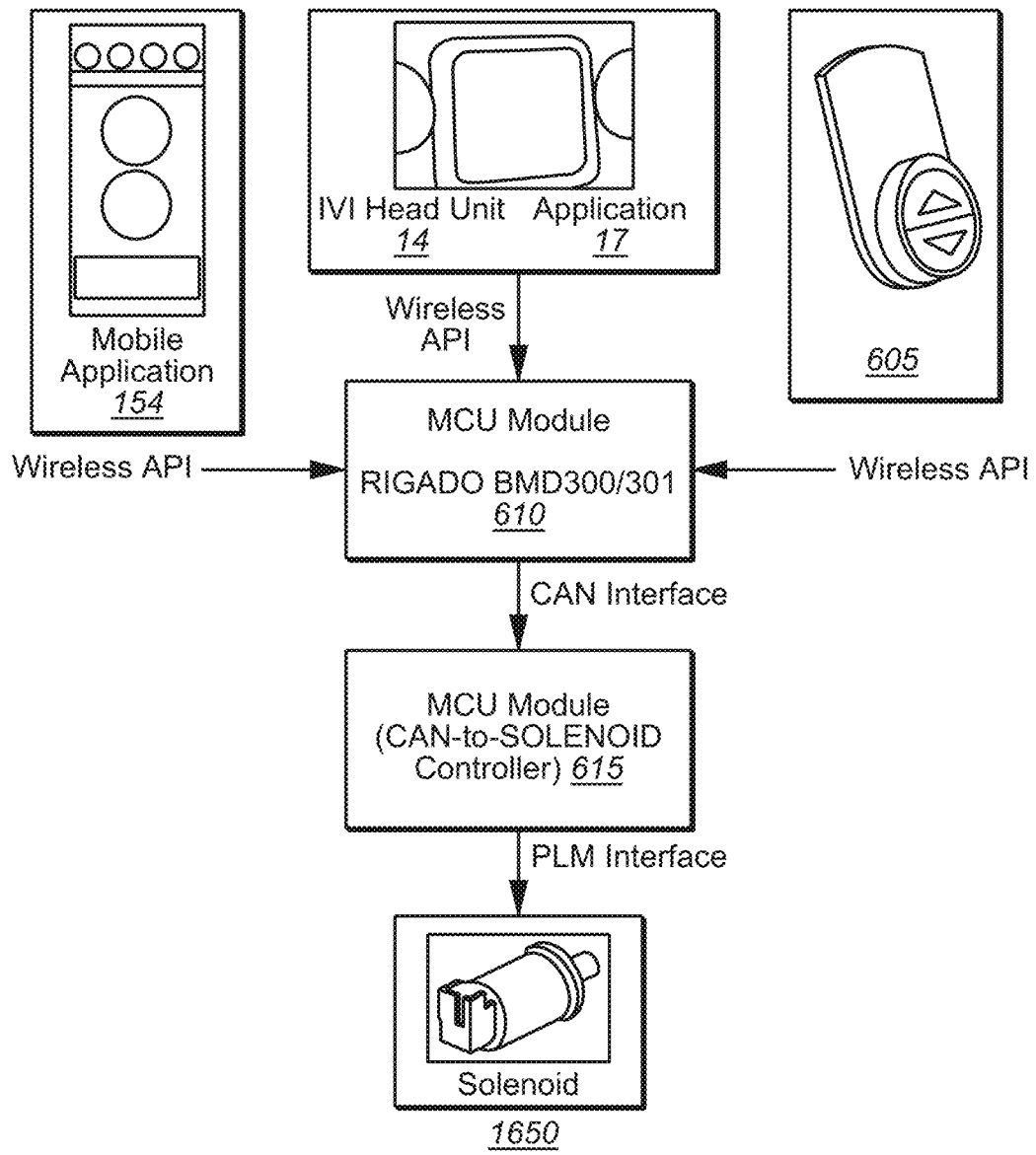

FIG. 5C is a screenshot 520 of the mobile device 150, in accordance with an embodiment. In one embodiment, as shown in screenshot 520, the sharing of data can include data such as a user's vehicle specs, vehicle upgrades (lift types, manufacturers, etc.), and the like. Although a number of features are shown in FIGS. 5A-5C, in one embodiment, the features of one or more of the screens could include more, fewer, different, or a different organization of information than that shown in the Figures. Thus, the information and configuration shown in FIGS. 5A-5C is meant as one example of one embodiment.

Remote Digital Suspension Adjuster

FIG. 6 is a system block diagram including the remote digital suspension adjuster 605 in accordance with one embodiment. In one embodiment, the components and technologies interacting with remote digital suspension adjuster 605 include one, some, or all of the IVI system 14, a mobile application 154, the remote digital suspension adjuster 605, an MCU module 610 (such as a wireless communication protocol-to-CAN Controller), an MCU module 615 (such as a CAN-to-Solenoid Controller), and an active valve 1650.

In one embodiment, the topology shown in FIG. 6 is based on existing Live E1 and GitHub assets and documentation such that the gateway is configured as a near field communication (NFC) peripheral node, with the mobile device 150 action as the central node. In one embodiment, the nodes could use other types of wired or wireless communications such as, but not limited to, Bluetooth, WiFi, ANT, GARMIN® low power usage protocol, cellular, Bluetooth Low Energy (BLE), UHF radio signal, Worldwide Interoperability for Microwave Access (WiMax), industrial, scientific, and medical (ISM) band, IEEE 802.15.4 standard communicators, Zigbee, ANT, ISA100.11a (wireless systems for industrial automation: process control and related applications) wireless highway addressable remote transducer protocol (HART), MiWi, IPv6 over low-power wireless personal area networks (6LoWPAN), thread network protocol, subnetwork access protocol (SNAP), and the like.

In another embodiment, the system topologies can use different device and component configurations for the communication, interaction, and the like. For example, in one embodiment, the IVI system 14 and gateway act as peripherals and CAN nodes. In one embodiment, the system topologies can use different device and component configurations for the communication, interaction, and the like. For example, in one embodiment, a mobile device 150 and/or remote digital suspension adjuster 605 can act as wireless central and two gateways as wireless peripherals. In one embodiment, the system topologies can use different device and component configurations for the communication, interaction, and the like. For example, a mobile device 150 can act as a wireless central.

In general, remote digital suspension adjuster 605 is an intuitive design that allows a user to made a rapid adjustment or change to a predefined component. In one embodiment, remote digital suspension adjuster 605 encourages user engagement with suspension components, provides an iconic reminder of the underlying suspension and promotes initial sales and aftermarket upgrades for shock platforms.

In one embodiment, IVI system 14 including the IVI system suspension control application 17 and/or the mobile application 154 provide a user accessible interface to better understand suspension adjustment and allow a user to "mess with" suspension settings to evaluate and learn. Moreover, these systems and applications enable personalization of ride settings that can be performed manually, by using another's suspension system settings, make location based changes, and the like. By using the applications and IVI system, new services can be delivered to a customer, while also increasing brand awareness and the consumer base using tune sharing, social media, and the like. In one embodiment, the applications and IVI system will also collect user data for use in providing improvements in performance, set-ups, tuning; suggestions for upgrades, modifications, and the like; and interactive event capabilities, advertising, sharing, and the like.

In one embodiment, ESCU 10 using the suspension control application 17 on IVI system 14 will reduce redundancy in electronic hardware, and provide an experience that can be improved with software updates that can also provide new capabilities. ESCU 10 using the suspension control application 17 on IVI system 14 will also provide an access point to OEM peripherals such as cameras and sensors thereby enabling better suspension control algorithms.

In one embodiment, a remote digital suspension adjuster 605 (or touch point) refers to a physical component that is located remotely from the suspension and that can interact with some part of the electronic vehicle suspension control system 35 and, suspension control application 17 on IVI system 14, and/or mobile device 150.

For example, the remote digital suspension adjuster 605 may be located in the driver or passenger area of a vehicle and have a wired and/or wireless communication capability. In one embodiment, the remote digital suspension adjuster 605 provides a driver and/or passenger with the ability to quickly adjust the suspension system or a component of the suspension system such as the damping characteristics of one or more shock assemblies.

In one embodiment, the remote digital suspension adjuster 605 works by communicating with the suspension control application 17 on IVI system 14 and its enabling components. In one embodiment, the remote digital suspension adjuster 605 works by communicating directly with (and to adjust) the electronic vehicle suspension control system 35. In one embodiment, the remote digital suspension adjuster 605 works by communicating with mobile device 150 and its enabling components.

In general, the remote digital suspension adjuster 605 is an easily accessed physical device that is capable of providing quick access and adjustment to one or a few select aspects of digital suspension adjustment. In one embodiment, the remote digital suspension adjuster 605 can be used with the suspension control application 17 on IVI system 14 or without a suspension control application 17 on IVI system 14 if it is not available. In one embodiment, if there is no suspension control application 17 on IVI system 14, the remote digital suspension adjuster 605 can use FOX's live E1 system or other suspension controller communication capabilities.

Figure 7A:
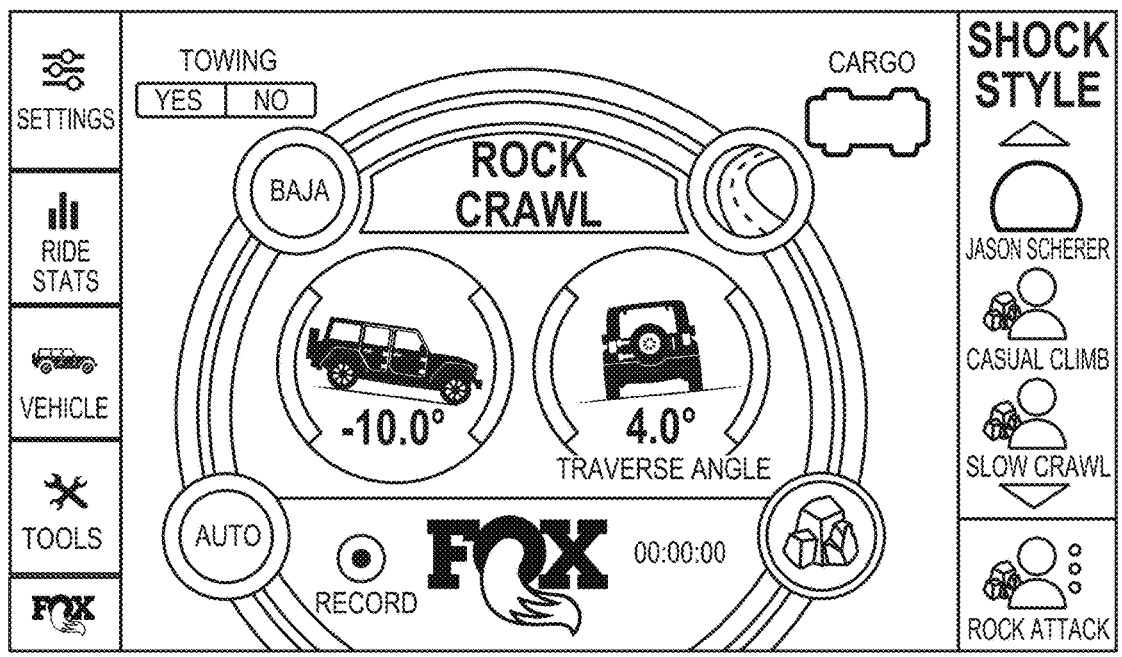
FIGS. 7A and 7B are component views of the vehicle suspension management system, in accordance with an embodiment.
Figure 7A:
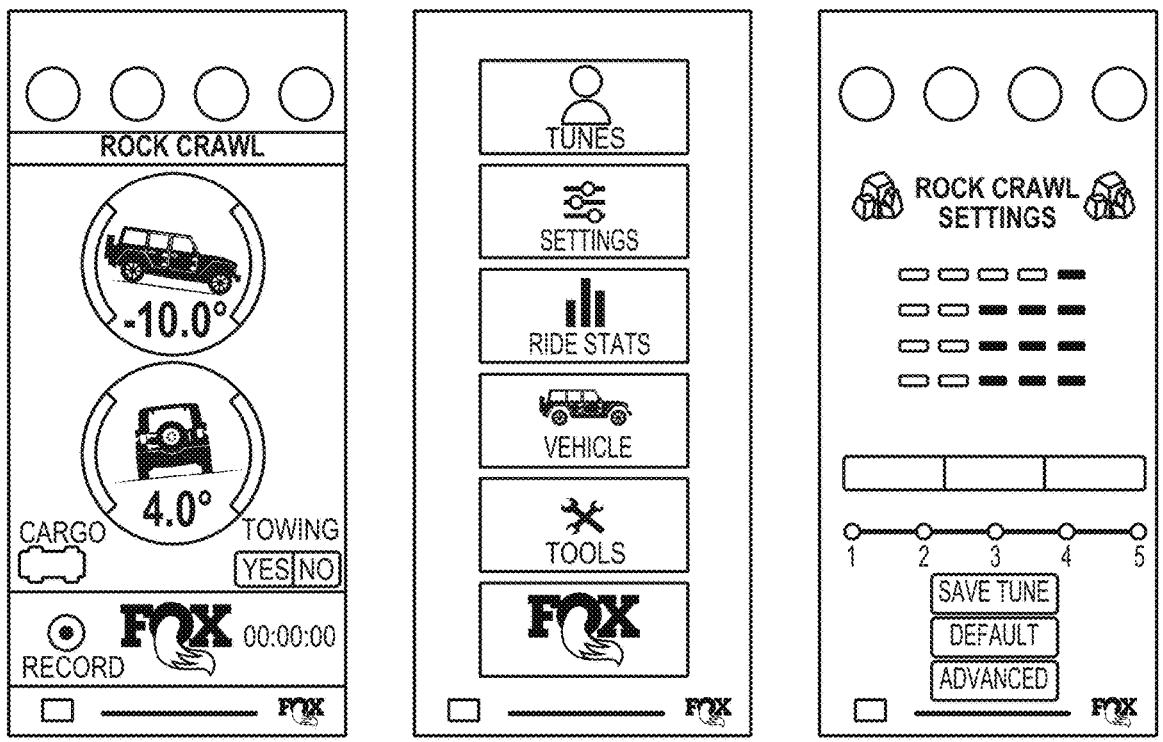
Figure 7B:
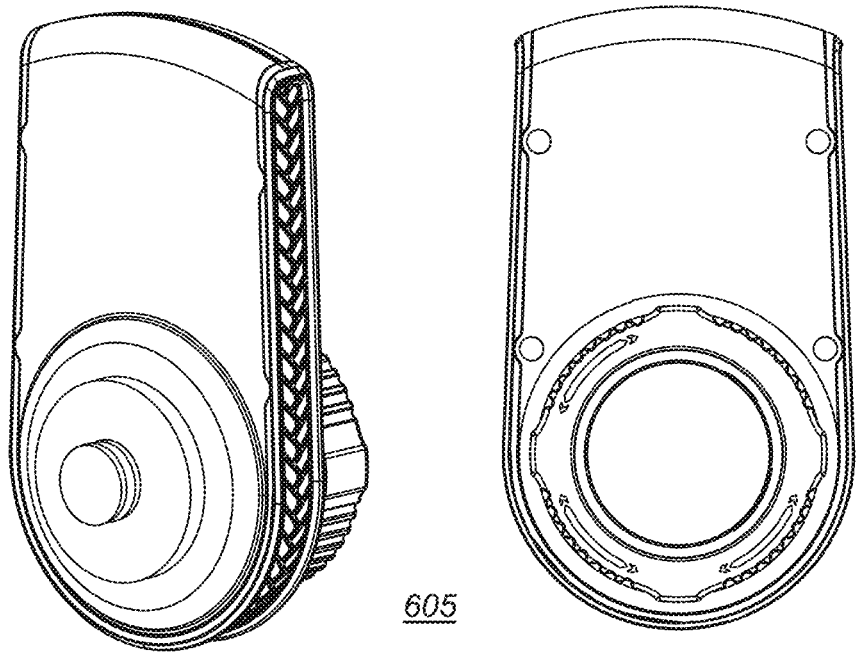
Figure 7B:
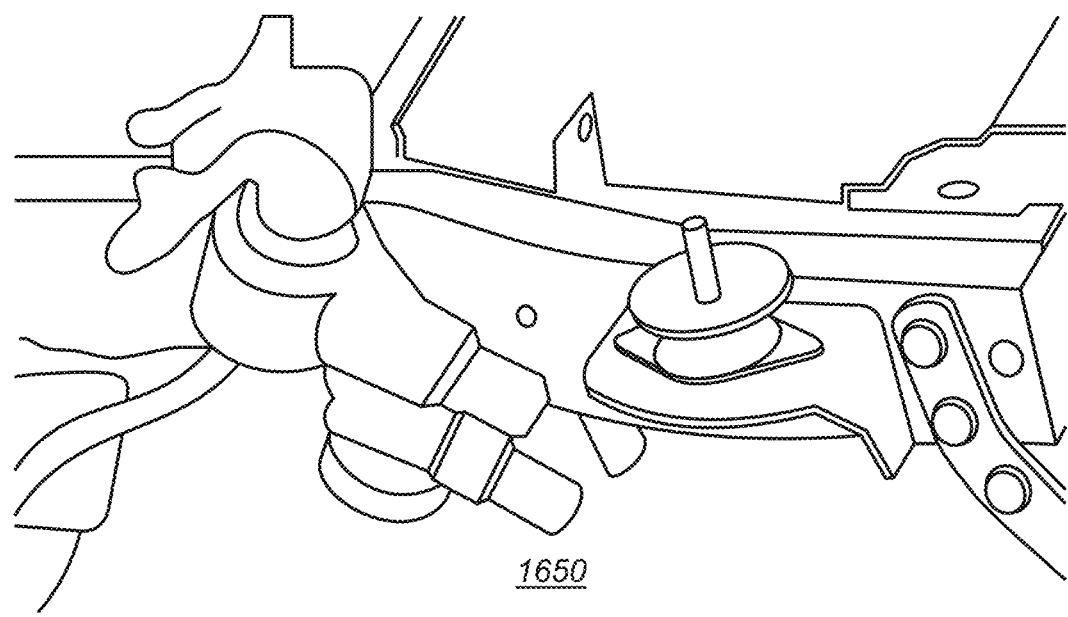
Figure 8:
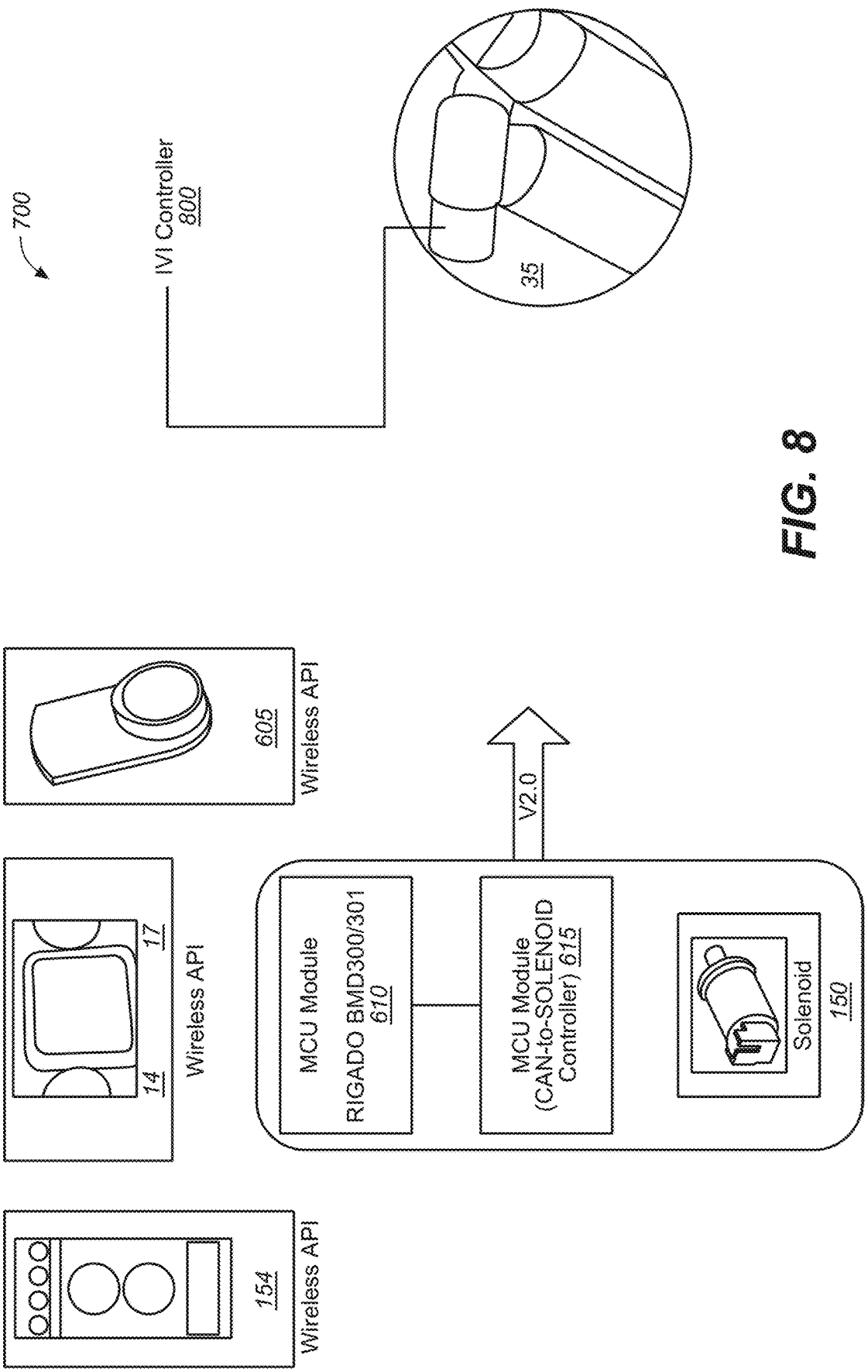

In one embodiment, as shown in FIGS. 7A and 7B are component views of a number of different components include one, some, or all of the vehicle suspension management system 700 in accordance with an embodiment. In one embodiment, vehicle suspension management system 700 includes suspension control application 17 on IVI system 14, a remote digital suspension adjuster 605, mobile application 154, and an active (or live) valve 1650.

FIG. 8 is a system block diagram of the vehicle suspension management system 700 that includes a mobile device 150 in accordance with an embodiment. In general, vehicle suspension management system 700 of FIG. 8 includes of the suspension control application 17 on IVI system 14, the remote digital suspension adjuster 605, mobile device 150, IVI controller 800, and shock assembly 38.

Figure 9:
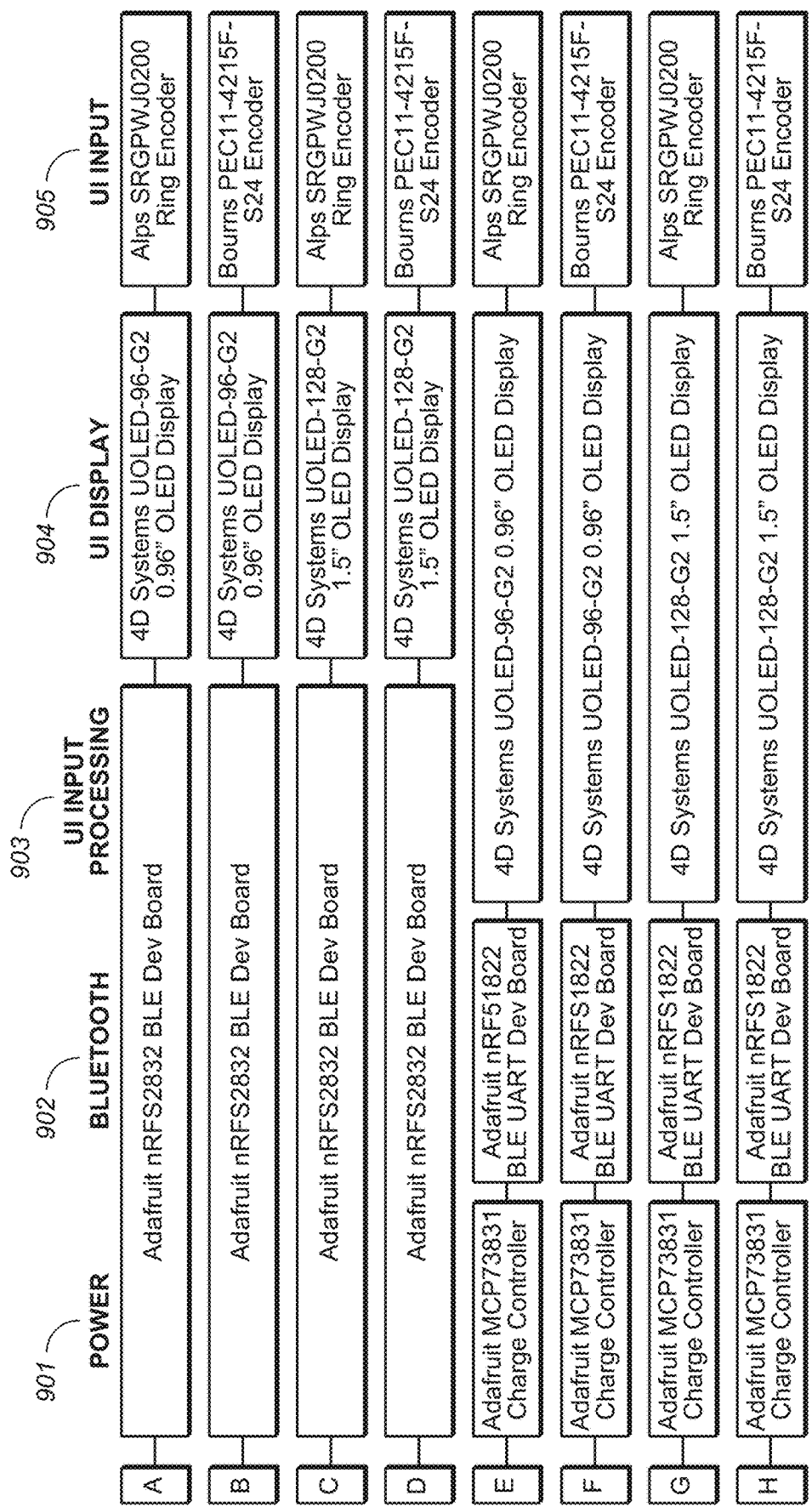
FIG. 9 is a flow diagram of different component configurations for the remote digital suspension adjuster, in accordance with an embodiment.

FIG. 9 is a flow diagram of some different component configurations for the remote digital suspension adjuster 605 in accordance with an embodiment. In one embodiment, the ID form factors are shown, however, it should be appreciated that the form factors are merely one embodiment and other components may have other form factors. In one embodiment, the components include power 901, communication 902, UI input processing 903, UI display 904 and UI input 905.

Figure 10A:
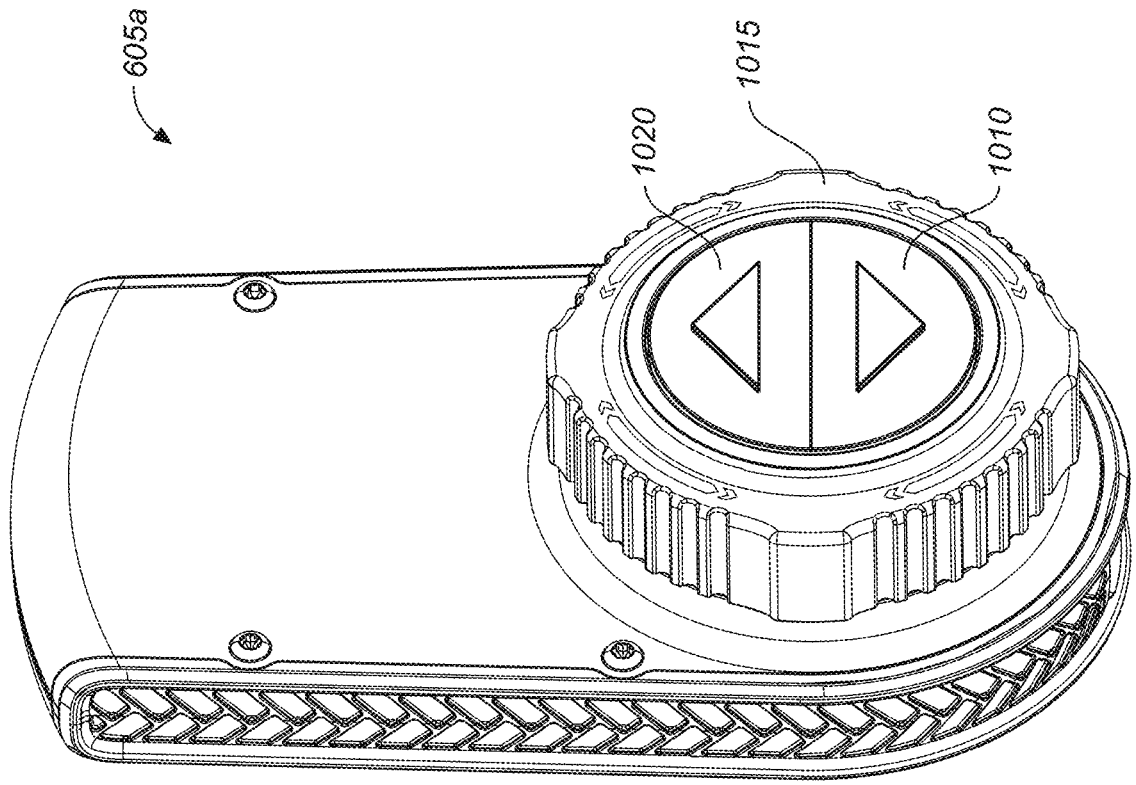
FIG. 10A is a plurality of isometric views of a configuration of a remote digital suspension adjuster, in accordance with an embodiment.

FIG. 10A is a plurality of isometric views of one configuration of a remote digital suspension adjuster shown in accordance with an embodiment. In one embodiment, the remote digital suspension adjuster 605a could be mounted in auxiliary port 12V (Cigarette lighter), on an A-pillar, mounted on the steering wheel, mounted at a location that is designated by the use based on the user's preferences, used as a handheld device, and the like. In one embodiment, the remote digital suspension adjuster 605a includes a dial 1015, up button 1020, and down button 1010.

In one embodiment, up button 1020 and down button 1010 allow a user to toggle between features such as adjusting for terrain or for firmness. Once the mode is selected (e.g., firmness), the adjustments to the mode (e.g., the firmness) can be made via user input on the rotary dial.

Figure 10B:
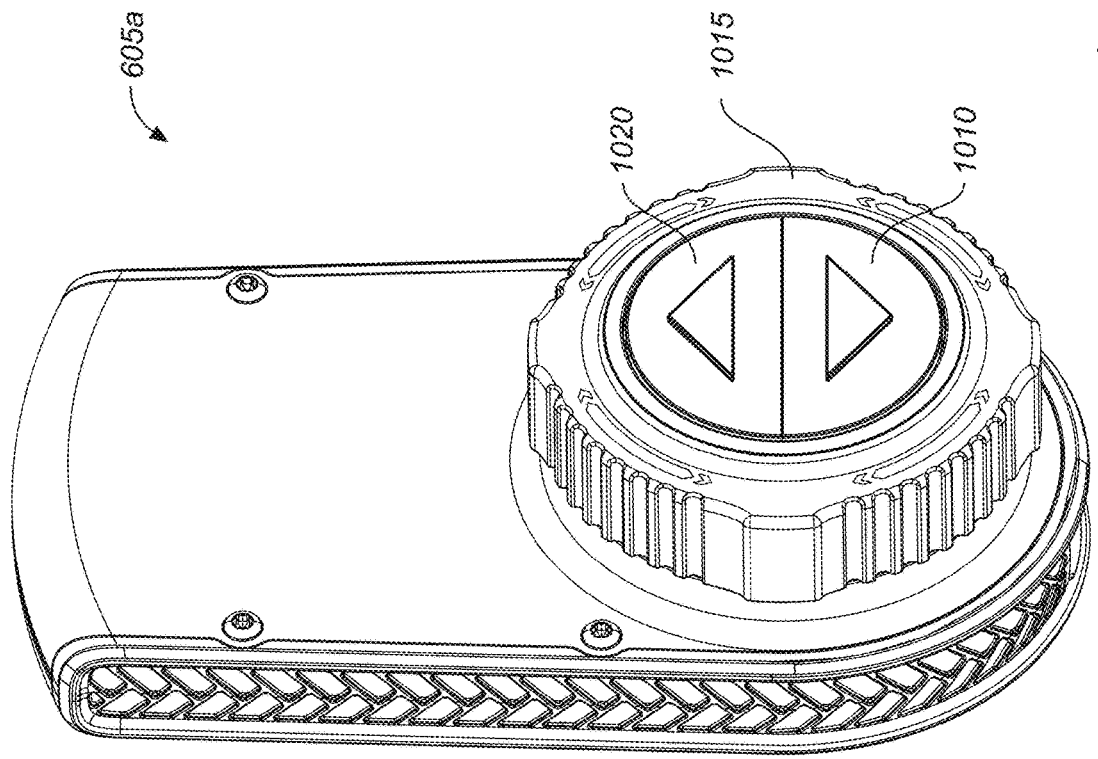
FIG. 10B is a plurality of isometric views of a configuration of a remote digital suspension adjuster with a clamping mechanism, in accordance with an embodiment.
Figure 10B:
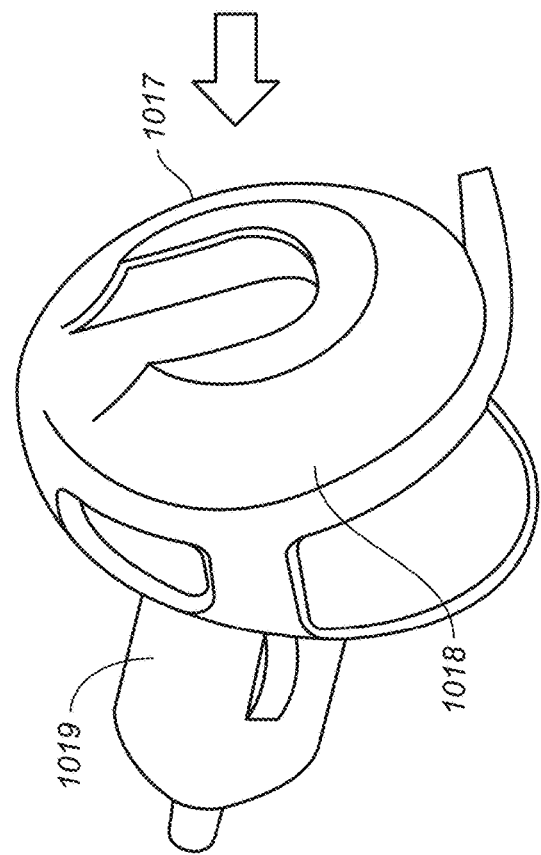

FIG. 10B is a plurality of isometric views of a configuration of a remote digital suspension adjuster 605a with a clamping mechanism, in accordance with an embodiment. In one embodiment, the remote digital suspension adjuster 605a includes a 12-volt auxiliary port (or other powered port type) clamping mechanism 1019. In one embodiment, the clamping mechanism is a quick-turn mechanism for accommodating varying manufacturing diameters of power plugs in automobiles. In one embodiment, clamping mechanism 1019 will provide a more secure and vibration resistant connection of electronic equipment. In one embodiment, clamping mechanism 1019 will include a port 1018 such as a charging port, USB port, or the like. In one embodiment, clamping mechanism 1019 has a slot 1017 for receiving and holding remote digital suspension adjuster 605a.

Figure 10C:
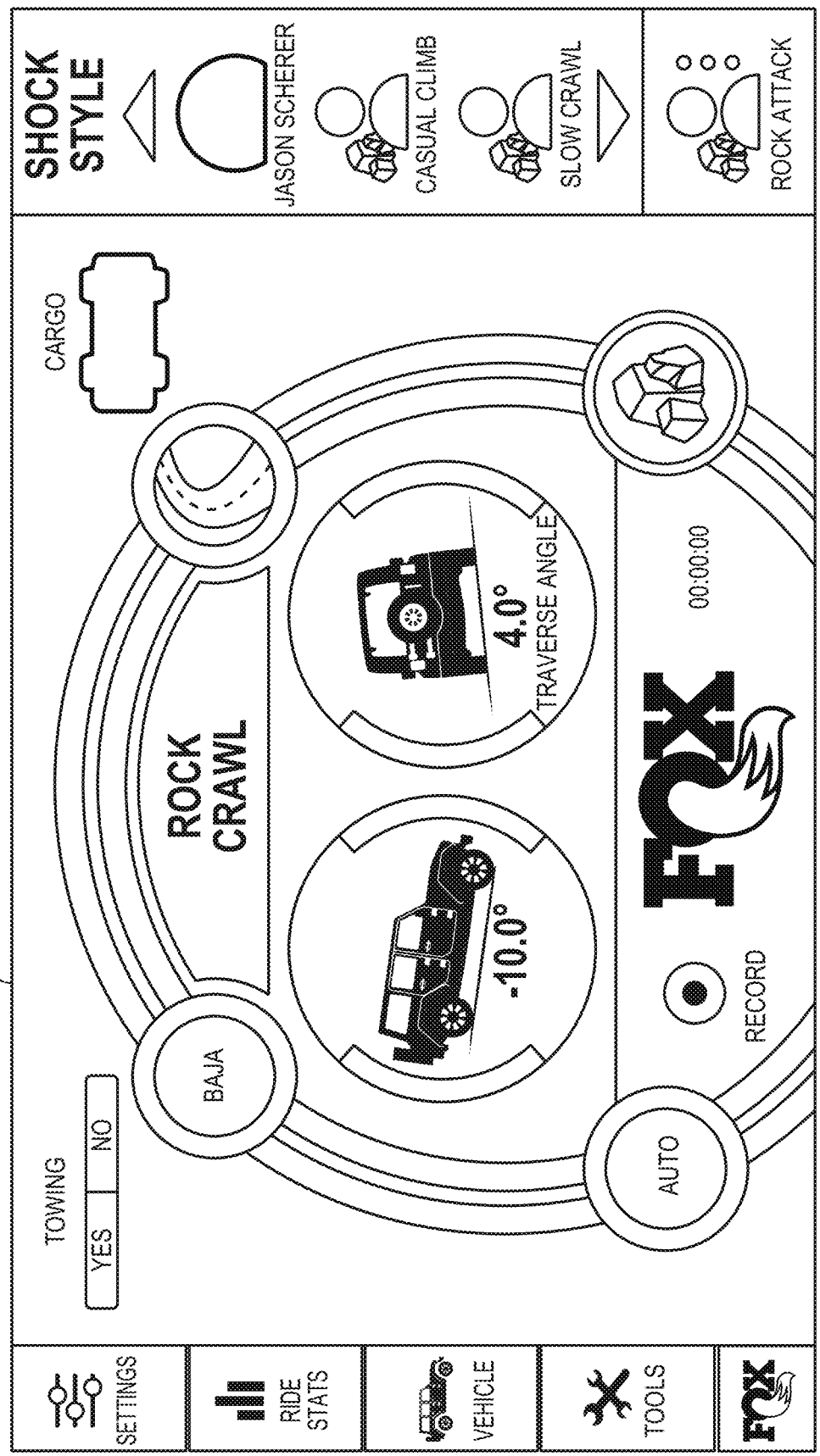
FIG. 10C is a screenshot of an IVI display for the IVI system showing the result of the input from the remote digital suspension adjuster, in accordance with an embodiment.

FIG. 10C is a screenshot of an IVI display for the suspension control application 17 on IVI system 14 showing the result of the input from the remote digital suspension adjuster 605a, in accordance with an embodiment. For example, as the user interacts with the remote digital suspension adjuster 605a, the suspension information will also be shown on the display 1055 of the IVI system 14.

Figure 10E:
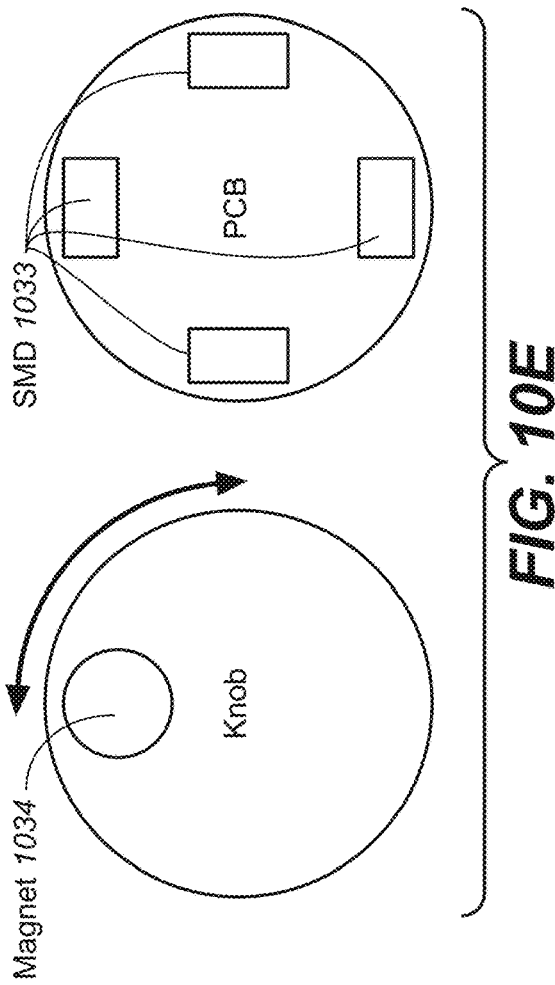
FIG. 10E is a sensor configuration for the remote digital suspension adjuster, in accordance with an embodiment.
Figure 10D:
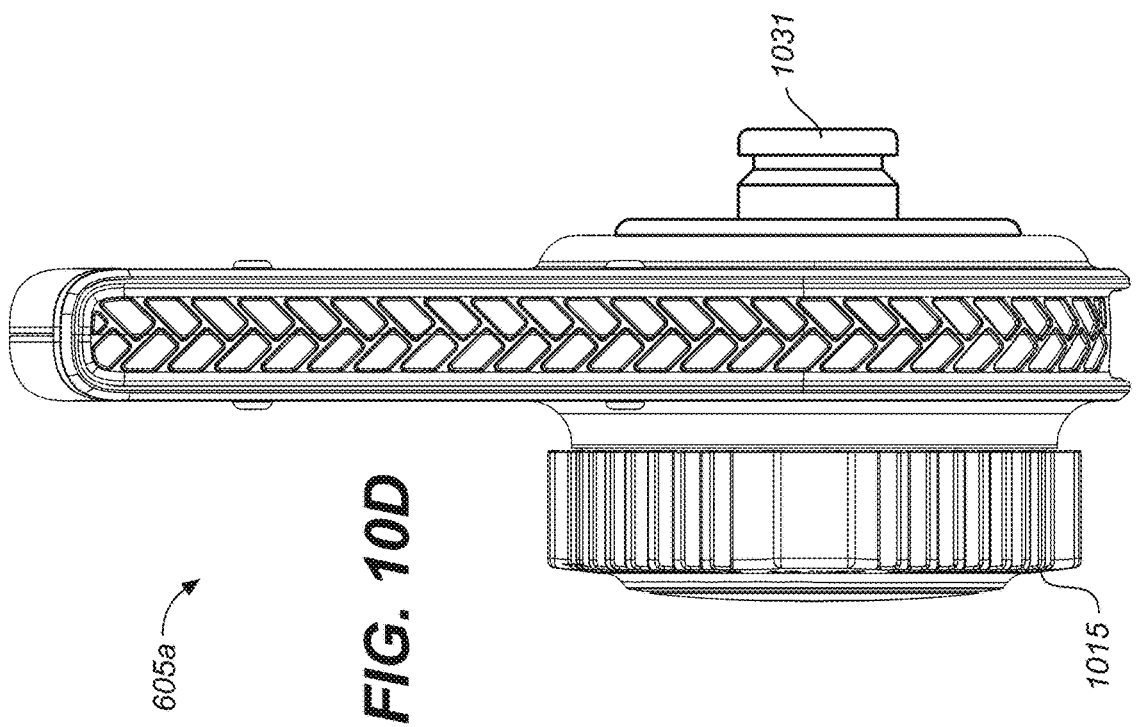
FIG. 10D is a transparent view of the remote digital suspension adjuster, in accordance with an embodiment.

FIG. 10D is a transparent view of the remote digital suspension adjuster 605a shown in accordance with an embodiment. In one embodiment, of remote digital suspension adjuster 605a, a custom trace encoder is used in place of an OTS ring encoder for flexibility of dial 1015 shape/size and overall package thinness. In one embodiment, the dial 1015 geometry is based on ergonomics, asthetics, and the like. In one embodiment, the trace encoder is only as thick as the printed circuit board (PCB). In one embodiment, the coupler 1031 on the back of remote digital suspension adjuster 605a is shown. In general, coupler 1031 will fit into slot 1017 of clamping mechanism 1019.

FIG. 10E is a sensor configuration for the remote digital suspension adjuster 605a shown in accordance with an embodiment. In one embodiment, a number of SMD hall effect sensors 1033 are positioned on a PCB such that the positioning of a knob mounted magnet 1034 over one of the SMD hall effect sensors 1033 will correspond to a selected mode. In so doing, the need for an encoder is eliminated and the minimum knob thickness is the height of the SMD components. Although one embodiment discloses SMD hall effect sensors 1033, it should be appreciated that other sensors may be used in different embodiments.

Figure 10F:
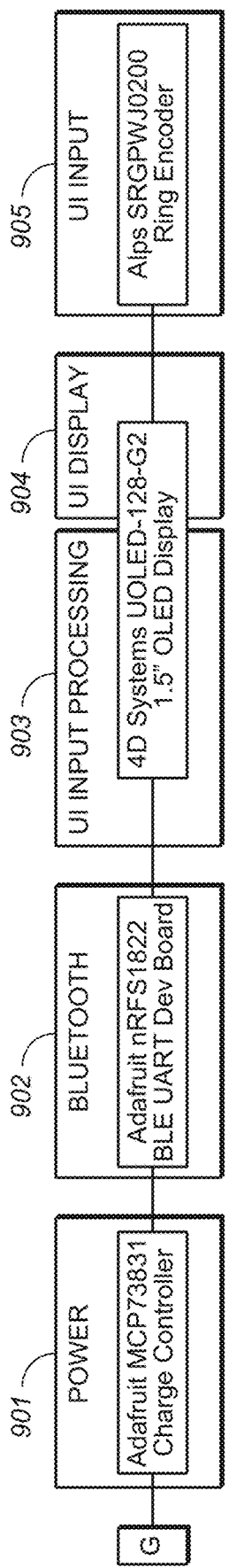
FIG. 10F is an exemplary component configuration for the remote digital suspension adjuster, in accordance with an embodiment.

FIG. 10F is an exemplary component configuration for the remote digital suspension adjuster 605a in accordance with an embodiment. In one embodiment, the ID form factors are shown, however, it should be appreciated that the form factors are merely one embodiment and other components may have other form factors. In one embodiment, the components include power 901, communication 902, UI input processing 903, UI display 904 and UI input 905.

Figure 11A:
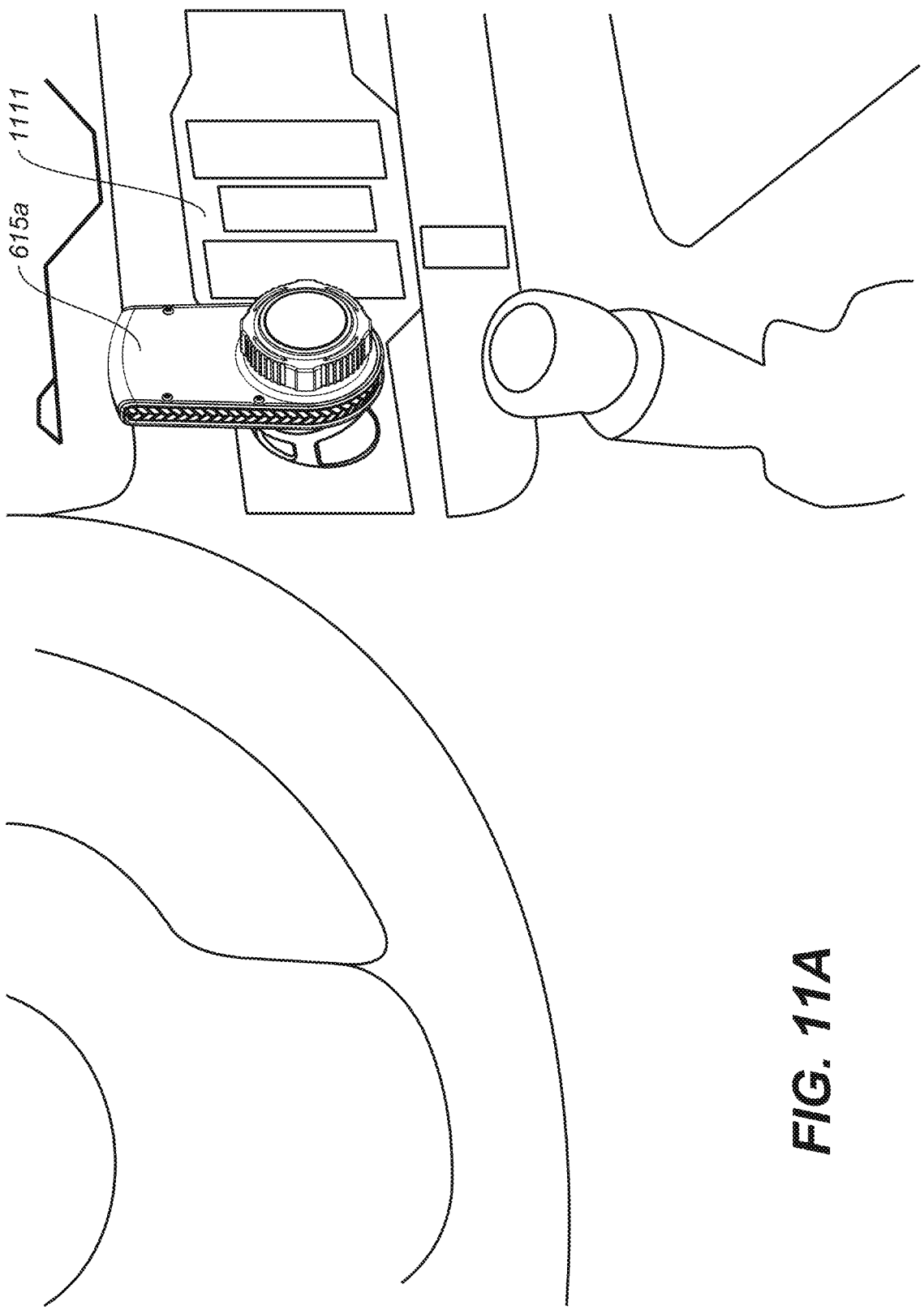
FIG. 11A is a perspective view of the remote digital suspension adjuster mounted to a power port, in accordance with an embodiment.

FIG. 11A is a perspective view of the remote digital suspension adjuster 605a mounted to a power port in the interior of a vehicle shown in accordance with an embodiment. In one embodiment, the remote digital suspension adjuster 605a is mounted to an access point on a console 1111 of the vehicle.

Figure 11B:
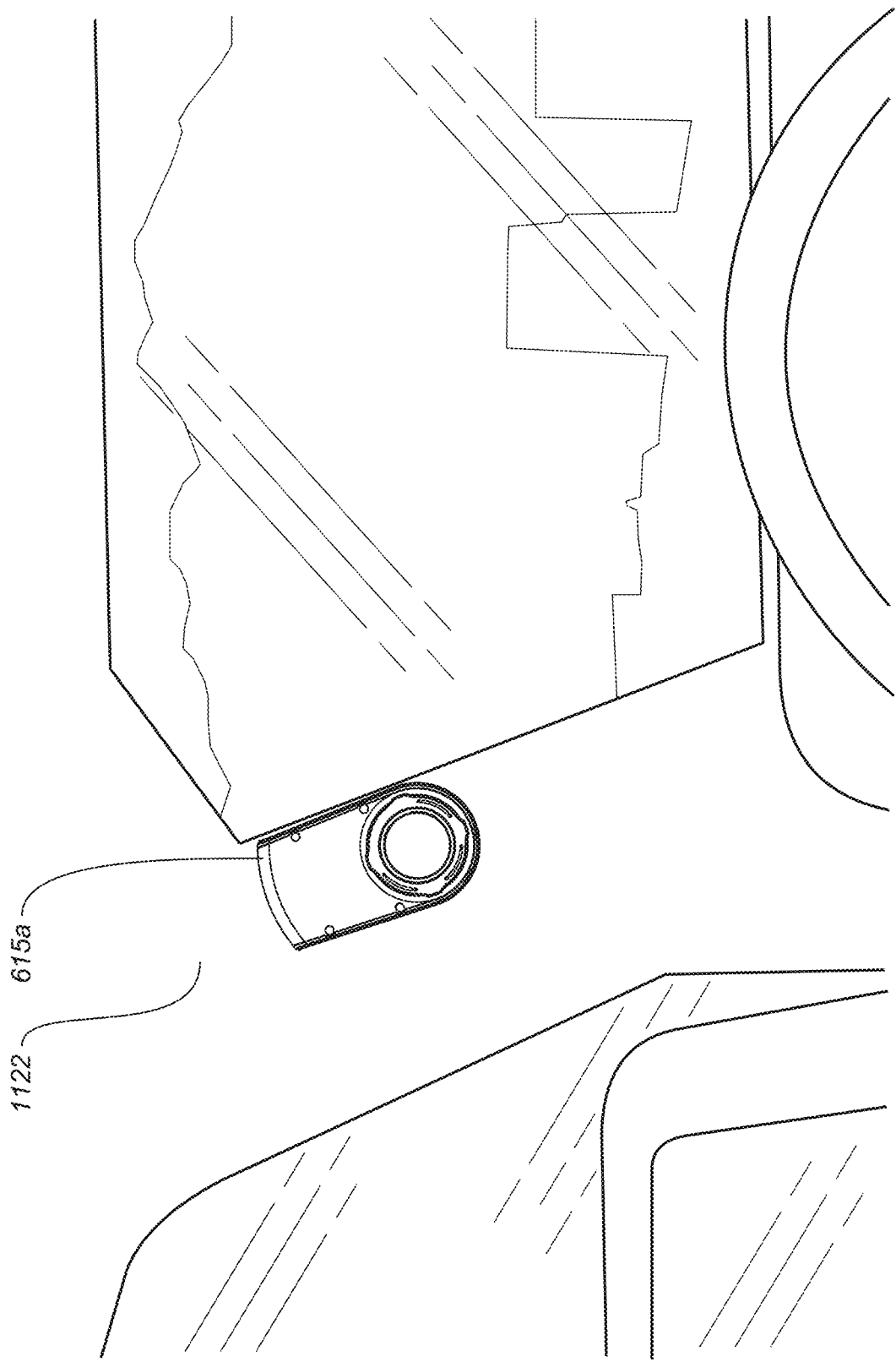
FIG. 11B is a perspective view of the remote digital suspension adjuster mounted to an A-pillar, in accordance with an embodiment.

FIG. 11B is a perspective view of the remote digital suspension adjuster 605a mounted to an A-pillar 1122 of a vehicle shown in accordance with an embodiment. In one embodiment, the remote digital suspension adjuster 605a can mount at the A-pillar, CLE port, center console, or any other auxiliary outlet location, or location with 12-volt power added thereto. In one embodiment, remote digital suspension adjuster 605a is powered by an internal battery.

Figure 12A:
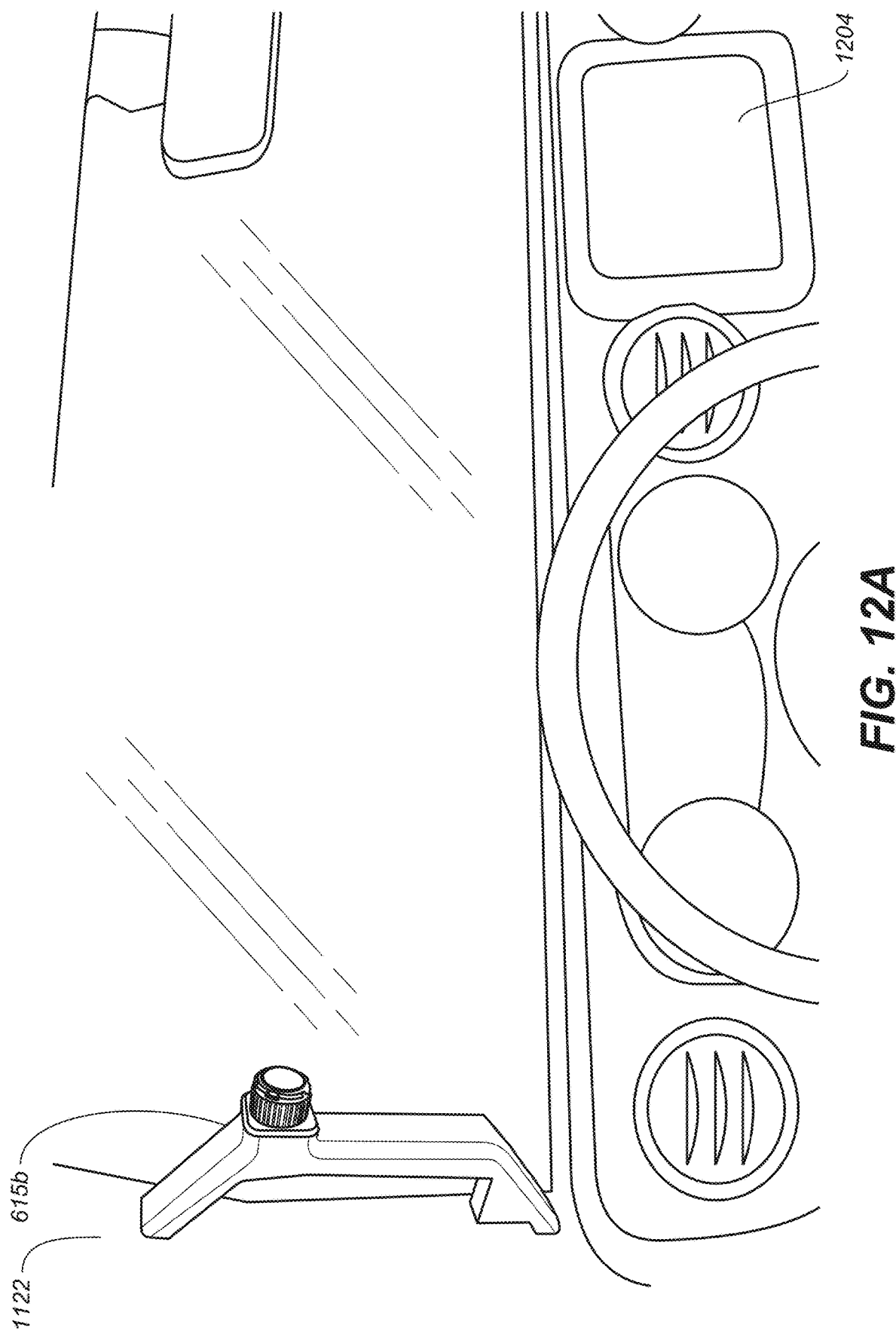
FIG. 12A is a perspective view of a vehicle with a grab handle device version of the remote digital suspension adjuster mounted to the A-pillar, shown in accordance with an embodiment.

Referring now to FIG. 12A, a perspective view of a vehicle with a grab handle device 605b version of the remote digital suspension adjuster 605 mounted to the A-pillar 1122 is shown in accordance with an embodiment. In one embodiment, grab handle device 605b is mounted to and hard wired through an A-pillar handle, or the like, of a vehicle such as the vehicle shown in FIG. 12A.

The automotive market has witnessed an acceleration in features being added to vehicles. As such, real estate for the placement of buttons, switches and controls has diminished. Many manufactures have attempted to consolidate control into touch screen devices such as display 1204, but often these features are buried within a few layers of the UI and may not be ideal, in a human factor's viewpoint, for features that require immediate access. Moreover, touchscreens have limited tactile response, and in certain situations, tactility enables the user to keep their eyes on the road, while receiving confirmation that the interaction they intend has been performed by the vehicle system.

The grab handle device 605b described herein provides a limited number of features or controls that include tactile input and is located in an already familiar location, or in an easily accessible location.

In one embodiment, grab handle device 605b is shown in context with an A-pillar of a vehicle to convey a benefit of the grab handle device 605b. However, in one embodiment, grab handle device 605b could be mounted to any vehicle that benefits from the usage of a traditional grab bar handle, or to any vehicle to which grab handle device 605b could be added.

In one embodiment, as shown in FIG. 12A, the driver's side grab handle device 605b is presented less than 18", or within arm's reach, of the steering wheel. This arm's reach distance (e.g., less than 18 inches) puts grab handle device 605b within a radius that is also utilized by other highly used controls such as the AC control, infotainment screen, gear lever and others.

Figure 12C:
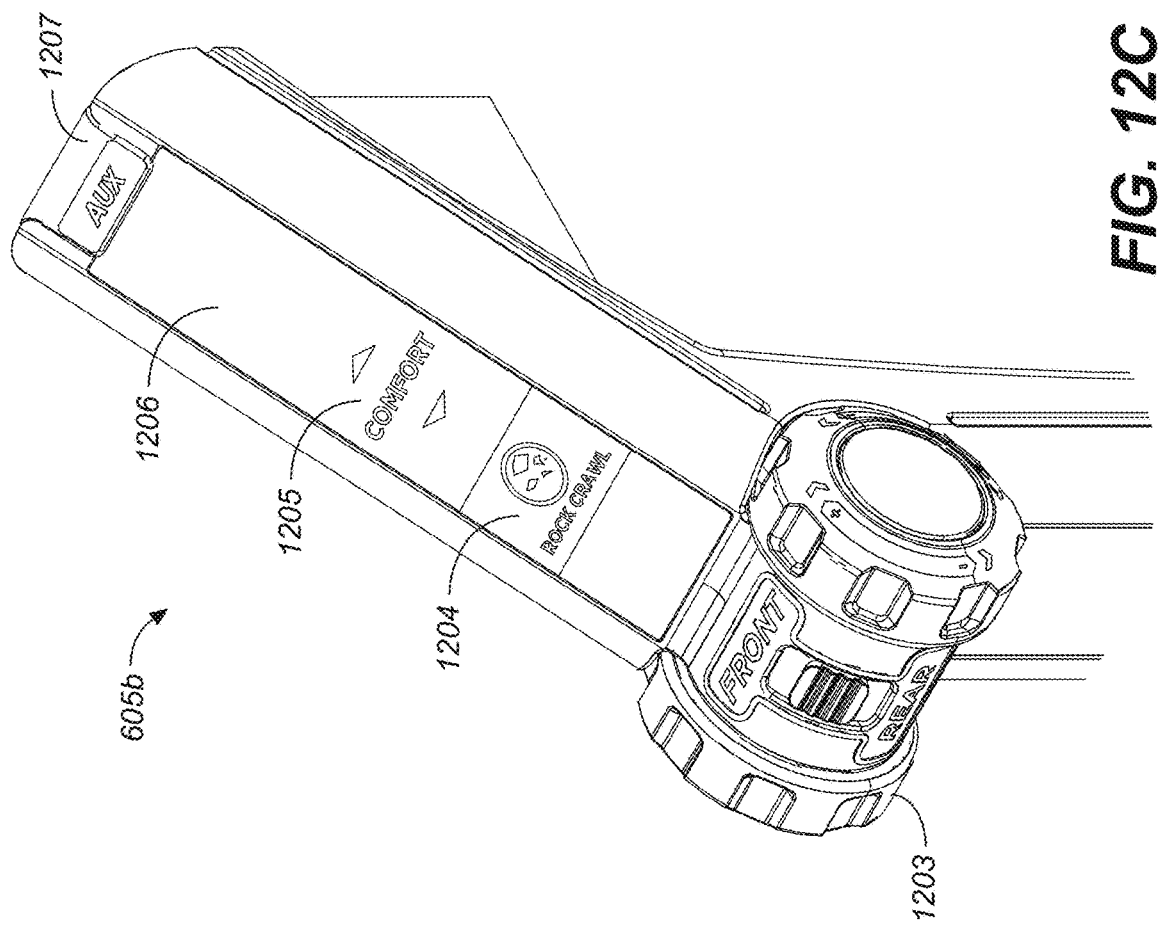
FIG. 12C is another isometric view of the grab handle device, in accordance with an embodiment.
Figure 12B:
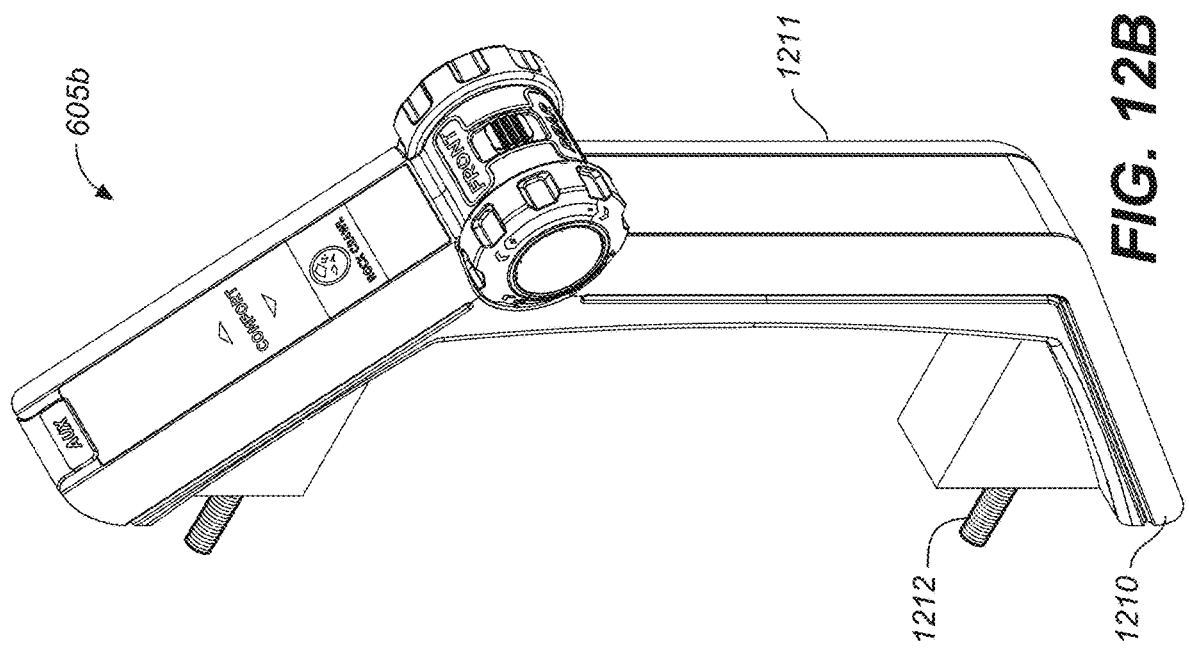
FIG. 12B is an isometric view of the grab handle device, in accordance with an embodiment.

Referring now to FIG. 12B is an isometric view of the grab handle device 605b shown in accordance with an embodiment. FIG. 12C is another isometric view of the grab handle device 605b is shown in accordance with an embodiment.

In one embodiment, as shown in FIGS. 12A, 12B, and 12C, grab handle device 605b provides a driver and/or passenger with the ability to quickly adjust the suspension system or a component of the suspension system such as the damping characteristics of one or more shock assemblies, described herein. In one embodiment, grab handle device 605b includes a controller input 1203, a display 1204, a terrain selection input 1205, a manual or automatic selector 1206, and an auxiliary button 1207. Although a number of control inputs/buttons/selectors are shown, it should be appreciated that grab handle device 605b could include more, fewer, or different control inputs/buttons/selectors.

In one embodiment, the user can use controller input 1203 of grab handle device 605b to control one or both of the front and rear rebound and compression valves, independently. Furthermore, in one embodiment, terrain selection input 1205 will provide an assortment of selectable terrain conditions including but not limited to, rock crawl, on road, and trail. As such, the user can use terrain selection input 1205 of grab handle device 605b to select one of the assortments of selectable terrain conditions including but not limited to, rock crawl, on road, and trail. In one embodiment, the selected terrain condition (or other inputs) can be displayed on display 1204.

In one embodiment, the user can interact with manual or automatic selector 1206 of grab handle device 605b to select a manual shock adjustment (i.e. modal) mode or an automatic shock adjustment (e.g., active or live) algorithmically based shock control mode.

In one embodiment, auxiliary button 1207 of grab handle device 605b enables and conveys, (in one embodiment, from the included display 1204, and/or the display of IVI system 14, and/or the display 718 of mobile device 150), an ability for the user to select and control other devices connected to the vehicle such as, but not limited to, a wench, lights, electronic sway bars, and bump stops.

In one embodiment, auxiliary button 1207 may be configured by way of mobile device 150, suspension control application 17 on IVI system 14, a notebook or laptop computing device, or the like, to perform those action(s), features, and functions described above, or other features available to the vehicle.

In one embodiment, grab handle device 605b will control the suspension control application 17 on IVI system 14 that relate to those features controllable by the grab handle device 605b.

In one embodiment, as shown in FIGS. 12A and 12B, grab handle device 605b is installed as part of the A-pillar trim and is typically easy to remove. Moreover, the space behind the A-pillar is typically ample for running wire to connect the grab handle device 605b with the IVI system 14. In one embodiment, grab handle device 605b is comprised of two pieces, an A-pillar trim 1210 and the grab bar handle cover 1211. In one embodiment, grab bar handle cover 1211 is attached to the A-pillar trim 1210 by two accessible bolts 1212. In the embodiment, the installation of grab handle device 605b is performed by removing a preexisting grab bar and replacing it with the grab handle device 605b. In one embodiment, the grab handle device 605b could be installed with the existing factory hardware that was used by the preexisting grab bar.

Figure 13B:
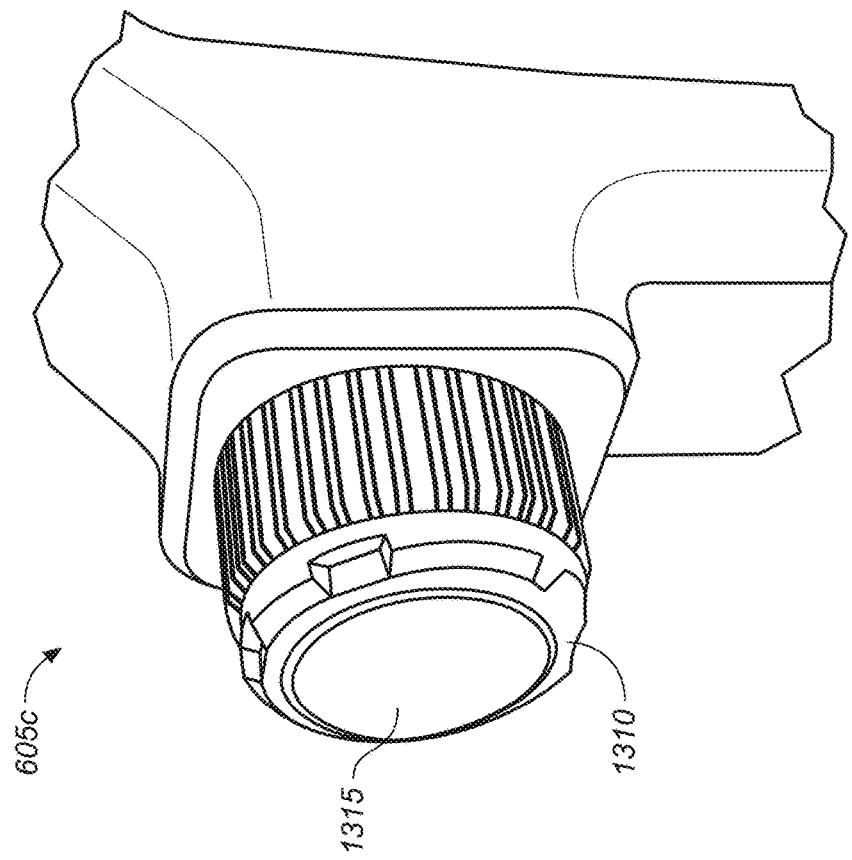
FIG. 13B is another isometric view of another version of a grab handle device type of remote digital suspension adjuster, in accordance with an embodiment.
Figure 13A:
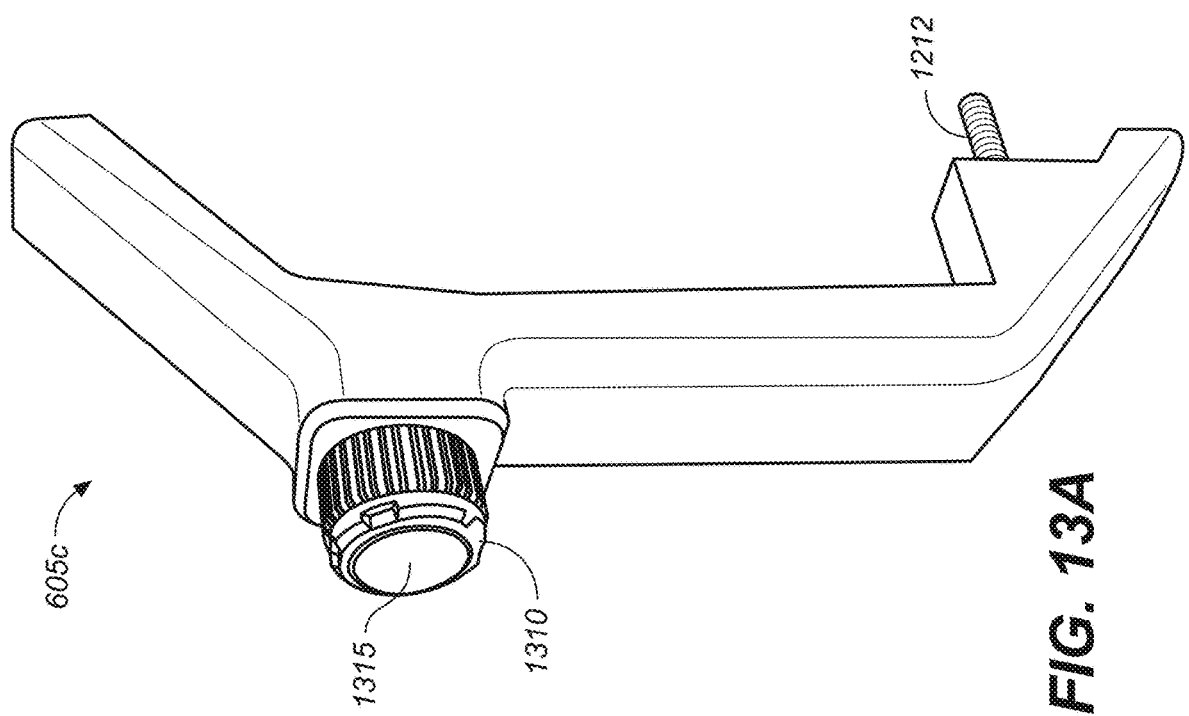
FIG. 13A is an isometric view of another version of a grab handle device type of remote digital suspension adjuster, in accordance with an embodiment.

FIG. 13A is an isometric view of another version of a grab handle device 605c type of remote digital suspension adjuster 605 is shown in accordance with an embodiment. FIG. 13B is another isometric view of another version of a grab handle device 605c type of remote digital suspension adjuster 605 is shown in accordance with an embodiment.

In FIGS. 13A and 13B, grab handle device 605c includes a mode button 1315 and a dial 1310. In one embodiment, pushing the mode button 1315 allows the adjustment setting to switch between predefined options (e.g., firmness and terrain for example), while the dial 1310 is turned to adjust the selected suspension settings. In one embodiment, similar to FIG. 10C, as the user interacts with the grab handle device 605c, the information can be shown on the display of the IVI system 14.

Figure 13C:
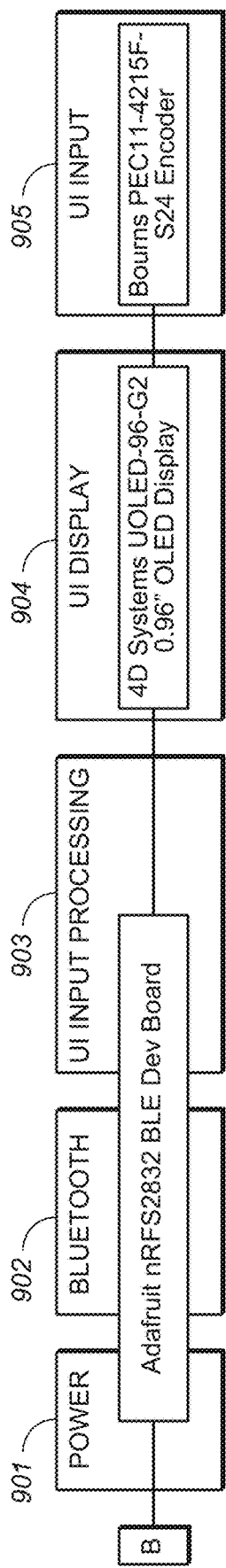
FIG. 13C is an exemplary component configuration for the grab handle device type of remote digital suspension adjuster, in accordance with an embodiment.

FIG. 13C is an exemplary component configuration for the grab handle device type of remote digital suspension adjuster shown in accordance with an embodiment. In one embodiment, the ID form factors are shown, however, it should be appreciated that the form factors are merely one embodiment and other components may have other form factors. In one embodiment, the components include power 901, communication 902, UI input processing 903, UI display 904 and UI input 905.

Figure 14A:
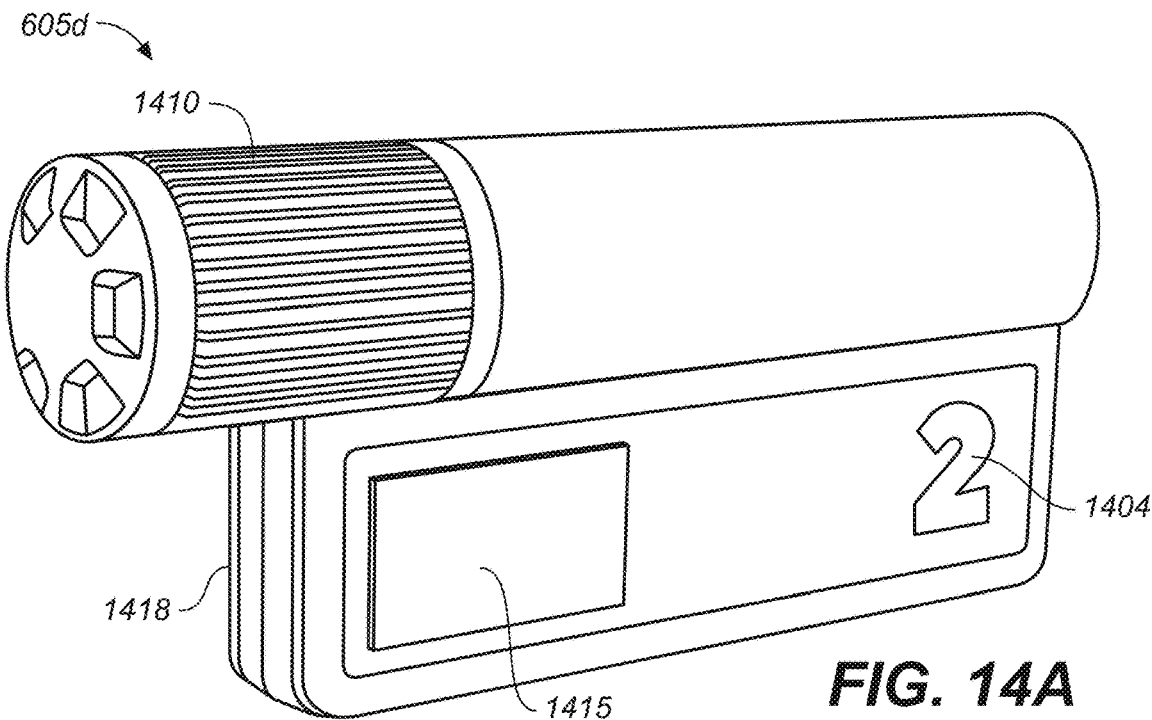
FIG. 14A is a perspective view of another version of a removable remote digital suspension adjuster, in accordance with an embodiment.

Referring now to FIG. 14A, a perspective view of another version of a removable remote digital suspension adjuster 605d is shown in accordance with an embodiment. In one embodiment, the removable remote digital suspension adjuster 605d can mount at the A-pillar, CLE port, center console, or any other auxiliary outlet location, or location with 12-volt power added thereto. For example, in one embodiment, removable remote digital suspension adjuster 605d can mount to an A-pillar similar to what is shown in FIGS. 11B and 12A. In one embodiment, removable remote digital suspension adjuster 605d can mount to an auxiliary port similar to what is shown in FIG. 11A.

In one embodiment, the removable remote digital suspension adjuster 605d is a handheld device (e.g., held by driver, co-pilot, passenger, etc.). In one embodiment, removable remote digital suspension adjuster 605d includes a mode button 1415, a rotary dial 1410, a port 1418 (such as a charging port, USB port, or the like), and a display 1404.

In one embodiment, the mode button 1415 allows a user to toggle between features such as adjusting for terrain or for firmness. Once the mode is selected (e.g., firmness), the adjustments to the mode can be made via the rotary dial 1410. In one embodiment, the selected mode (or other inputs) is displayed on display 1404.

Figure 14B:
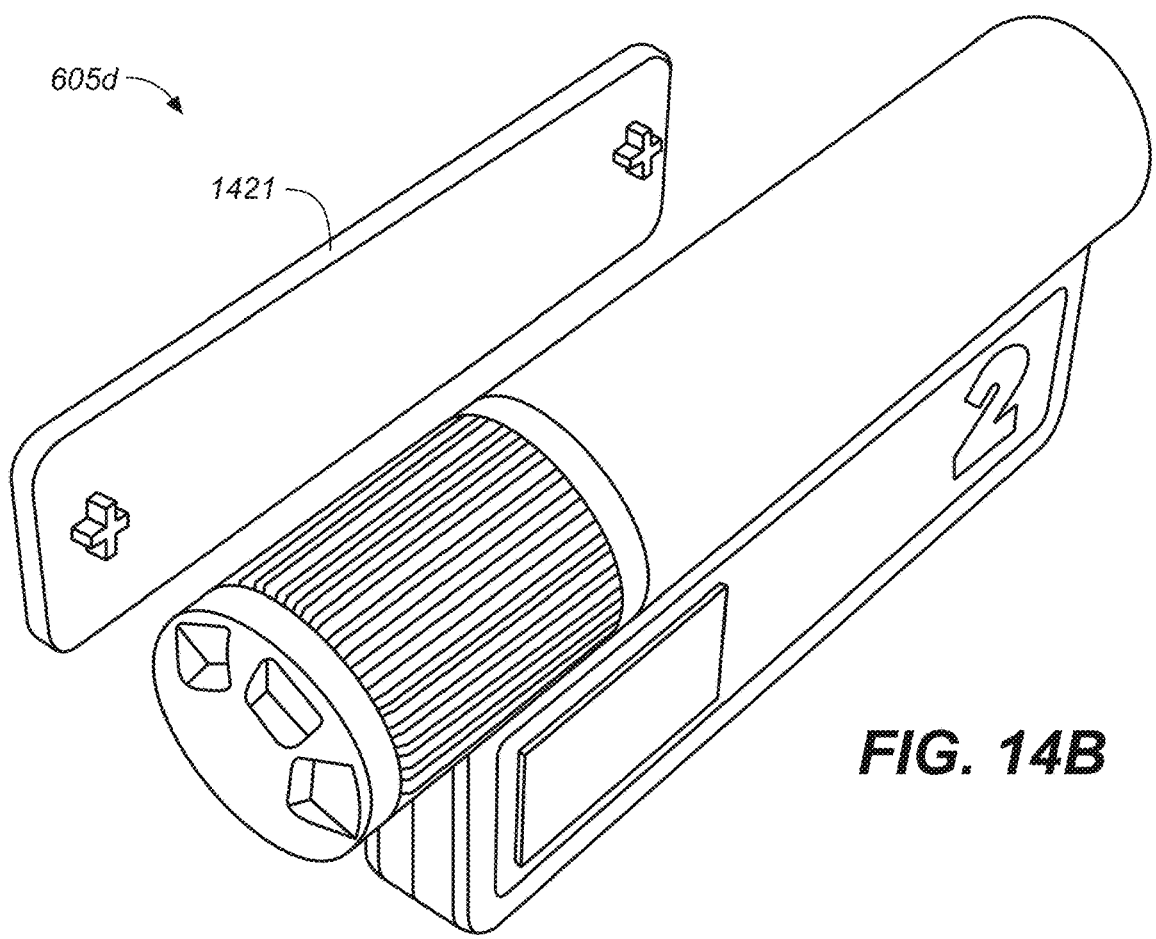
FIG. 14B is a perspective view of another version of a removable remote digital suspension adjuster with a cover, in accordance with an embodiment.

FIG. 14B is a perspective view of another version of a removable remote digital suspension adjuster 605d with a cover 1421, in accordance with an embodiment. In one embodiment, cover 1421 is a removable cover for a battery bay, a charging/communication port, or the like.

Figure 14C:
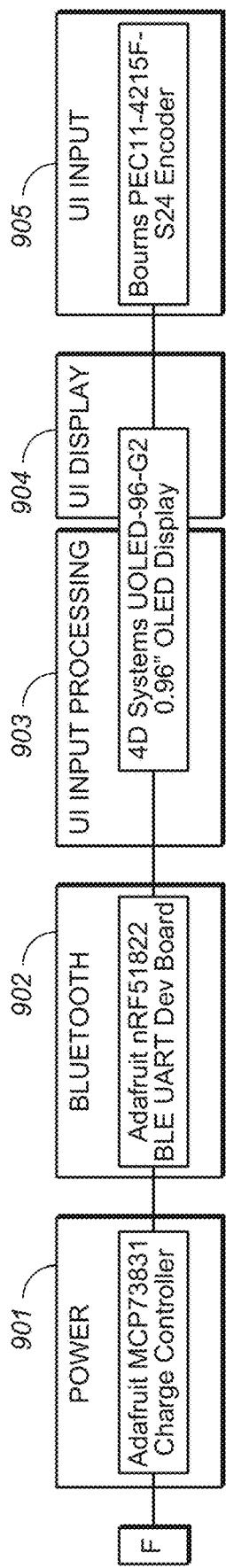
FIG. 14C is an exemplary component configuration for the removable remote digital suspension adjuster, in accordance with an embodiment.

FIG. 14C is an exemplary component configuration for the removable remote digital suspension adjuster 605d type of remote digital suspension adjuster 605 shown in accordance with an embodiment. In one embodiment, the ID form factors are shown, however, it should be appreciated that the form factors are merely one embodiment and other components may have other form factors. In one embodiment, the components include power 901, communication 902, UI input processing 903, UI display 904 and UI input 905.

Figure 15:
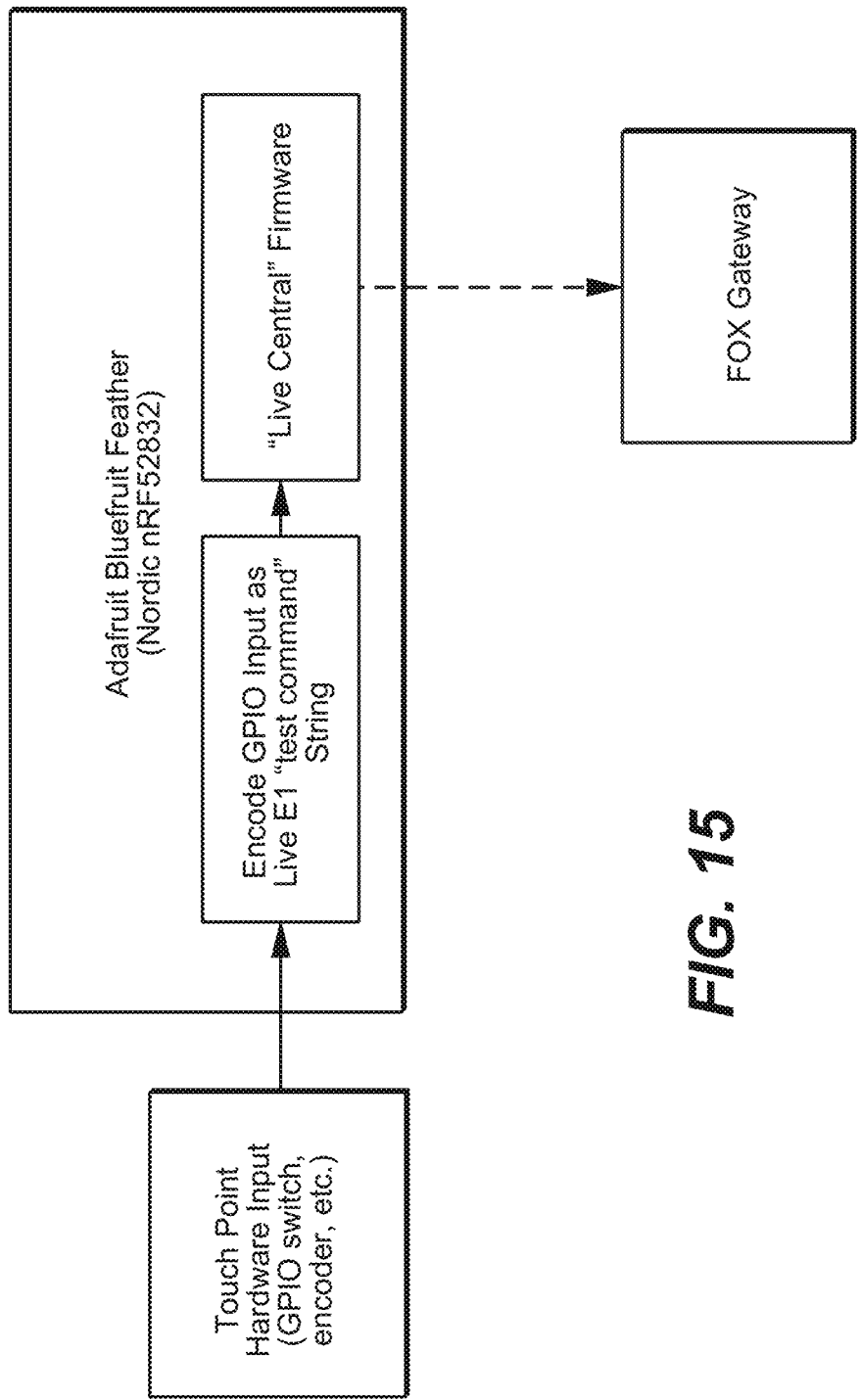
FIG. 15 is a block flow diagram of firmware application operating on the remote digital suspension adjuster, in accordance with an embodiment.

Referring now to FIG. 15, a block flow diagram of firmware application operating on the remote digital suspension adjuster 605 is shown in accordance with an embodiment. In one embodiment, the remote digital suspension adjuster 605 can use existing "live central" firmware application on the remote digital suspension adjuster controller. For example, one or more development boards such as an Adafruit Bluefruit Feather compatible development boards (or the like) in addition to an evaluation board such as a Nordic nRF52. In one embodiment, the "live central" can utilize Nordic UART characteristics to send direct commands to gateway.

In one embodiment, the remote digital suspension adjuster 605 is installed in a vehicle having the suspension control application 17 on IVI system 14 to interact with, where the remote digital suspension adjuster 605 is providing information to the user via the built-in IVI system display and/or mobile device 150. In one embodiment, the remote digital suspension adjuster 605 is a device that can stand alone or act in concert with the suspension control application 17 on IVI system 14. In general, the remote digital suspension adjuster 605 could include wireless power applications (as described in the handheld configuration of removable remote digital suspension adjuster 605d).

Although modes and adjustments are discussed, the remote digital suspension adjuster 605 could be a simple on/off switch to either activate or deactivate one or more aspects of the suspension control application 17 on IVI system 14. In another embodiment, the remote digital suspension adjuster 605 could have any different number of switches, options, menus, and the like.

In one embodiment, the wireless communication could be between the IVI system 14 on a first vehicle and another IVI system on a second vehicle, or any number of vehicles. For example, if two vehicles are driving along a trail in a leader-follower style, the IVI system on each of the vehicles could be communicating such that the suspension information from the lead vehicle is provided to the follow vehicle(s) (or bicycle, motorcycles, ATVs, snowmobiles, water vehicles, side-by-side, and the like). In so doing, the suspension information from the lead vehicle IVI system can be used as future suspension information to the follow vehicle's IVI system.

In other words, the IVI system information (terrain information, suspension settings, sensor data, imagery, and the like) from the lead vehicle is provided to the follow vehicle(s) IVI system. In so doing, the follow vehicle's IVI system will obtain the terrain, event, or other sensor data before to the follow vehicle actually reaches the location of the suspension event (or terrain, etc.) that the front vehicle IVI system has already encountered. This would allow the IVI system on the follow vehicle to use the provided information to prepare the suspension of the rear vehicle for the upcoming terrain or event.

Example Active Valve

Figure 16:
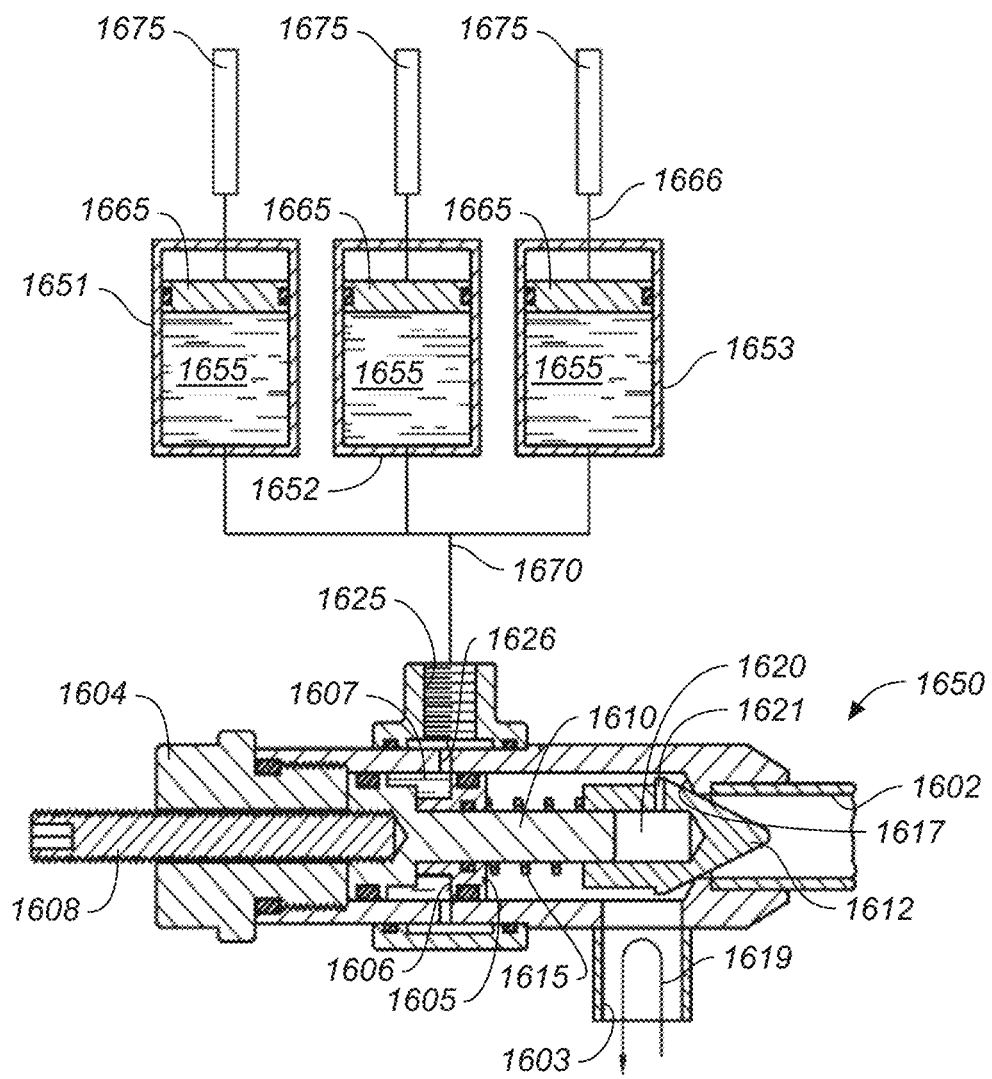
FIG. 16 is an enlarged section view showing an active valve and a plurality of valve operating cylinders in selective communication with an annular piston surface of the active valve, in accordance with an embodiment.

Referring now to FIG. 16, an enlarged view of an active valve 1650 is shown in accordance with an embodiment. Although FIG. 16 shows the active valve 1650 in a closed position (e.g. during a rebound stroke of the shock assembly), the following discussion also includes the opening of active valve 1650. Active valve 1650 includes a valve body 1604 housing a movable valve piston 1605 which is sealed within the body. The valve piston 1605 includes a sealed chamber 1607 adjacent an annularly-shaped piston surface 1606 at a first end thereof. The chamber 1607 and annularly-shaped piston surface 1606 are in fluid communication with a port 1625 accessed via opening 1626. Two additional fluid communication points are provided in the body including an inlet (such as orifice 1602) and an outlet (such as orifice 1603) for fluid passing through the active valve 1650.

Extending from a first end of the valve piston 1605 is a shaft 1610 having a cone shaped member 1612 (other shapes such as spherical or flat, with corresponding seats, will also work suitably well) disposed on an end thereof. The cone shaped member 1612 is telescopically mounted relative to, and movable on, the shaft 1610 and is biased toward an extended position due to a spring 1615 coaxially mounted on the shaft 1610 between the cone shaped member 1612 and the valve piston 1605. Due to the spring biasing, the cone shaped member 1612 normally seats itself against a valve seat 1617 formed in an interior of the valve body 1604.

As shown, the cone shaped member 1612 is seated against valve seat 1617 due to the force of the spring 1615 and absent an opposite force from fluid entering the active valve 1650 along orifice 1602. As cone shaped member 1612 telescopes out, a gap 1620 is formed between the end of the shaft 1610 and an interior of cone shaped member 1612. A vent 1621 is provided to relieve any pressure formed in the gap. With a fluid path through the active valve 1650 (from 1603 to 1602) closed, fluid communication is substantially shut off from the rebound side of the cylinder into the valve body (and hence to the compression side) and its "dead-end" path is shown by arrow 1619.

In one embodiment, there is a manual pre-load adjustment on the spring 1615 permitting a user to hand-load or un-load the spring using a threaded member 1608 that transmits motion of the valve piston 1605 towards and away from the conical member, thereby changing the compression on the spring 1615.

Also shown in FIG. 16 is a plurality of valve operating cylinders 1651, 1652, 1653. In one embodiment, the cylinders each include a predetermined volume of fluid 1655 that is selectively movable in and out of each cylindrical body through the action of a separate corresponding piston 1665 and rod 1666 for each cylindrical body. A fluid path 1670 runs between each cylinder and port 1625 of the valve body where annularly-shaped piston surface 1606 is exposed to the fluid.

Because each cylinder has a specific volume of substantially incompressible fluid and because the volume of the sealed chamber 1607 adjacent the annularly-shaped piston surface 1606 is known, the fluid contents of each cylinder can be used, individually, sequentially or simultaneously to move the piston a specific distance, thereby effecting the damping characteristics of the suspension system in a relatively predetermined and precise way.

While the cylinders 1651-1653 can be operated in any fashion, in the embodiment shown each piston 1665 and rod 1666 is individually operated by a solenoid 1675 and each solenoid, in turn, is operable from a remote location of the vehicle, like a cab of a motor vehicle or even the handlebar area of a motor or bicycle (not shown). Electrical power to the solenoids 1675 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 1650 is in the damping-open position, fluid flow through orifice 1602 provides adequate force on the cone shaped member 1612 to urge it backwards, at least partially loading the spring 1615 and creating a fluid flow path from the orifice 1602 into and through orifice 1603.

The characteristics of the spring 1615 are typically chosen to permit active valve 1650 (e.g. cone shaped member 1612) to open at a predetermined pressure, with a predetermined amount of control pressure applied to port 1625. For a given spring 1615, higher control pressure at port 1625 will result in higher pressure required to open the active valve 1650 and correspondingly higher damping resistance in orifice 1602. In one embodiment, the control pressure at port 1625 is raised high enough to effectively "lock" the active valve closed resulting in a substantially rigid compression shock assembly (particularly true when a solid piston is also used).

In one embodiment, the valve is open in both directions when the cone shaped member 1612 is "topped out" against valve body 1604. In another embodiment however, when the valve piston 1605 is abutted or "topped out" against valve body 1604 the spring 1615 and relative dimensions of the active valve 1650 still allow for the cone shaped member 1612 to engage the valve seat 1617 thereby closing the valve. In such embodiment backflow from the rebound side to the compression side is always substantially closed and cracking pressure from flow along orifice 1602 is determined by the pre-compression in the spring 1615. In such embodiment, additional fluid pressure may be added to the inlet through port 1625 to increase the cracking pressure for flow along orifice 1602 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 1650 can be remotely-operated and can be used in a variety of ways with many different driving and road variables and/or utilized at any point during use of a vehicle. In one example, active valve 1650 is controlled based upon vehicle speed in conjunction with the angular location of the vehicle's steering wheel. In this manner, by sensing the steering wheel turn severity (angle of rotation and rotational velocity), additional damping (by adjusting the corresponding size of the opening of orifice 1602 by causing cone shaped member 1612 to open, close, or partially close orifice 1602) can be applied to one shock assembly or one set of vehicle shock assemblies on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 1650 (and corresponding change to the working size of the opening of orifice 1602 by causing cone shaped member 1612 to open, close, or partially close orifice 1602) in response thereto. In another example, active valve 1650 is controlled at least in part by a pressure transducer measuring pressure in a vehicle tire and adding damping characteristics to some or all of the wheels (by adjusting the working size of the opening of orifice 1602 by causing cone shaped member 1612 to open, close, or partially close orifice 1602) in the event of, for example, an increased or decreased pressure reading.

In one embodiment, active valve 1650 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces damping to some or all of the vehicle's shock assemblies (by adjusting the working size of the opening of orifice 1602 by causing cone shaped member 1612 to open, close, or partially close orifice 1602 chambers) in the event of a loss of control to help the operator of the vehicle to regain control.

For example, active valve 1650, when open, permits a first flow rate of the working fluid through orifice 1602. In contrast, when active valve 1650 is partially closed, a second flow rate of the working fluid though orifice 1602 occurs. The second flow rate is less than the first flow rate but greater than no flow rate. When active valve 1650 is completely closed, the flow rate of the working fluid though orifice 1602 is statistically zero.

In one embodiment, instead of (or in addition to) restricting the flow through orifice 1602, active valve 1650 can vary a flow rate through an inlet or outlet passage within the active valve 1650, itself. Thus, the active valve 1650, can be used to meter the working fluid flow (e.g., control the rate of working fluid flow) with/or without adjusting the flow rate through orifice 1602. Additional information regarding active and semi-active valves, including those used for compression and/or rebound stiffness adjustments, preload adjustments, bottom-out control, preload adjustment, ride height adjustment, and the like see, as an example, the electronic valve of U.S. Pat. Nos. 9,353,818 and 9,623,716 the content of which are incorporated by reference herein, in their entirety.

Due to the active valve 1650 arrangement, a relatively small solenoid (using relatively low amounts of power) can generate relatively large damping forces. Furthermore, due to incompressible fluid inside the shock assembly 38, damping occurs as the distance between cone shaped member 1612 and orifice 1602 is reduced. The result is a controllable damping rate. Certain active valve features are described and shown in U.S. Pat. Nos. 8,627,932; 8,857,580; 9,033,122; 9,120,362; and 9,239,090 which are incorporated herein, in their entirety, by reference.

It should be appreciated that when the valve body 1604 rotates in a reverse direction than that described above and herein, the cone shaped member 1612 moves away from orifice 1602 providing at least a partially opened fluid path.

Figure 17:
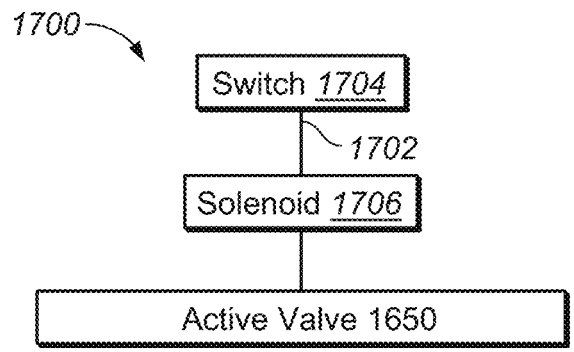
FIG. 17 is a schematic diagram showing a control arrangement for an active valve, in accordance with an embodiment.

FIG. 17 is a schematic diagram showing a control arrangement 1700 for a remotely-operated active valve 1650. As illustrated, a signal line 1702 runs from a switch 1704 to a solenoid 1706. Thereafter, the solenoid 1706 converts electrical energy into mechanical movement and rotates valve body 1604 within active valve 1650, In one embodiment, the rotation of valve body 1604 causes an indexing ring consisting of two opposing, outwardly spring-biased balls to rotate among indentions formed on an inside diameter of a lock ring.

As the valve body 1604 rotates, cone shaped member 1612 at an opposite end of the valve is advanced or withdrawn from an opening in orifice 1602. For example, the valve body 1604 is rotationally engaged with the cone shaped member 1612. A male hex member extends from an end of the valve body 1604 into a female hex profile bore formed in the cone shaped member 1612. Such engagement transmits rotation from the valve body 1604 to the cone shaped member 1612 while allowing axial displacement of the cone shaped member 1612 relative to the valve body 1604. Therefore, while the body does not axially move upon rotation, the threaded cone shaped member 1612 interacts with mating threads formed on an inside diameter of the bore to transmit axial motion, resulting from rotation and based on the pitch of the threads, of the cone shaped member 1612 towards or away from an orifice 1602, between a closed position, a partially open position, and a fully or completely open position.

Adjusting the opening of orifice 1602 modifies the flow-rate of the fluid through active valve 1650 thereby varying the stiffness of a corresponding shock assembly 38. While FIG. 17 is simplified and involves control of a single active valve 1650, it will be understood that any number of active valves corresponding to any number of fluid channels (e.g., bypass channels, external reservoir channels, bottom out channels, etc.) for a corresponding number of vehicle suspension shock assemblies could be used alone or in combination. That is, one or more active valves could be operated simultaneously or separately depending upon needs in a vehicular suspension system. For additional detail and description of adjustable preload, crossover, bottom-out, see, as an example, U.S. Pat. No. 10,036,443 the content of which is incorporated by reference herein, in its entirety.

For example, a suspension shock assembly could have one, a combination of, or each of an active valve(s): for a bottom out control, an internal bypass, for an external bypass, for a fluid conduit to the external reservoir 125, etc. In other words, anywhere there is a fluid flow path within a shock assembly 38, an active valve could be used. Moreover, the active valve could be alone or used in combination with other active valves at other fluid flow paths to automate one or more of the damping performance characteristics of the shock assembly. Moreover, additional switches could permit individual operation of separate active bottom out valves.

Figure 18:
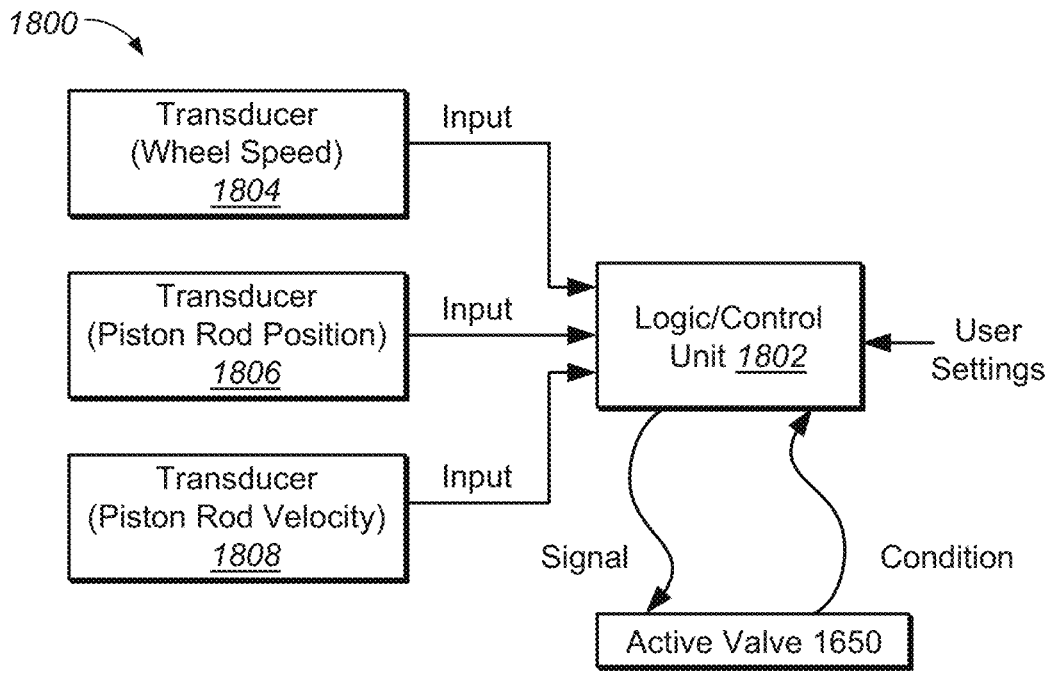
FIG. 18 is a schematic diagram of a control system based upon any or all of vehicle speed, damper rod speed, and damper rod position, in accordance with an embodiment.

In addition to, or in lieu of, the simple, switch-operated remote arrangement of FIG. 17, the remotely-operable active valve 1650 can be operated automatically based upon one or more driving conditions, and/or automatically or manually utilized at any point during use of a vehicle. FIG. 18 shows a schematic diagram of a control system 1800 based upon any or all of vehicle speed, damper rod speed, and damper rod position. One embodiment of the arrangement of FIG. 18 is designed to automatically increase damping in a shock assembly in the event a damper rod reaches a certain velocity in its travel towards the bottom end of a shock assembly at a predetermined speed of the vehicle.

In one embodiment, the control system 1800 adds damping (and control) in the event of rapid operation (e.g. high rod velocity) of the shock assembly 38 to avoid a bottoming out of the damper rod as well as a loss of control that can accompany rapid compression of a shock assembly with a relative long amount of travel. In one embodiment, the control system 1800 adds damping (e.g., adjusts the size of the opening of orifice 1602 by causing cone shaped member 1612 to open, close, or partially close orifice 1602) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 18 illustrates, for example, a control system 1800 including three variables: wheel speed, corresponding to the speed of a vehicle component (measured by wheel speed transducer 1804), piston rod position (measured by piston rod position transducer 1806), and piston rod velocity (measured by piston rod velocity transducer 1808). Any or all of the variables shown may be considered by logic unit 1802 in controlling the solenoids or other motive sources coupled to active valve 1650 for changing the working size of the opening of orifice 1602 by causing cone shaped member 1612 to open, close, or partially close orifice 1602. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension shock assembly or other connected suspension element such as the tire, wheel, or axle assembly. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension shock assembly.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. Additional examples and embodiments for transducer-operated arrangement for measuring piston rod speed and velocity are described in U.S. Pat. No. 9,623,716 the content of which is incorporated by reference herein, in its entirety.

While transducers located at the suspension shock assembly measure piston rod velocity (piston rod velocity transducer 1808), and piston rod position (piston rod position transducer 1806), a separate wheel speed transducer 1804 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Additional examples and embodiments of wheel speed transducers are described in U.S. Pat. Nos. 9,033,122; 9,452,654; 10,040,329; 10,047,817; 10,060,499 the content of which are incorporated by reference herein, in their entirety.

In one embodiment, as illustrated in FIG. 18, the logic unit 1802 with user-definable settings receives inputs from piston rod position transducer 1806, piston rod velocity transducer 1808, as well as wheel speed transducer 1804. Logic unit 1802 is user-programmable and, depending on the needs of the operator, logic unit 1802 records the variables and, then, if certain criteria are met, logic unit 1802 sends its own signal to active valve 1650 (e.g., the logic unit 1802 is an activation signal provider) to cause active valve 1650 to move into the desired state (e.g., adjust the flow rate by adjusting the distance between cone shaped member 1612 and orifice 1602). Thereafter, the condition, state or position of active valve 1650 is relayed back to logic unit 1802 via an active valve monitor or the like.

In one embodiment, logic unit 1802 shown in FIG. 18 assumes a single active valve 1650 corresponding to a single orifice 1602 of a single shock assembly 38, but logic unit 1802 is usable with any number of active valves or groups of active valves corresponding to any number of orifices, or groups of orifices. For instance, the suspension shock assemblies on one side of the vehicle can be acted upon while the vehicles other suspension shock assemblies remain unaffected.

Figure 19:
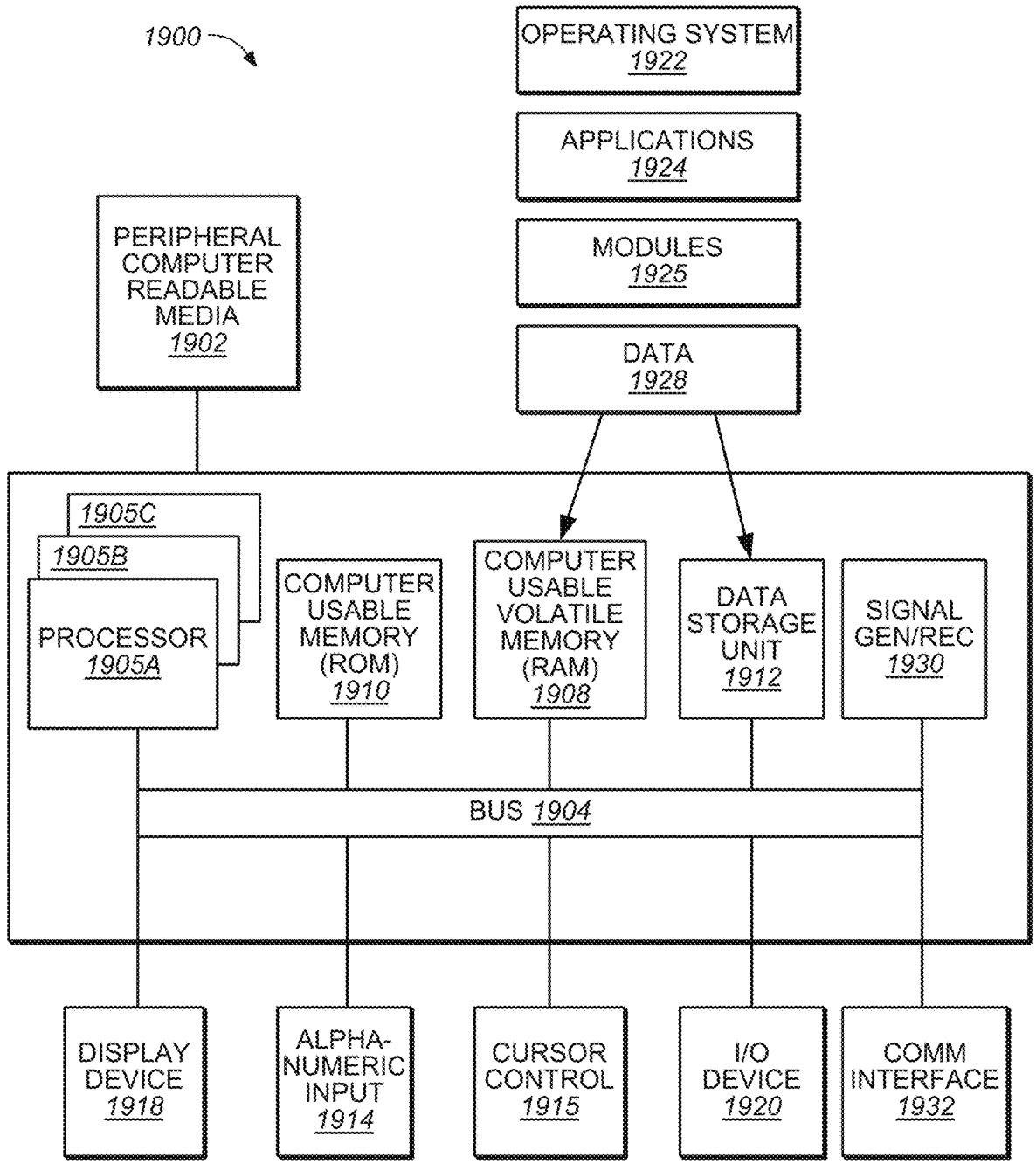
FIG. 19 is a block diagram of a computer system, in accordance with an embodiment.

With reference now to FIG. 19, an example computer system 1900 is shown. In the following discussion, computer system 1900 is representative of a system or components that may be used with aspects of the present technology. In one embodiment, different computing environments will only use some of the components shown in computer system 1900.

In general, electronic vehicle suspension control system 35 and IVI system 14 can include some or all of the components of computer system 1900. In different embodiments, electronic vehicle suspension control system 35 and IVI system 14 can include communication capabilities (e.g., wired such as ports or the like, and/or wirelessly such as near field communication, Bluetooth, WiFi, or the like) such that some of the components of computer system 1900 are found on electronic vehicle suspension control system 35 and IVI system 14 while other components could be ancillary but communicatively coupled thereto (such as a mobile device 150, tablet, computer system or the like). For example, in one embodiment, electronic vehicle suspension control system 35 and IVI system 14 can be communicatively coupled to one or more different computing systems to allow a user (or manufacturer, tuner, technician, etc.) to adjust or modify any or all of the programming stored in electronic vehicle suspension control system 35 and IVI system 14. In one embodiment, the programming includes computer-readable and computer-executable instructions that reside, for example, in non-transitory computer-readable medium (or storage media, etc.) of electronic vehicle suspension control system 35, suspension control application 17 on IVI system 14, and/or computer system 1900.

In one embodiment, computer system 1900 includes an address/data/control bus 1904 for communicating information, and a processor 1905A coupled to bus 1904 for processing information and instructions. As depicted in FIG. 19, computer system 1900 is also well suited to a multi-processor environment in which a plurality of processors 1905A, 1905B, and 1905C are present. Conversely, computer system 1900 is also well suited to having a single processor such as, for example, processor 1905A. Processors 1905A, 1905B, and 1905C may be any of various types of microprocessors. Computer system 1900 also includes data storage features such as a computer usable volatile memory 1908, e.g., random access memory (RAM), coupled to bus 1904 for storing information and instructions for processors 1905A, 1905B, and 1905C.

Computer system 1900 also includes computer usable non-volatile memory 1910, e.g., read only memory (ROM), coupled to bus 1904 for storing static information and instructions for processors 1905A, 1905B, and 1905C. Also present in computer system 1900 is a data storage unit 1912 (e.g., a magnetic disk drive, optical disk drive, solid state drive (SSD), and the like) coupled to bus 1904 for storing information and instructions. Computer system 1900 also can optionally include an alpha-numeric input device 1914 including alphanumeric and function keys coupled to bus 1904 for communicating information and command selections to processor 1905A or processors 1905A, 1905B, and 1905C. Computer system 1900 also can optionally include a cursor control device 1915 coupled to bus 1904 for communicating user input information and command selections to processor 1905A or processors 1905A, 1905B, and 1905C. Cursor control device may be a touch sensor, gesture recognition device, and the like. Computer system 1900 of the present embodiment can optionally include a display 1918 coupled to bus 1904 for displaying information.

Referring still to FIG. 19, display 1918 of FIG. 19 may be a liquid crystal device, cathode ray tube, OLED, plasma display device or other display device suitable for creating graphic images and alpha-numeric characters recognizable to a user. Cursor control device 1915 allows the computer user to dynamically signal the movement of a visible symbol (cursor) on a display screen of display 1918. Many implementations of cursor control device 1915 are known in the art including a trackball, mouse, touch pad, joystick, non-contact input, gesture recognition, voice commands, bio recognition, and the like. In addition, special keys on alpha-numeric input device 1914 capable of signaling movement of a given direction or manner of displacement. Alternatively, it will be appreciated that a cursor can be directed and/or activated via input from alpha-numeric input device 1914 using special keys and key sequence commands.

Computer system 1900 is also well suited to having a cursor directed by other means such as, for example, voice commands. Computer system 1900 also includes an I/O device 1920 for coupling computer system 1900 with external entities. For example, in one embodiment, I/O device 1920 is a modem for enabling wired or wireless communications between computer system 1900 and an external network such as, but not limited to, the Internet or intranet. A more detailed discussion of the present technology is found below.

Referring still to FIG. 19, various other components are depicted for computer system 1900. Specifically, when present, an operating system 1922, applications 1924, modules 1925, and data 1928 are shown as typically residing in one or some combination of computer usable volatile memory 1908, e.g. random-access memory (RAM), and data storage unit 1912. However, it is appreciated that in some embodiments, operating system 1922 may be stored in other locations such as on a network or on a flash drive; and that further, operating system 1922 may be accessed from a remote location via, for example, a coupling to the Internet. The present technology may be applied to one or more elements of described computer system 1900.

Computer system 1900 also includes one or more signal generating and receiving device(s) 1930 coupled with bus 1904 for enabling computer system 1900 to interface with other electronic devices and computer systems. Signal generating and receiving device(s) 1930 of the present embodiment may include wired serial adaptors, modems, and network adaptors, wireless modems, and wireless network adaptors, and other such communication technology. The signal generating and receiving device(s) 1930 may work in conjunction with one (or more) communication interface 1932 for coupling information to and/or from computer system 1900. Communication interface 1932 may include a serial port, parallel port, Universal Serial Bus (USB), Ethernet port, Bluetooth, thunderbolt, near field communications port, WiFi, Cellular modem, or other input/output interface. Communication interface 1932 may physically, electrically, optically, or wirelessly (e.g., via radio frequency) couple computer system 1900 with another device, such as a mobile phone, radio, or computer system.

Energy Harvesting Switch

Figure 20:
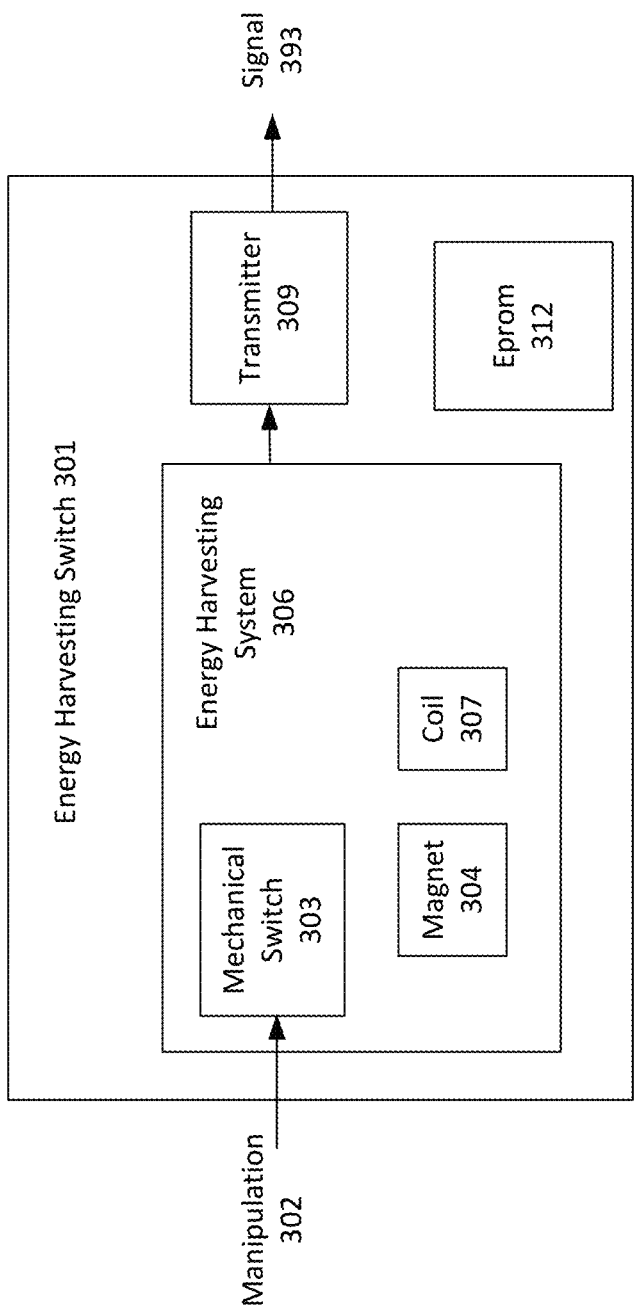
FIG. 20 is a block diagram of an energy harvesting switch, in accordance with an embodiment.

Referring now to FIG. 20, a block diagram of an energy harvesting switch is shown in accordance with an embodiment. In one embodiment, the energy harvesting switch 301 is used to transmit a wireless signal that is intended to be received by a suspension component of a vehicle. In one embodiment, the suspension component is controlled by an electronic vehicle suspension control system 35 (of FIG. 1A). In one embodiment, the energy harvesting switch 301 is similar in operation to the touch point 615a disclosed herein.

In one embodiment, the energy harvesting switch 301 signal causes the electronic vehicle suspension control system 35 to make a near-instantaneous suspension change to one or more components of the vehicle suspension.

In one embodiment, the electronic vehicle suspension control system 35 is integral with a suspension component such as shock absorber 38 of FIG. 1B.

In one embodiment, aspects of the electronic vehicle suspension control system 35 that are embedded in shock absorber 38 refer to electronics embedded with shock absorber 38. Additional details, examples, and descriptions of a shock absorber with electronics embedded therewith, to control characteristics of the shock absorber, such as, but not limited to, rebound or compression firmness adjustments, preload, crossover, bottom-out, etc., see U.S. Pat. No. 10,036,443, the content of which is incorporated by reference herein, in its entirety. In one embodiment, the energy harvesting switch 301 signal is provided to the embedded electronics. Where the receipt of the signal from energy harvesting switch 301 causes the electronic system embedded in the shock absorber 38 to make a near-instantaneous suspension change to one or more characteristics of the shock absorber 38. In one embodiment, the information to modify the embed electronics can be stored in the memory (such as Eprom 312 of FIG. 20) of the energy harvesting switch 301. As such, the location of the control is not restricted to a standalone ECU, but could also refer to electronics embedded or incorporated as part a stand-alone active, or semi-active shock absorber 38, and/or a combination of the ECU and one or more active, or semi-active shock absorber 38 with electronics embedded therein.

In another embodiment, the electronic vehicle suspension control system 35 is communicatively coupled with one, a number, or all of the active suspension components of the vehicle (such as shown in FIG. 1A).

In one embodiment, the vehicle is a four wheeled vehicle such as a car, truck, side-by-side, ATV, and the like. In one embodiment, the vehicle is a bicycle, motorcycle, snow machine, e-bike, scooter, boat, or the like. In one embodiment, the active suspension components are coupled with the wheels, seats, or the like, are used to reduce any transference of forces from the surface on (or through) which the vehicle is traveling from being transferred to the rest of the vehicle and/or persons riding therein/thereon. These suspension components are referred to herein as a shock absorber assembly.

In one embodiment, the energy harvesting switch 301 is used to control other devices, after market components, and the like on the vehicle such as a differential lock, a sway bar, an airbag, a winch, an auxiliary light, and the like. In one embodiment, energy harvesting switch 301 is not used for overriding an existing setting but is used for changing suspension mode setting or other controllable elements. In one embodiment, energy harvesting switch 301 is optionally used for overriding an existing setting but is also configurable to be used for changing suspension mode setting or other controllable elements without overriding any other programming.

In one embodiment, the active suspension component(s) that are being adjusted are user adjustments such as a dropper seatpost of a bicycle, a bicycle gear shifter, and the like.

In one embodiment, the energy harvesting switch 301 is a fully self-contained module, that includes a mechanical switch 303, energy harvesting system 306, and a wireless signal transmitter 309. In one embodiment, the energy harvesting switch 301 operates without requiring any additional power input.

In one embodiment, the mechanical switch 303 is a switch that is physically activated by a manipulation 302 from a user. The manipulation 302 could be the mechanical switch 303 being moved, pressed, or the like, by a user. For example, the mechanical switch 303 could be a throw switch, a push button switch, a toggle switch, a slide switch, a joystick switch, a rotary switch, or the like.

In one embodiment, the energy harvesting system 306 obtain an amount of power from the user's manipulation 302 of the mechanical switch 303. In one embodiment, the amount of power obtained during the user manipulation 302 is enough to power a wireless radio transmitter 309 to provide a transmission signal 309. For example, in one embodiment, when the mechanical switch 303 is actuated (e.g., the switch position is changed by a user manipulation 302), the movement of the mechanical switch 303 causes a magnetic member 304 to move with respect to a coil 307. In one embodiment, the magnetic member 304 and coil 307 interaction will generate enough electricity/energy for the wireless signal transmitter 309 to generate/send a wireless signal 393 (e.g., a command/action) to electronic vehicle suspension control system 35.

In one embodiment, the electronic vehicle suspension control system 35 is coupled with a wireless RF receiver that receives the signal 393 from the energy harvesting switch 301.

In one embodiment, the energy harvesting switch 301 transmits an encrypted signal 393, and the electronic vehicle suspension control system 35 wireless RF receiver receives the encrypted signal from the energy harvesting switch 301. In this manner a secure, instantaneous communication path is created, and the suspension behavior can be altered as pre-defined.

In one embodiment, the energy harvesting switch 301 only provides a single wireless transmission signal 393 per operation of the mechanical switch 303. As such, in one embodiment, the energy harvesting switch 301 will be programmed in conjunction with the electronic vehicle suspension control system 35 such that the wireless transmission signal 393 received from the energy harvesting switch 301 will cause the electronic vehicle suspension control system 35 in instantly (or near instantly) initiate the predefined change in the settings of one or more components of the suspension.

In one embodiment, the interface for performing the programming between the energy harvesting switch 301 and the electronic vehicle suspension control system 35 will be via a computer, a mobile device, an app, or other interface device.

In general, the electronic vehicle suspension control system 35 can be programmed to perform any of a number of tasks upon receipt of the transmitted signal 393 from the energy harvesting switch 301. For example, the signal 393 could cause the electronic vehicle suspension control system 35 to perform a task such as, but not limited to, firm up the suspension, soften the suspension, set the suspension to a predefined mapping (or suspension setup), adjust a ride height, connect or disconnect a sway bar, engage or disengage a differential lock, or the like.

For example, in one embodiment, the transmission signal 393 from the energy harvesting switch 301 is programmed to cause the electronic vehicle suspension control system 35 to instantly (or nearly instantly) change the suspension to its firmest mode. Thus, upon receiving the signal 393 from the energy harvesting switch 301, the electronic vehicle suspension control system 35 would change the suspension setting to its firmest mode.

Thus, for example, if the vehicle is about to, or is unexpectedly encountering an obstacle that would cause a harsh or dangerous condition (such as bottom out, roll over, or the like), the user would activate (or manipulate) the mechanical switch 303 of energy harvesting switch 301 which would transmit a signal 393 causing the electronic vehicle suspension control system 35 to change the suspension into firm mode.

In one embodiment, the electronic vehicle suspension control system 35 is programmed to change the suspension to a next firmest mode when the energy harvesting switch 301 signal 393 is received. As such, the driver could use the energy harvesting switch 301 signal to provide a varied level of firmness. For example, if the suspension has seven firmness settings (e.g., level 1-level 7), the vehicle may be initially operating at level 3. If, the driver sees an upcoming condition, such as a smooth road, the driver would manipulate the mechanical switch 303 of energy harvesting switch 301 thereby generating signal 393 and moving the vehicle to level 4. As the driver continues, he notices a portion of the road ahead is washed out. The driver would then perform a number of manipulations of the mechanical switch 303 of energy harvesting switch 301 thereby generating signal 393 a number of times to move the vehicle to level 7. In one embodiment, it would not matter if the driver manipulated the mechanical switch 303 3 times or 7 times, as the signal 393 would only cause the electronic vehicle suspension control system 35 to increase the suspension firmness until it was at its firmest setting (e.g., level 7). After that, any additional signals would be extraneous.

In one embodiment, the electronic vehicle suspension control system 35 would be programmed to return to its own active control after a certain predefined amount of time. For example, the signal 393 from the energy harvesting switch 301 would cause the electronic vehicle suspension control system 35 to move to a firmer (or firmest setting) for 10 seconds (or 5, 12, 20, 30 seconds, etc.). After the time period had tolled, the electronic vehicle suspension control system 35 would return to its preprogrammed settings, its sensor input settings, its automatically determined settings, its location defined settings, etc.

In one embodiment, the electronic vehicle suspension control system 35 would be programmed to return to its own active control after the certain predefined amount of time or after an event was recognized. For example, the signal 393 from the energy harvesting switch 301 would cause the electronic vehicle suspension control system 35 to move to a firmer (or firmest setting) for 10 seconds (or 5, 12, 20, 30, etc.). However, if 2 seconds after changing the firmness setting, the electronic vehicle suspension control system 35 noted the suspension had encountered a significant event, regardless of the time since signal 393, the electronic vehicle suspension control system 35 would regain suspension control and remain at the firm setting (if needed), change to its preprogrammed settings, its sensor input settings, its automatically determined settings, its location defined settings, etc.

In one embodiment, the electronic vehicle suspension control system 35 could be programmed with different actions to take upon receipt of the signal 393 from the energy harvesting switch 301 based on vehicle location, vehicle speed, terrain, vehicle load, or the like. For example, if the electronic vehicle suspension control system 35 knew the vehicle was on a freeway, the transmission signal 393 received from the energy harvesting switch 301 could be programmed to cause the electronic vehicle suspension control system 35 to initiate a firming of the front suspension in preparation of hard braking, to soften the suspension for a departure from the freeway to a side road, etc.

In one embodiment, the actions of the electronic vehicle suspension control system 35 in response to the signal 393 received from the energy harvesting switch 301 could be manually adjusted by an interaction with a GUI, IVI system 14, mobile device, or the like. For example, the driver (or a passenger) could interact with the electronic vehicle suspension control system 35 (via one of the interactive methods above) and modify the predefined action of the electronic vehicle suspension control system 35.

In one embodiment, the energy harvesting switch 301 will allow the user to change between two pre-selected modes that could be configured with the electronic vehicle suspension control system 35. For example, a first signal 393 from the energy harvesting switch 301 would cause the electronic vehicle suspension control system 35 to move to a firmest setting, the next signal 393 from the energy harvesting switch 301 would cause the electronic vehicle suspension control system 35 to return to the previous suspension setting.

In one embodiment, there is a time period between the first signal 393 and second signal 393 such as, for example, 30 seconds. In addition, the electronic vehicle suspension control system 35 would have a return to regular operation after 30 seconds. If the energy harvesting switch 301 sent another signal 393 less than 30 seconds after the first signal 393 was sent, it would cause the electronic vehicle suspension control system 35 to return to its regular operation. In contrast, if the energy harvesting switch 301 sent another signal 393 more than 30 seconds after the first signal 393 was sent, it would cause the electronic vehicle suspension control system 35 to enter the firm mode.

In one embodiment, the energy harvesting switch 301 can be attached to a portion of the vehicle defined by the vehicle operator. For example, the energy harvesting switch 301 could be mounted on the steering wheel, gear shift, or other driver accessible location within the cockpit of the vehicle. In one embodiment, the energy harvesting switch 301 is mounted to a handlebar of a motorcycle, bicycle, or the like.

In one embodiment, the location of the energy harvesting switch 301 is provided at a specific user-defined location and with an appropriate level of feel such that the driver could find and manipulate mechanical switch 303 of the energy harvesting switch 301 without having to look for it, take her hand(s) off of a control surface, or the like. For example, when driving over rough terrain at speed, making a suspension change without a user taking their hands off the steering wheel (and or gearshift) is advantageous. With the energy harvesting switch 301 mounted as stated above, the drive can find and manipulate the mechanical switch 303 of the energy harvesting switch 301 to change modes or implement a "full firm" mode when a surprise obstacle appears. Moreover, the energy harvesting switch 301 manipulation 302 can occur without requiring the driver to divert his/her attention to the dash or touch screen of IVI system 14. That is, if the driver needed to make a quick change to the suspension due to a suspension event being encountered or about to be encountered, the driver could find and manipulate mechanical switch 303 of the energy harvesting switch 301 without having to look for the mechanical switch 303, look at a setting on the energy harvesting switch 301, or the like.

In one embodiment, the energy harvesting switch 301 is mounted in a normally used location in the cockpit such as on the steering wheel, gearshift, etc. In one embodiment, the energy harvesting switch 301 could be mounted to a part of a control pedal (such as at the top of a brake pedal, clutch pedal, etc.) such that the driver could activate the mechanical switch 303 of the energy harvesting switch 301 with her foot. In another embodiment, energy harvesting switch 301 could be mounted to the floor in a known location such that the driver could move her foot to the mechanical switch 303 and activate it without having to look down. In one embodiment, the energy harvesting switch 301 may be located at another location that is within arm's reach of the driver such as a dash location, door location, foot location, or the like.

In one embodiment, there may be a plurality of different energy harvesting switches 301 about the vehicle. In one embodiment, each of the different energy harvesting switches 301 would provide a different signal 393 that would cause the electronic vehicle suspension control system 35 to perform a different suspension adjustment. For example, in one vehicle a signal from a first energy harvesting switch 301 would cause the electronic vehicle suspension control system 35 to put the suspension in comfort mode, a signal from a second energy harvesting switch would cause the electronic vehicle suspension control system 35 to put the vehicle in sport mode, another signal from another energy harvesting switch would cause the electronic vehicle suspension control system 35 to put the suspension in performance (or race) mode, etc.

In contrast, in a different vehicle, such as a truck, a signal from a first energy harvesting switch 301 would cause the electronic vehicle suspension control system 35 to put the suspension in lower ride height mode (such as for fuel economy), a signal from a second energy harvesting switch 301 would cause the electronic vehicle suspension control system 35 to raise the suspension ride height (such as when the vehicle is loaded with cargo), another signal from another energy harvesting switch 301 would cause the electronic vehicle suspension control system 35 to put the suspension in a tow mode, etc.

In one embodiment, the plurality of different energy harvesting switches 301 are located in a similar location. In one embodiment, the plurality of different energy harvesting switches 301 are purpose based located. For example, an energy harvesting switch 301 that signals the electronic vehicle suspension control system 35 to perform a serious/emergency/Now type of adjustment (such as set maximum firmness) would be located on or near the steering wheel, gear shift, brake pedal, or floor location, such that the driver would be able to manipulate the mechanical switch 303 of energy harvesting switch 301 without looking for the energy harvesting switch 301.

In contrast, an energy harvesting switch 301 that signals the electronic vehicle suspension control system 35 to perform a less serious adjustment (such as tow mode) could be located on the dash, or in a location that is easily reached but may require the driver to move a hand from a control surface, take a look at the energy harvesting switch 301, or the like.

In one embodiment, the energy harvesting switch 301 is moveably couplable with the vehicle such that it can be moved to different locations by different drivers, moved from a driver side to a passenger side, and the like. In one embodiment, the energy harvesting switch 301 could be a handheld component such that it can be held by a co-pilot, passenger, or the like.

As stated herein, the energy harvesting switch 301 is used to issue a wireless signal 393 to a suspension component. For example, in one embodiment, when the energy harvesting switch 301 is mechanically actuated (e.g., the mechanical switch 303 position is changed by a user input), the movement of the mechanical switch 303 causes a magnetic member 304 to move with respect to a coil 307. In one embodiment, the magnetic member 304-coil 307 interaction caused by the user's movement of the mechanical switch 303 will generate enough electricity/energy for the energy harvesting switch 301 to generate/send a wireless signal 393 (e.g., a command/action) for an electronic vehicle suspension control system 35.

In one embodiment, the wireless signal 393 is a "telegram" or the like that includes a unique identifier (ID) that identifies the energy harvesting switch 301 that broadcast the telegram signal 393. Thus, even when several energy harvesting switches 301 are operating in the same environment, the telegram signal 393 will identify which energy harvesting switch 301 sent the signal 393. In one embodiment, the unique ID is used during the programming of the electronic vehicle suspension control system 35 such that the unique ID can be used by the electronic vehicle suspension control system 35 to identify the associated action to be taken. Although the Unique ID is used in one embodiment, in another embodiment, a different portion of the telegram signal 393 is used during the programming of the electronic vehicle suspension control system 35 to identify the associated action to be taken.

In one embodiment, the unique ID is used by the electronic vehicle suspension control system 35 to identify a valid energy harvesting switch 301, and a different portion of the telegram signal 393 is used during the programming of the electronic vehicle suspension control system 35 to identify the associated action to be taken.

In one embodiment, the telegram signal 393 is sent via a radio frequency (RF) transmitter 309 such as used in a wireless personal area network (WPAN), a low power network (LPN), Internet of things (IoT) connectivity, or the like. In one embodiment, the RF protocol could be, but is not limited to, Bluetooth, WiFi, Bluetooth Low Energy (BLE), near field communication (NFC), UHF radio signal, Worldwide Interoperability for Microwave Access (WiMax), industrial, scientific, and medical (ISM) band, IEEE 802.15.4 standard communicators, Zigbee, ANT, ISA100.11a (wireless systems for industrial automation: process control and related applications) wireless highway addressable remote transducer protocol (HART), MiWi, IPv6 over low-power wireless personal area networks (6LoWPAN), thread network protocol, subnetwork access protocol (SNAP), and the like.

In one embodiment, the energy harvesting switch 301 does not require a battery or other powered connection. As such, the energy harvesting switch 301 is capable of operating for an indefinite amount of time without requiring any type of recharge, battery change, etc.

In one embodiment, the energy harvesting switch 301 will send the signal 393 and will be configured to not look for an acknowledgement of the sent signal 393. In one embodiment, depending upon the wireless signal 393 type being used, the "no look" for an acknowledgement signal would be programmed as part of the transmission and operation protocol within the energy harvesting switch 301 operating system.

In one embodiment, the energy harvesting switch 301 transmitter 309 is powered by a momentary generator such as ZF electronics AFIG-0007 and will send the wireless transmission or "telegram" signal 393. In one embodiment, if the IEEE 802.15.4 standard is utilized by the transmitter 309, the electronic vehicle suspension control system 35 can include an IEEE 802.2 logical link control sublayer to receive the signal 393 and provide it to the electronic vehicle suspension control system 35 which will then disseminate the command to the one or more suspension components.

In one embodiment, the energy harvesting system 306 used in the energy harvesting switch 301 is a system such as the ZF Electronics AFIS-5003 with a SNAP transmitter 309, and the electronic vehicle suspension control system 35 will have a universal asynchronous receiver/transmitter (UART) interface supporting RS-232 or RS-485 using TTL logic levels to receive the signal 393 and provide it to the electronic vehicle suspension control system 35 which will then disseminate the command to the one or more suspension components.

In one embodiment, the energy harvesting switch 301 includes an erasable programmable read-only memory (Eprom 312). In one embodiment, the Eprom 312 can be written to with RF energy, NFC protocols, or the like.

In one embodiment, with an Eprom 312 in the energy harvesting switch 301, a user could use a mobile device, NFC programmer, or the like to modify the signal 393 transmitted from transmitter 309 of the energy harvesting switch 301. In one embodiment, modifying the transmitted signal 393 at the energy harvesting switch 301 would allow the energy harvesting switch 301 to provide a different command function to the electronic vehicle suspension control system 35 without the user having to interact with the electronic vehicle suspension control system 35 to adjust the command action taken by the electronic vehicle suspension control system 35.

In other words, the user could use their mobile device to program the Eprom 312 to change the signal 393 transmitted from the energy harvesting switch 301. By changing the transmitted signal 393, the energy harvesting switch 301 would cause the electronic vehicle suspension control system 35 to perform a different task such as, but not limited to, firm up the suspension, soften the suspension, set the suspension to a predefined mapping (or suspension setup), adjust a ride height, connect or disconnect a sway bar, engage or disengage a differential lock, or the like.

For example, the user may be driving in an offroad environment and the energy harvesting switch 301 is initially set to transmit a signal 393 that causes the electronic vehicle suspension control system 35 to activate the firmest suspension setting. Once the user is done driving offroad and is heading home on the freeway, the user could use their mobile device to program the Eprom 312 to change the signal 393 transmitted from the energy harvesting switch 301 to a different signal 393 that causes the electronic vehicle suspension control system 35 to activate a tow mode suspension setting (or engage the sway bar, lower the ride height, activate an accessory such as a winch, auxiliary light, and the like).

In one embodiment, the energy harvesting switch 301 is initially set up, (e.g., without the Eprom 312) to control another devices, after market component, and the like on the vehicle, or perform different tasks such as activate a tow mode suspension setting, engage the sway bar, lower the ride height, activate an accessory such as a winch, one or more auxiliary lights, and the like.

In one embodiment, a plurality of different energy harvesting switches are used, (e.g., with and/or without the Eprom 312) where each is used to control a different one of a plurality of devices, after market components, and the like on the vehicle, or perform different tasks such as activate a tow mode suspension setting, engage the sway bar, lower the ride height, activate an accessory such as a winch, one or more auxiliary lights, and the like.

In one embodiment, a plurality of different energy harvesting switches are used, (e.g., with and/or without the Eprom 312) where at least two are used to control a single one of a plurality of devices, after market components, and the like on the vehicle, or perform different tasks. For example, a first energy harvesting switch 301 would be used to activate a tow mode suspension setting, engage the sway bar, activate an accessory such as a winch, activate one or more auxiliary lights, and the like. In contrast, the other (or second) energy harvesting switch 301 would be used to deactivate a tow mode suspension setting, disengage the sway bar, deactivate an accessory such as a winch, deactivate one or more auxiliary lights, and the like.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. An energy harvesting system and remote digital switch assembly comprising:
   a remote digital switch coupled to a vehicle, said remote digital switch provided at a location within said vehicle such that a user of said vehicle is able find and manipulate said remote digital switch while keeping one hand on a control surface of said vehicle, said remote digital switch further configured to enable said user of said vehicle to manipulate said remote digital switch without requiring said user of said vehicle to view an in-vehicle infotainment (IVI) system of said vehicle; and
   an energy harvesting system integrated with said remote digital switch, said energy harvesting system comprising:
   a magnet;
   a coil;
   a mechanical switch, wherein manipulation of said mechanical switch causes said magnet to move with respect to said coil and generate an amount of energy; and
   a transmitter coupled with said mechanical switch, said transmitter configured to use said generated amount of energy to transmit a signal to at least one component coupled with a said vehicle, said signal configured to cause a change to at least one characteristic of said at least one component;

wherein said remote digital switch further comprises:
a receiver to receive a wireless message via a wireless protocol; and
a memory powered by a wireless protocol, said memory configured to store said signal for said at least one component coupled with said vehicle, wherein said memory is an erasable programmable read-only memory (Eprom).

2. The energy harvesting system and remote digital switch assembly of claim 1, wherein said signal configured to cause said change to at least one characteristic of said at least one component is selected from a group of changes consisting of: at least one damping characteristic of at least one active damping component, a damping mode of a suspension of said vehicle, a sway bar, a ride height, and an activation/deactivation of an accessory.

3. The energy harvesting system and remote digital switch assembly of claim 1, further comprising:
said transmitter to transmit said signal to a suspension controller for said vehicle.

4. The energy harvesting system and remote digital switch assembly of claim 1, further comprising:
said transmitter to transmit said signal to electronics embedded or incorporated as part a stand-alone active, or semi-active shock absorber.

5. The energy harvesting system and remote digital switch assembly of claim 1, further comprising:
said transmitter to transmit said signal to said in-vehicle infotainment (IVI) system of said vehicle.

6. The energy harvesting system and remote digital switch assembly of claim 1, wherein said signal is encrypted.

7. The energy harvesting system and remote digital switch assembly of claim 1, wherein said signal is a near field communication (NFC) signal.

8. The energy harvesting system and remote digital switch assembly of claim 1, further comprising:
a housing for containing said magnet, said coil, said mechanical switch, and said transmitter; said housing comprising:
a form factor configured to be held in a human hand; and
a location of said mechanical switch on said housing such that when said housing is held in said human hand, said mechanical switch is accessible to at least one digit of said human hand.

9. The energy harvesting system and remote digital switch assembly of claim 1, further comprising:
a housing for containing said magnet, said coil, said mechanical switch, and said transmitter; said housing comprising:
a form factor configured to be mounted to a portion of a vehicle accessible to said user of said vehicle; and
a location of said mechanical switch on said housing such that when said housing is mounted with said portion of said vehicle, said mechanical switch is accessible to said user of said vehicle.

10. An energy harvesting system and suspension changing switch comprising:
a suspension changing switch coupled to a vehicle, said suspension changing switch provided at a location within said vehicle such that a user of said vehicle is able find and manipulate said suspension changing switch while keeping one hand on a control surface of said vehicle, said suspension changing switch further configured to enable said user of said vehicle to manipulate said suspension changing switch without requiring said user of said vehicle to view an in-vehicle infotainment (IVI) system of said vehicle; and an energy harvesting system integrated with said suspension changing switch, said energy harvesting system comprising:
a magnet;
a coil; and
a transmitter to use said generated amount of energy to transmit a suspension signal to at least one active damping component located on said vehicle, said suspension signal configured to change at least one damping characteristic of said at least one active damping component;

wherein said remote digital switch further comprises:
a receiver to receive a wireless message via a wireless protocol; and
a memory powered by a wireless protocol, said memory configured to store said signal for said at least one component coupled with said vehicle,
wherein said memory is an erasable programmable read-only memory (Eprom).

11. The energy harvesting system and suspension changing switch of claim 10, wherein said suspension signal is configured to change said at least one active damping component to a firmest setting.

12. The energy harvesting system and suspension changing switch of claim 10, further comprising:
said transmitter to transmit said suspension signal to a suspension controller for said vehicle, said suspension signal configured to cause said suspension controller to change a damping mode of said at least one active damping component.

13. The energy harvesting system and suspension changing switch of claim 12, wherein said suspension signal is configured to cause said suspension controller to change said damping mode of said at least one active damping component to a firmest setting.

14. The energy harvesting suspension changing switch of claim 10, wherein said suspension signal includes an authentication signal.

15. The energy harvesting system and suspension changing switch of claim 12, wherein said suspension signal is a near field communication (NFC) signal.

16. The energy harvesting system and suspension changing switch of claim 12, further comprising:
a housing for containing said magnet, said coil, said mechanical switch, and said transmitter; said housing comprising:
a form factor configured to be held in a human hand; and
a location of said mechanical switch on said housing such that when said housing is held in said human hand, said mechanical switch is accessible to at least one digit of said human hand.

17. The energy harvesting system and suspension changing switch of claim 10, further comprising:
a housing for containing said magnet, said coil, said mechanical switch, and said transmitter; said housing comprising:
a form factor configured to be mounted to a portion of a vehicle accessible to said user of said vehicle; and
a location of said mechanical switch on said housing such that when said housing is mounted to said portion of said vehicle, said mechanical switch is accessible to said user of said vehicle.

* * * * *